3,388,138
16α - FLUOROMETHYL - 21 - FLUORO AND 21-
DESOXY COMPOUNDS OF THE PREGNANE
SERIES
Philip F. Beal III, and John E. Pike, Kalamazoo, Mich.,
assignors to The Upjohn Company, Kalamazoo, Mich.,
a corporation of Delaware
No Drawing. Continuation-in-part of application Ser. No.
1,454, Jan. 11, 1960. This application May 6, 1966, Ser.
No. 548,056
8 Claims. (Cl. 260—397.4)

This application is a continuation-in-part of application Ser. No. 1,454, filed Jan. 11, 1960, now U.S. Patent No. 3,261,851.

This invention relates to certain novel and therapeutically useful steroids and more particularly to (A) 16α-fluoromethylhydrocortisone, 16α - fluoromethylcortisone, 16α-fluoromethyl - 17α,21 - dihydroxy - 4 - pregnene - 3,20-dione, 1-dehydro-16α-fluoromethylhydrocortisone, 1-dehydro-16α-fluoromethylcortisone, 16α - fluoromethyl-17α, 21-dihydroxy-1,4-pregnadiene-3,20-dione, the 2α-methyl and 6α-methyl derivatives of these compounds and the 21-acylates thereof; (B) 6α-fluoro-16α-fluoromethylhydrocortisone, 6α-fluoro-16α-fluoromethylcortisone, 6α-fluoro-16α-fluoromethyl-17α,21-dihydroxy - 4 - pregnene-3,20-dione, 1 - dehydro-6α-fluoro-16α-fluoromethylhydrocortisone, 1-dehydro - 6α - fluoro-16α-fluoromethylcortisone, 6α-fluoro - 16α - fluoromethyl - 17α,21 - dihydroxy-1,4-pregnadiene-3,20-dione and the 21-acylates thereof; (C) 9α-halo-16α-fluoromethylhydrocortisone, 9α - halo-16α-fluoromethylcortisone, 1-dehydro-9α-halo-16α-fluoromethylhydrocortisone, 1-dehydro - 9α - halo-16α-fluoromethylcortisone, especially the 9α-fluoro compounds, the 2α-methyl, 6α-methyl and 6α-fluoro derivatives of these compounds and the 21-acylates thereof; (D) the 21-fluoro and 21-desoxy compounds including the 17-acylates thereof which correspond otherwise to the compounds of Groups (A), (B) and (C), above, the 17,21-epoxy compounds corresponding otherwise to the compounds of groups (A), (B) and (C), above, to novel steroid intermediates and to processes for the production thereof. The novel compounds of this invention, listed above under (A), (B), (C) and (D), can be represented by the following formulae:

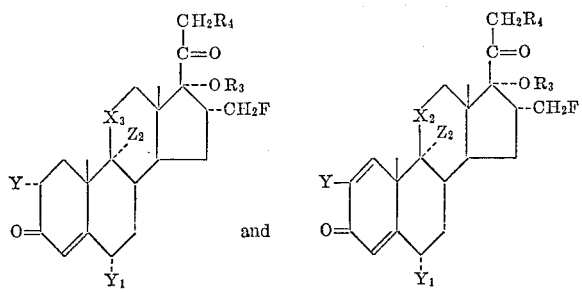

wherein R₃ is hydrogen or the acyl radical of an organic carboxylic acid, preferably a hydrocarbon carboxylic acid containing from 1 to 12 carbon atoms, inclusive, R₄ is hydrogen, fluorine, hydroxy or OAc in which Ac is the acyl radical defined as above, X₂ is selected from the group consisting of the methylene radical (>CH₂), the β-hydroxymethylene radical

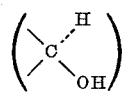

and the carbonyl radical (>C=O), Y is hydrogen or methyl, Y₁ is hydrogen, methyl or fluorine, Z₂ is hydrogen, fluorine, chlorine or bromine, and wherein when X₂ is the methylene radical Z₂ is limited to hydrogen. The above compounds are highly potent cortical hormones having anti-inflammatory, glucocorticoid, salt and water regulating, progestational, pituitary inhibiting and anti-anabolic activities with improved ratio of therapeutic activity to undesirable side-effects, e.g., gastrointestinal disturbances, edema, etc., known to exist with similar known physiologically active steroid compounds. Many of the higher molecular weight esters of the 21-hydroxy compounds, particularly those resistant to hydrolysis and/or more insoluble in body fluids, provide compounds having more prolonged activity than the corresponding 21-hydroxy compounds. The above-named compounds are particularly useful in the treatment of various inflammatory conditions of the skin, eyes, respiratory tract and the bones and internal organs, contact dermatitis and allergic reactions, rheumatoid arthritis, and possess improved therapeutic ratios of anti-inflammatory activity to undesirable side-effects, compared to the corresponding compounds lacking the 16α-fluoromethyl group.

The novel 17,21-epoxy compounds of Group (D) of this invention represented by the following formulae:

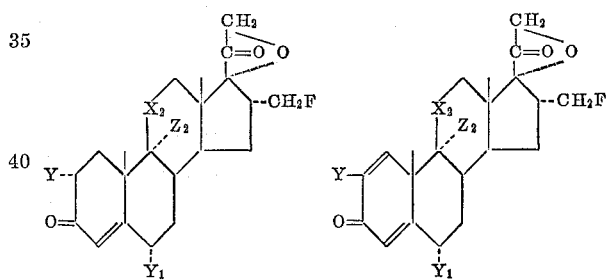

wherein X₂, Y, Y₁ and Z₂ have the meanings previously given and wherein when X₂ is methylene Z₂ is hydrogen, possess particularly marked diuretic activity in that they cause a loss of salt and water which makes them especially valuable in the treatment of cirrhosis of the liver, the nephrotic syndrome, and the treatment of eclampsia and pre-eclampsia.

Other compounds of this invention, as well as being useful as intermediates in the production of the above described compounds, also possess useful physiological activities, including anti-inflammatory, glucocorticoid, salt and water regulating, progestational, anti-fertility, muscle relaxing, central nervous system depressant and cardiotonic activities. Among these are the compounds represented by Formulae II, III, IIIa, IV, V, Va, VI, VIa, VIb, IX, IXa, A–II, A–IV, A–V, A–VI, A–VIII, A–IX, A¹–II, A¹–III and A¹–IV of the flow sheets set forth below.

The novel compounds of this invention and the therapeutically active intermediates can be prepared and administered to mammals, birds, humans and animals in a wide variety of oral, parenteral or topical dosage forms singly, or in admixture with other coacting compounds. They can be associated with a carrier which can be a solid material or a liquid in which the compound is dissolved, dispersed or suspended. The solid compositions can take the form of tablets, powder, capsules, pills or the like, preferably in unit dosage forms for simple administration or precise dosages. The liquid compositions can take the form of solutions, emulsions, suspensions, syrups or elixirs. Pharmaceutical compositions and mixtures for topical use can take the form ointments, lotions, jellies, creams, aqueous suspensions and the like.

The following starting materials for the processes of this invention are known in the art: 4,16-pregnadiene-3,11,20-trione, 4,16-pregnadiene-3,20-dione, 3-acetoxy-16-pregnene-11,20-dione and 16α-cyano-3β-hydroxy-5-pregnen-20-one. The other starting materials, i.e., 2α-methyl-4,16-pregnadiene-3,11,20-trione, 6α-methyl - 4,16 - pregnadiene-3,11,20-trione, 2α-methyl - 4,16 - pregnadiene-3,20-dione and 6α-methyl-4,16-pregnadiene-3,20-dione are prepared from 2α-methyl-11-ketoprogesterone, 6α-methyl-11-ketoprogesterone, 2α-methylprogesterone and 6α-methylprogesterone, respectively, by catalytic reduction to produce the corresponding saturated A-ring compounds which can be converted to the 2α-methyl and 6α-methyl starting materials listed above according to the procedures of U.S. Patent 2,794,814, as shown in Preparations 1–5 contained herein.

Group A.—The novel compounds of Group A of this invention are represented by the following formulae:

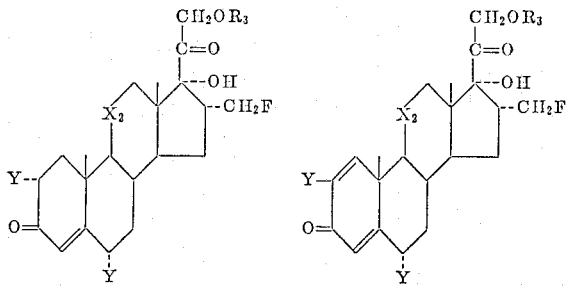

wherein $R_3$, Y and $X_2$ have the meanings previously given.

According to the processes for the production of the compounds of Group A of this invention, illustratively represented by the following reaction schemes; the intermediate compounds represented by Formulae IX and IXa are first prepared by one of three alternative procedures, Route 1 being generally preferred:

ROUTE 1

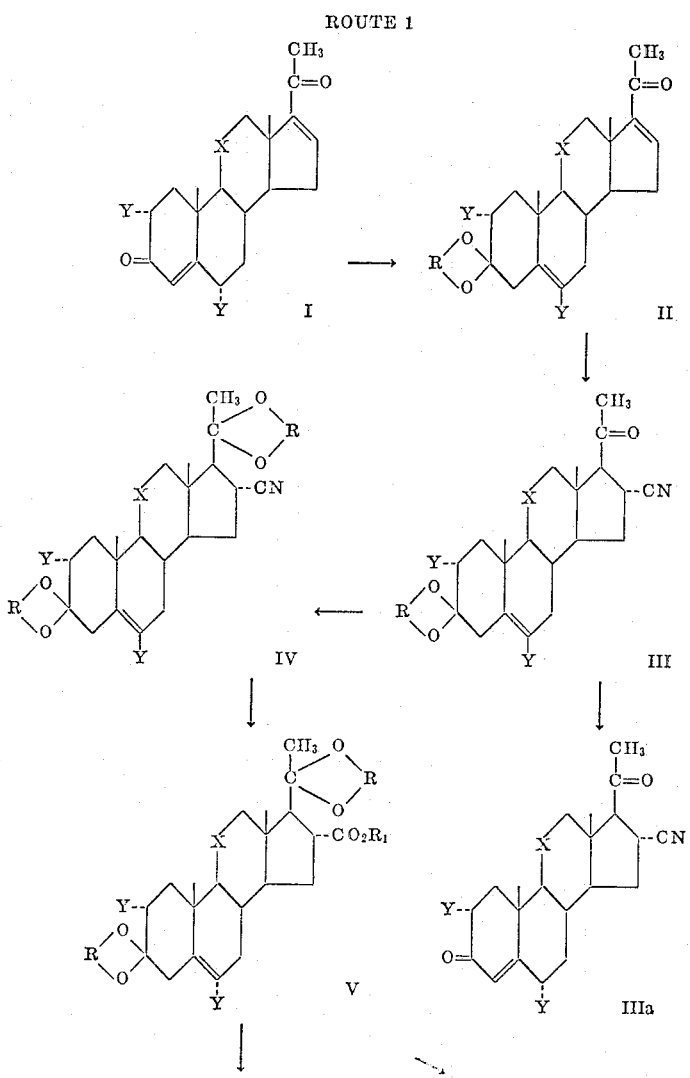

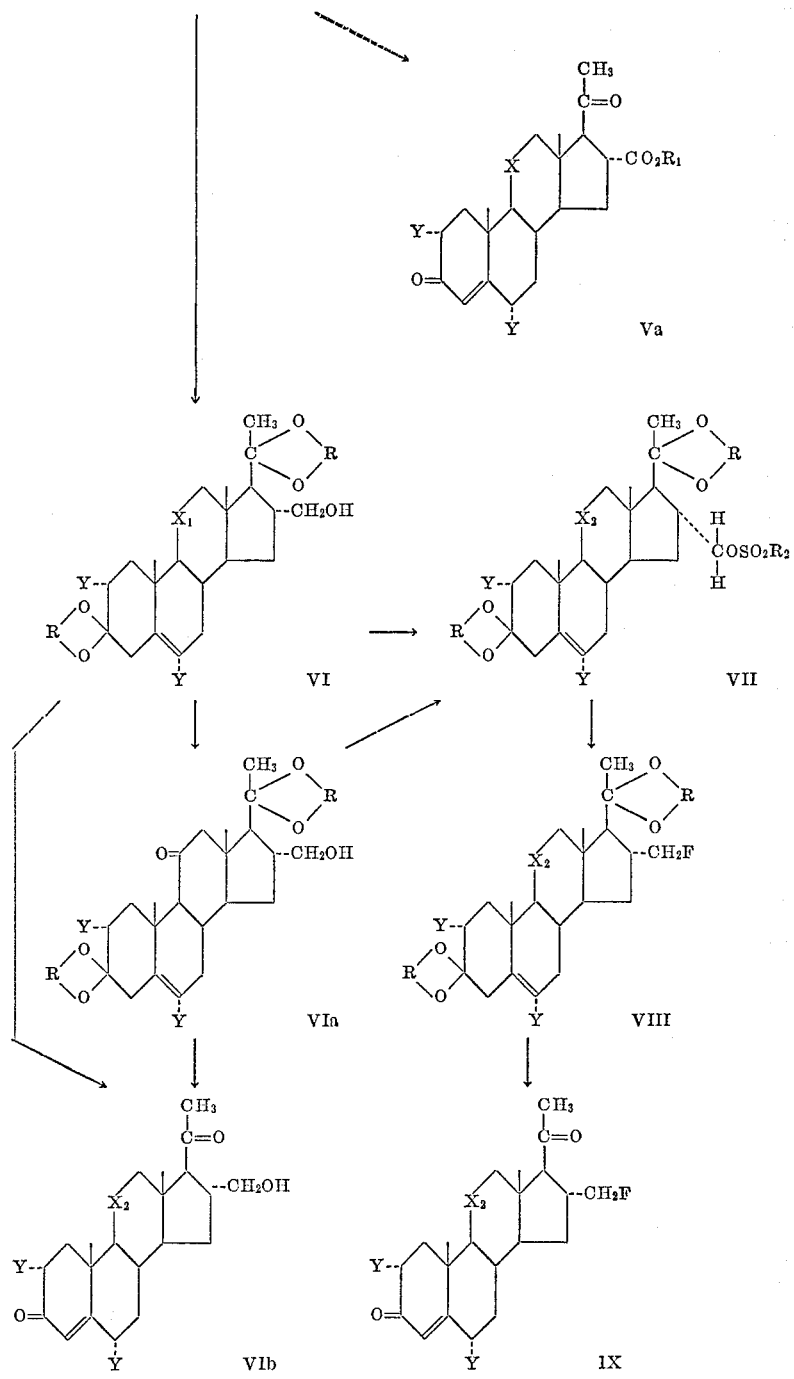
ROUTE 2
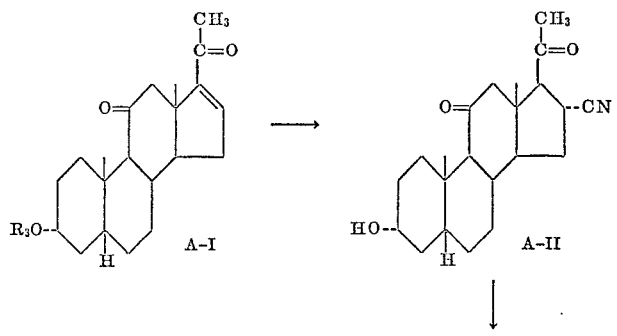

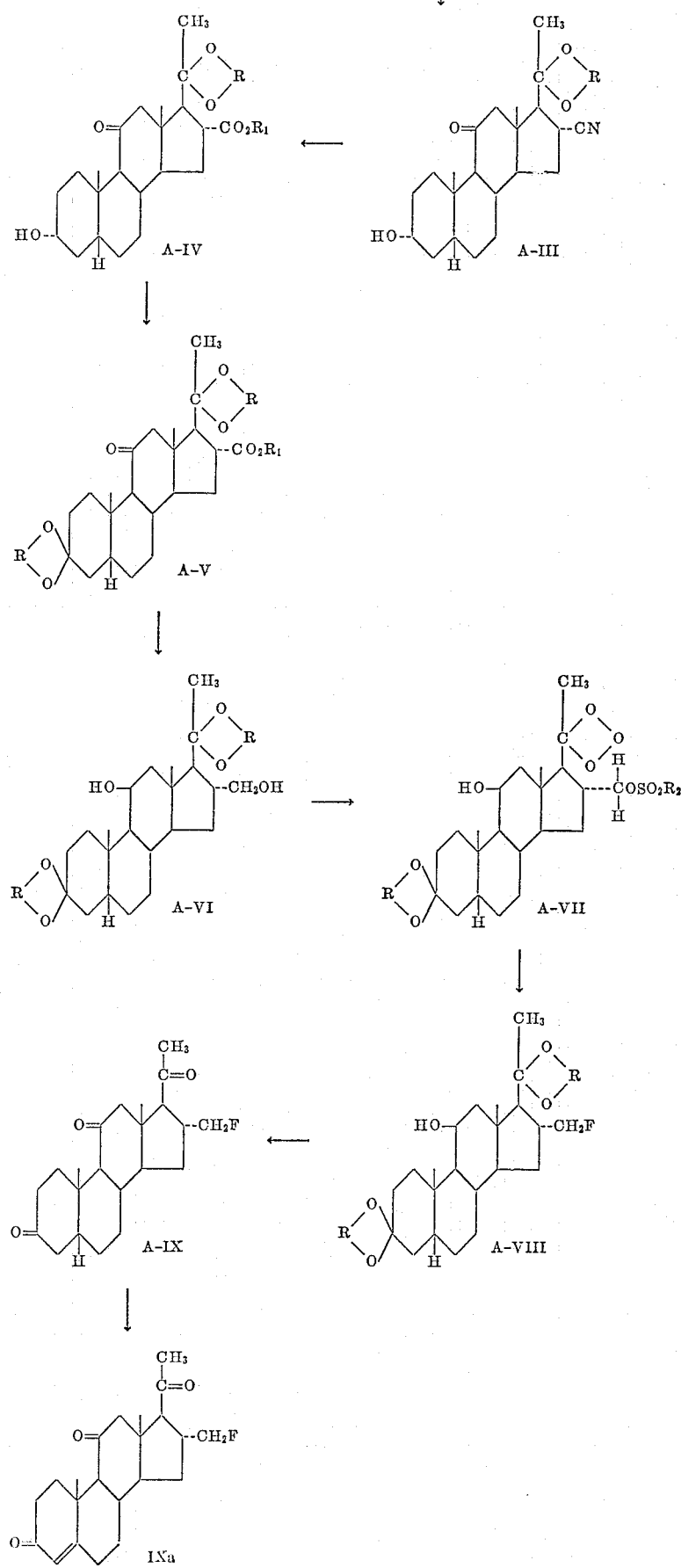

ROUTE 3
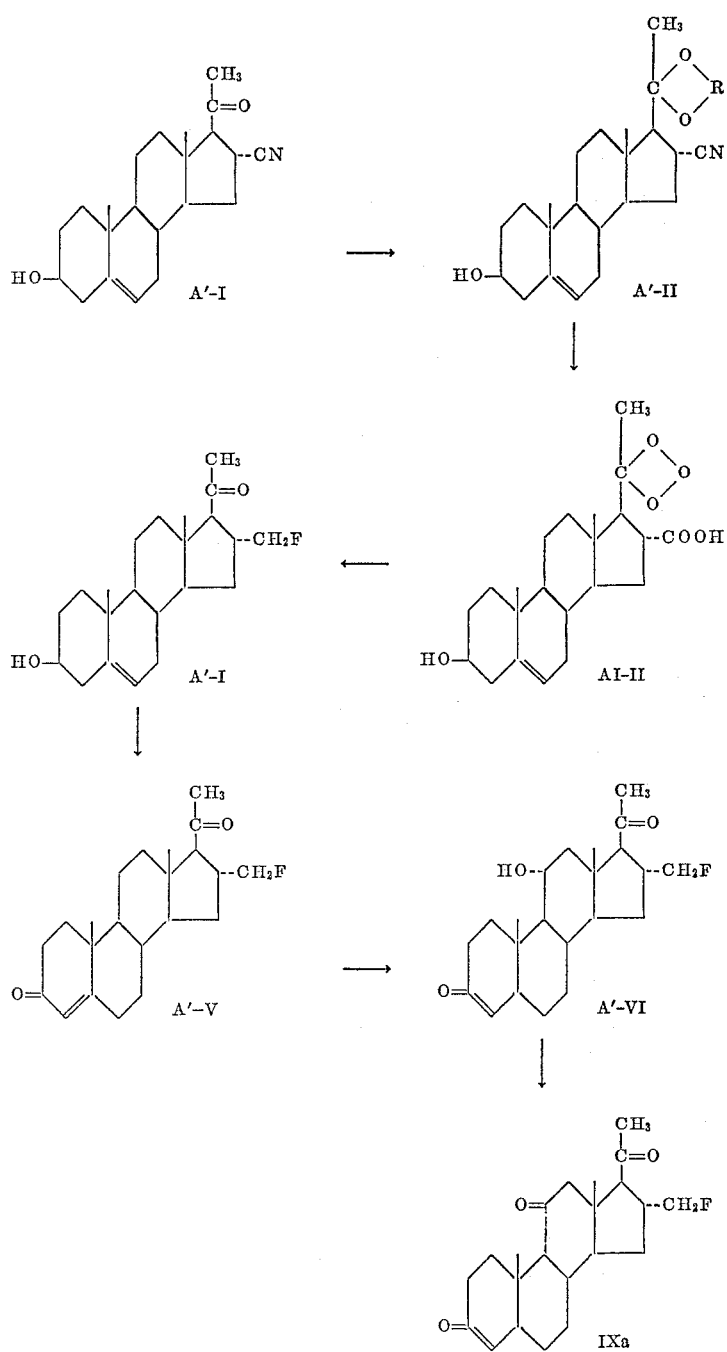
GROUP A
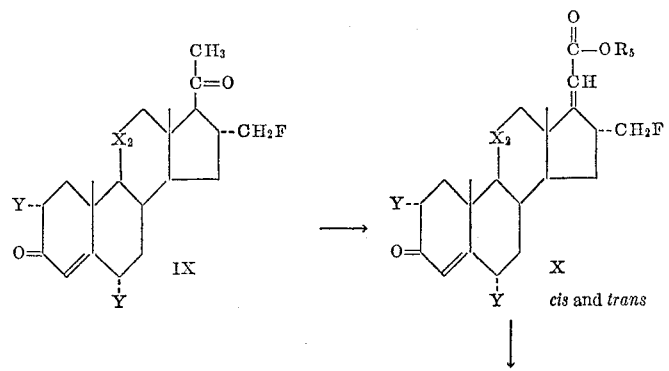

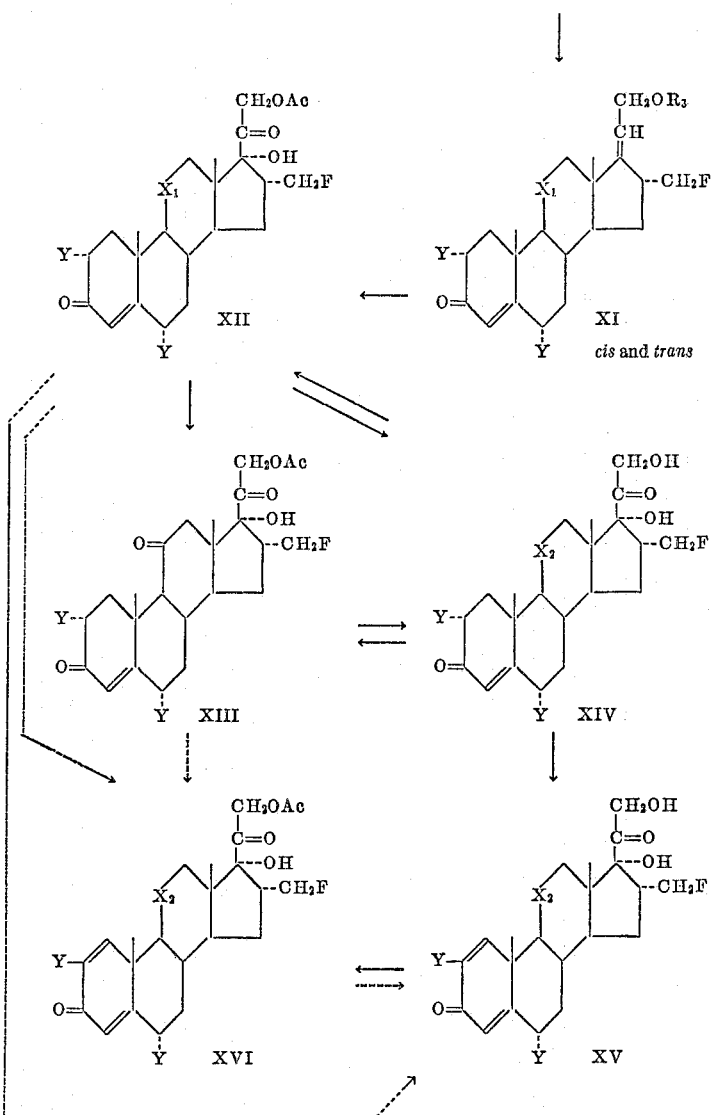

wherein Y, $X_2$, and $R_3$ have the meanings previously given, Ac is the acyl radical of an organic carboxylic acid, preferably a hydrocarbon carboxylic acid containing from 1 to 12 carbon atoms, inclusive, R is a lower alkylene radical containing from 1 to 8 carbon atoms, inclusive, and from 2 to 3 carbon atoms in the chain connecting the oxygen atoms, e.g., ethylene, trimethylene, 2,2-dimethyltrimethylene, n-propyl-ethylene, 1,1,2,2-tetramethylethylene, etc., $R_1$ is hydrogen or methyl, $R_2$ is an organic radical, particularly a hydrocarbon radical containing from one to ten carbon atoms, inclusive, e.g., methyl, ethyl phenyl, tolyl, naphthyl, etc., $R_5$ is a lower alkyl radical containing from 1 to 8 carbon atoms, inclusive, X is the methylene radical or the carbonyl radical and $X_1$ is the methylene radical or the β-hydroxymethylene radical.

ROUTE 1

In carrying out the process of Route 1, 4,16-pregnadiene-3,11,20-trione, 4,16-pregnadiene-3,20-dione or the 2α-methyl and 6α-methyl analogues thereof (I) are ketalized at the 3-position according to the method of U.S. Patent 2,707,184 or 2,758,993 or with the acetal of a lower-alkylene glycol, e.g., dioxolane, 2-methyl-2-ethyldioxolane, in the presence of an acid catalyst, e.g., p-toluenesulfonic acid, concentrated sulfuric acid, boron trifluoride, etc., to produce the corresponding 3-cyclic ketal of the selected 4,16-pregnadiene (II). Ethylene glycol is the preferred ketalizing agent.

The 3-ketalized 4,16-pregnadienes (II) thus produced are then treated with an alkali-metal cyanide, e.g., potassium cyanide or sodium cyanide, in the presence of a suitable solvent such as dioxane, methanol, ethanol, propanol, mixtures of these solvents and the like to produce the corresponding 3-ketalized 16α-cyano-4-pregnene (III), which can be hydrolyzed by methods known in the art, e.g., U.S. Patent 2,707,184 or 2,758,993 to produce the corresponding free 3-keto compound (IIIa).

The 3-ketalized 16α-cyano-4-pregnenes (III) are then ketalized at the 20-position with a lower-alkylene α- or β-glycol, e.g., ethylene glycol in the presence of an acid catalyst, e.g., p-toluenesulfonic acid, sulfuric acid, etc. to produce the corresponding 3,20-diketalized 16α-cyano-4-pregnene (IV). Reaction solvents which may be suitably employed include hydrocarbon solvents, halogenated hydrocarbons, ethers, and the like, e.g., benzene, xylene, hexane, chloroform, diethyl ether, tetrahydrofuran, dioxane, etc., or an excess of alkylene glycol can be used.

The 3,20-diketalized 16α-cyano-4-pregnenes (IV) thus obtained are then dissolved in an organic solvent, e.g., ethylene glycol, propylene glycol, dimethylsulfoxide, ethanol, tertiary amines such as pyridine and the like, and hydrolyzed with an aqueous base such as an aqueous alkali metal hydroxide solution, e.g., potassium hydroxide or sodium hydroxide, to give the corresponding 3,20-diketalized 16α-carboxy-4-pregnene (V), which can be esterified with ethereal diazomethane solution to produce the corresponding 16α-carbomethoxy compound (V).

The 3,20-diketalized 16α-carboxy or 16α-carbomethoxy-4-pregnenes represented by Formula V, e.g., 16α-carboxy-4-pregnene-3,11,20-trione 3,20-bis(alkylene ketal)

or 16α-carboxy-4-pregnene-3,20-dione bis(alkylene ketal), the 2α- and 6α-methyl analogues thereof or the corresponding 16α-carbomethoxy compounds, are then reduced with lithium aluminum hydride or other carboxyl reducing agent in an organic solvent or mixtures of organic solvents, e.g., ether, dioxane, tetrahydrofuran, benzene, toluene, and the like, to produce the corresponding 3,20-diketalized 16α-hydroxymethyl-4-pregnene (VI), e.g., 11β-hydroxy-16α-hydroxymethyl-4-pregnene-3,20-dione bis(alkylene ketal), 16α-hydroxymethyl-4-pregnene-3,20-dione bis(alkylene ketal) and the 2α- and 6α-methyl analogues thereof. The 11-keto group when present in the starting material of this step are simultaneously reduced to the 11β-hydroxy group.

The 3,20-diketalized 11β-hydroxy-16α-hydroxymethyl-4-pregnene-3,20-diones (VI) can be esterified by known methods, e.g., with a carboxylic acid anhydride in pyridine, to produce the corresponding 16α-acyloxymethyl compounds which can then be oxidized at the 11-position by known methods, e.g., with chromium trioxide in pyridine, chromic acid or sodium dichromate, chromic anhydride and dilute sulfuric acid, N-haloimide or N-haloamide in pyridine and the like to give the corresponding 3,20-diketalized 16α-acyloxymethyl-4-pregnene-3,11,20-triones (VIa) which on hydrolysis with aqueous base, e.g., aqueous sodium hydroxide, is productive of the corresponding 3,20-diketalized 16α-hydroxymethyl-4-pregnene-3,11,20-triones represented by Formula VIa.

The compounds of Formulae V, VI and VIa are useful anti-inflammatory, glucocorticoid, salt and water regulating, progestational, antifertility, central nervous system depressant and cardiotonic agents. These compounds can be hydrolyzed if desired by known methods for hydrolyzing cyclic ketal groups, e.g., with dilute aqueous acid in the same manner as described above for hydrolyzing the 3-ketals, e.g., dilute aqueous acid, to give the free 3,20-ketones represented by Formulae Va and VIb, which have physiological activities similar to those of the parent compounds (VI) and (VIa), above.

The 3,20-diketalized 16α-hydroxymethyl-4-pregnenes (VI) and (VIa) are then reacted with an organic sulfonyl halide, e.g., p-toluenesulfonyl chloride, to yield the corresponding organic sulfonate ester of the 16α-hydroxymethyl group (VII), e.g., the p-toluene sulfonate, which on fluorination by means of potassium fluorosulfinate or an alkali metal fluoride, e.g., anhydrous potassium fluoride in the presence of a solvent, e.g., ethylene glycol, diethylene glycol, triethylene glycol, propylene glycol, and the like, at a temperature range between 100 and 300° C. in an atmosphere of nitrogen gives the corresponding 3,20-diketalized 16α-fluoromethyl-4-pregnene (VIII).

The compounds of Formula VIII thus produced are then hydrolyzed by known methods for hydrolyzing cyclic ketal groups, e.g., dilute sulfuric acid, according to the method of U.S. Patents 2,707,184 or 2,758,993 for hydrolyzing 3-cyclic ketals, to give corresponding 16α-fluoromethyl-4-pregnenes (IX), i.e., 11β-hydroxy-16α-fluoromethyl-4-pregnene-3,20-dione, 16α-fluoromethyl-4-pregnene-3,11,20-trione, 16α-fluoromethyl-4-pregnene-3,20-dione and the corresponding 2α and 6α-methyl analogues thereof.

The 11β-hydroxy compounds (IX) thus produced are oxidized at the 11-position with chromium trioxide and pyridine or by other known methods, e.g., those previously described, to give the corresponding 16α-fluoromethyl-4-pregnene-3,11,20-triones (IX), e.g., 16α-fluoromethyl-4-pregnene-3,11,20-trione, 2α-methyl-16α-fluoromethyl-4-pregnene-3,11,20-trione, and 6α-methyl-16α-fluoromethyl-4-pregnene-3,11,20-trione. These compounds represented by Formula IX possess useful physiological activities, including anti-inflammatory, glucocorticoid, salt and water regulating, progestational, anti-fertility, cardiotonic and central nervous system depressant activities.

ROUTE 2

Route 2 of this invention provides an alternate process for producing 16α-fluoromethyl-4-pregnene-3,11,20-trione (IXa).

According to the process of Route 2, 3α-hydroxy-16-pregnene-11,20-dione or a 3-acylate thereof (A–I), e.g., 3α-acetoxy-16-pregnene-11,20-dione, is treated with an alkali metal cyanide, e.g., potassium cyanide or sodium cyanide in a suitable solvent, e.g., those named in the cyanide reaction of Route 1, above, to produce 3α-hydroxy-16α-cyano-5β-pregnane-11,20-dione (A–II), which is then ketalized at the 20-position with a lower alkylene α- or β-glycol in the manner described in Route 1 for producing the compounds of Formula IV, to produce 3α-hydroxy-16α-cyano-5β-pregnane-11,20-dione 20-alkylene ketal (A–III). Compound A–III is then hydrolyzed with an aqueous alkali-metal hydroxide, e.g., potassium or sodium hydroxide in a suitable organic solvent, e.g., ethylene glycol, to give 3α-hydroxy-16α-carboxy-5β-pregnane-11,20-dione 20-alkylene ketal which is then esterified with ethereal diazomethane to give 3β-hydroxy-16α-carbomethoxy-5β-pregnane 20-alkylene ketal (A–IV). This compound is then oxidized, e.g., with an N-haloamide or an N-haloimide in pyridine, with chromic anhydride or chromium trioxide and dilute sulfuric acid in acetone or methylene chloride, with sodium dichromate in glacial acetic acid, or other known oxidizing agents to produce 16α-carbomethoxy-5β-pregnane-3,11,20-trione 20-alkylene ketal which is then ketalized at the 3-position according to the procedures described in Route 1 for ketalizing the compounds of Formula III to produce 16α-carbomethoxy-5β-pregnane-3,11,20-trione 3,20-bis(alkylene ketal) (A–V). This compound is then reduced with lithium aluminum hydride or other carboxyl reducing agent in the same manner as described in Route 1, above, to give 11β-hydroxy-16α-hydroxymethyl-5β-pregnane-3,20-dione bis(alkylene ketal) (A–VI). This compound (A–VI) can be hydrolyzed by acid e.g., dilute aqueous sulfuric acid in acetone to give 11β-hydroxy-16α-hydroxymethyl-5β-pregnane-3,20-dione. The 16α-hydroxymethyl group of A–VI is then reacted with an organic sulfonyl halide, e.g., p-toluenesulfonyl chloride, to give the corresponding organic sulfonate of the 16α-hydroxymethyl derivative (A–VII), e.g., the p-toluenesulfonate, which is then fluorinated by means of an alkali metal fluoride, e.g., anhydrous potassium fluoride, to produce 11β-hydroxy-16α-fluoromethyl-5β-pregnane-3,20-dione bis(alkylene ketal) (A–VIII). This compound is then oxidized by known methods for oxidizing the 11-position of steroids, e.g., hydrocortisone to cortisone, e.g., using chromium trioxide in pyridine, to produce to corresponding 11-keto compound which is then hydrolyzed under acid conditions to remove the ketal groups, e.g., dilute aqueous sulfuric acid, to give 16α-fluoromethyl-5β-pregnane-3,11,20-trione (A–IX). This compound is then treated with a halogenating agent, e.g., a hypohalous acid, a mineral acid with a hypochlorite, such as t-butylhypochlorite, N-bromoacetamide, N-bromosuccinimide, N-chloroacetamide, N-chlorosuccinimide and the like, to give the corresponding 4-halo-16α-fluoromethyl-5β-pregnane-3,11,20-trione. The 4-halo compound thus obtained can be converted to the corresponding $\Delta^4$ compound according to the procedure disclosed in U.S. Patent 2,794,814, e.g., by treatment with semicarbazide hydrochloride followed by pyruvic acid, to give 16α-fluoromethyl-4-pregnene-3,11,20-trione (IXa).

ROUTE 3

Route 3 of this invention provides another alternate procedure for producing 16α-fluoromethyl-4-pregnene-3,11,20-trione (IXa) and 3β-hydroxy-16α-fluoromethyl-5-pregnen-20-one (A′–IV) which is used as starting material for production of the 6α-fluoro compounds of Group B of this invention.

According to the process of Route 3, 3β-hydroxy-16α- cyano-5-pregnen-20-one is ketalized at the 20-position according to the method previously described in Routes 1 and 2 for ketalizing compounds of Formula III and A–II, to produce the corresponding 3β-hydroxy-16α-cyano-5-pregnen-20-one 20-alkylene ketal (A′–II), which is then hydrolyzed with an aqueous alkali-metal hydroxide, e.g., potassium or sodium hydroxide to give 3β-hydroxy-16α-carboxy-5-pregnen-20-one 20-alkylene ketal (A′–III).

Compound A′–III is then treated with dihydropyran in the presence of an acid catalyst, e.g., p-toluenesulfonic acid, concentrated sulfuric acid, benzenesulfonic acid, anhydrous hydrogen chloride and the like, to produce the corresponding 3-tetrahydropyranyloxy-16α-carboxy-5-pregnen-20-one 20-alkylene ketal tetrahydropyranyl ester. Reaction solvents which may be suitably employed in the dihydropyran reaction include benzene, toluene, Skellysolve B hexanes, xylene, diethyl ether, dioxane, chloroform, tetrahydrofuran and the like.

The tetrahydropyranyl ester is then reduced with lithium aluminum hydride or other carboxyl reducing agent in the same manner as described in Route 1, above, for reducing the compounds of Formula V to produce the corresponding 3-tetrahydropyranyloxy-16α-hydroxymethyl-5-pregnen-20-one 20-alkylene ketal which is then reacted with an organic sulfonyl halide, e.g., p-toluenesulfonyl chloride to produce the corresponding organic sulfonate of the 16α-hydroxymethyl group, e.g., p-toluenesulfonate, which on fluorination by means of an alkali metal fluoride, e.g., anhydrous potassium fluoride gives the corresponding 3 - tetrahydropyranyloxy - 16α - fluoromethyl-5-pregnen-20-one 20-alkylene ketal. This compound is then hydrolyzed with dilute aqueous acid, e.g., sulfuric acid to give 3β - hydroxy - 16α - fluoromethyl - 5-pregnen-20-one (A′–IV).

This compound (A′–IV) is then oxidized (Oppenaur oxidation) with a ketone, e.g., acetone or cyclohexanone and an aluminum alkoxide, e.g., aluminum isopropoxide, to give 16α-fluoromethyl-4-pregnene-3,20-dione (A′–V). This compound is then oxygenated at the 11-position by microbiological conversion, according to the procedure of U.S. Patent 2,735,800 for converting progesterone to 11α-hydroxyprogesterone, to produce 11α-hydroxy-16α-fluoromethyl - 4 - pregnene-3,20-dione (A′–VI), which is then oxidized at the 11-position by known methods, e.g., chromium trioxide and sulfuric acid, to produce 16α-fluoromethyl-4-pregnene-3,11,20-trione (IXa).

The compounds of Formula IX, i.e., 16α-fluoromethyl-4-pregnene-3,20-dione, 16α-fluoromethyl-4-pregnene-3,11,20-trione, 11β-hydroxy-16α-fluoromethyl-4-pregnene-3,20-dione, and the corresponding 2α-methyl and 6α-methyl analogues, are converted to the corresponding cis and trans 4,17(20)-pregnadien-21-oic acid alkyl esters (X) according to the methods described in U.S. Patent 2,790,814. The compounds of Formula X are then converted to their 3-enamines, reduced with an alkali-metal aluminum hydride, and hydrolyzed to remove the 3-enamine group, as described in U.S. Patent 2,781,343 to produce the 21-hydroxy compounds of Formula XI, i.e., cis and trans 11β-21-dihydroxy-16α-fluoromethyl-4,17(20) - pregnadien-3-one, 16α - fluoromethyl-21-hydroxy - 4,17(20)-pregnadien-3-one, and the 2α-methyl and 6α-methyl analogues thereof. The 11-keto group when present is simultaneously reduced to the 11β-hydroxy group. The 21-free alcohols (XI) thus produced are esterified with an anhydride or acid halide of an organic carboxylic acid preferably a hydrocarbon carboxylic acid containing from 1 to 12 carbon atoms inclusive, including dicarboxylic acids, in pyridine or with an acid, e.g., formic, or an ester in the presence of an acid catalyst to produce the corresponding 21-acylate (XI).

The 21-acylates preferably the 21-acetates of Formula XI are then oxidatively hydroxylated with osmium tetroxide and an amine oxide peroxide according to the procedure of U.S. Patent 2,769,825 or with an organic polyvalent iodo oxide, e.g., phenyliodoso acetate, according to the procedure of U.S. Patent 2,875,217 to give the compounds of Formula XII.

The 11β-hydroxy compounds of Formula XII, e.g., 16α-fluoromethylhydrocortisone 21-acylate and the corresponding 2α-methyl and 6α-methyl analogues are oxidized in accordance with known methods for oxidizing hydrocortisone 21-acetate to cortisone 21-acetate, e.g., chromic anhydride and acetic acid, chromium trioxide and sulfuric acid, N-haloimides or N-haloamides, etc., to produce the corresponding 11-keto compounds of Formula XIII.

The compounds of Formulae XII and XIII are then converted to the corresponding 21-free alcohols (XIV) by hydrolysis in accordance with known methods for hydrolyzing hydrocortisone 21-acrylates to hydrocortisone, e.g., sodium or potassium bicarbonate in aqueous alcohol, in an oxygen-free atmosphere.

The compounds of Formula XIV, are dehydrogenated at the 1,2-position by fermentative or chemical dehydrogenation to give the corresponding 1-dehydro compounds of Formula XV. Fermentative dehydrogenation comprises the use of micro-organisms such as Septomyxa, Corynebacterium, Fusarium, and the like, under fermentation conditions well known in the art (e.g., U.S. 2,602,769, 2,902,410 or 2,902,411). When Septomyxa is used to effect the dehydrogenation it is found to be advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatrien-3-one, and the like. The free alcohols are usually employed as starting material for the fermentative dehydrogenation process. However, 21-acylates of Formulae XII and XIII can be used. In these cases the 21-ester group is generally saponified during the fermentation process giving the corresponding 21-free alcohol represented by Formula XV. Chemical dehydrogenation can be carried out with selenium dioxide according to procedures well known in the art [e.g., Meystre et al., Helv. Chim. Acta, 39, 734 (1956)]. The 21-acylates of Formulae XII and XIII are generally preferred as starting material in the chemical dehydrogenation reaction giving the corresponding 21-acylate represented by Formula XVI. The 21-acylate thus obtained can be saponified, if desired, by methods known in the art to give the corresponding 21-free alcohol (XV).

The compounds of Formula XIV and XV are reesterified to the corresponding 21-acylates by reaction with the selected acylating agent. This reaction can be performed under the esterification conditions known in the art, e.g., by the reaction of XIV or XV with the selected acid chloride or acid bromide or the anhydride of an organic carboxylic acid, or by reaction with the selected acid in the presence of an esterification catalyst, for example, p-toluenesulfonyl chloride, trifluoroacetic anhydride, p-toluenesulfonic acid, trifluoroacetic acid, sulfuric acid, and the like, or with an ester under ester exchange reaction conditions. Compounds thus produced include those wherein Ac is the acyl radical of a hydrocarbon carboxylic acid containing from 1 to 12 carbon atoms, inclusive, e.g., the acids listed in Example 36A.

Group B.—The novel compounds of Group B of this invention are represented by the following Formulae:

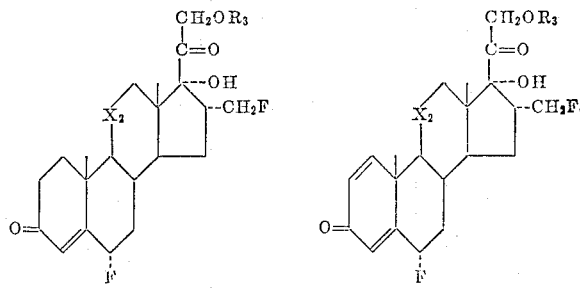

wherein $R_3$ and $X_2$ have the same meanings as previously given.
The processes for the production of the compounds of Group B of the present invention are illustratively represented by the following reaction scheme:
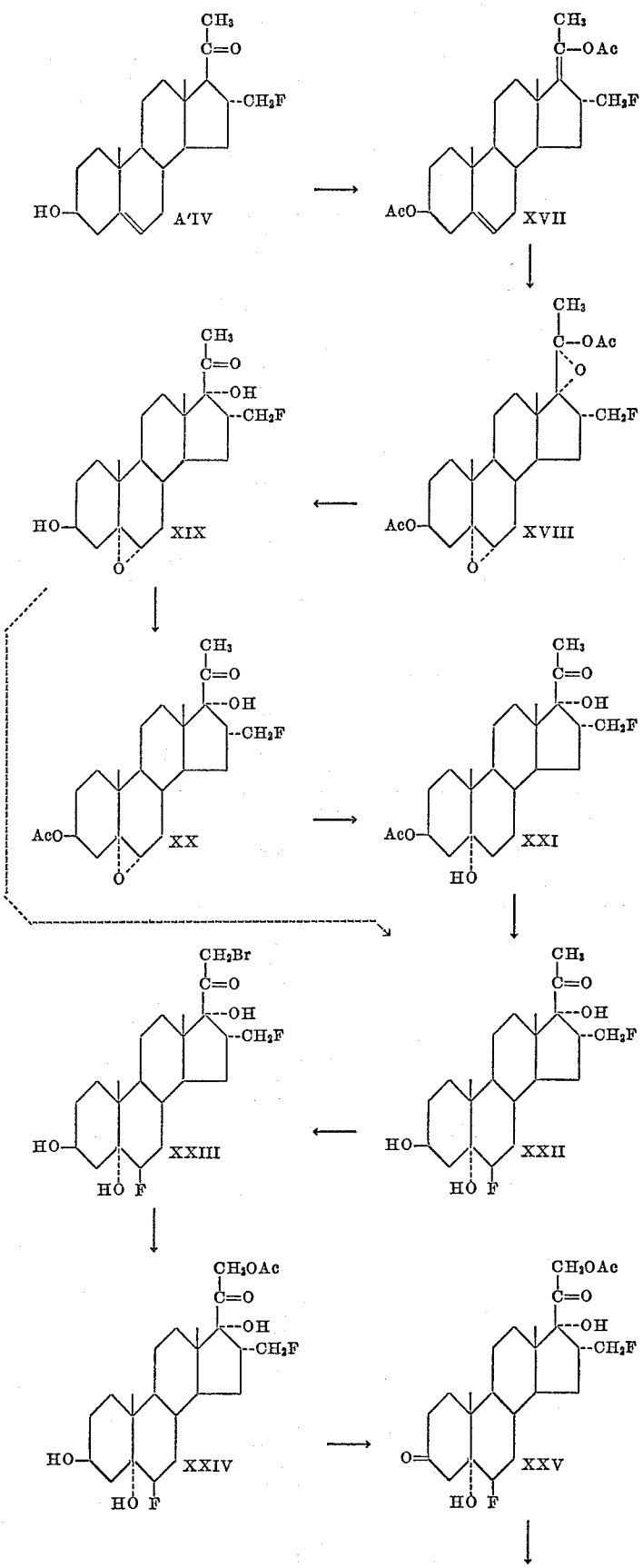

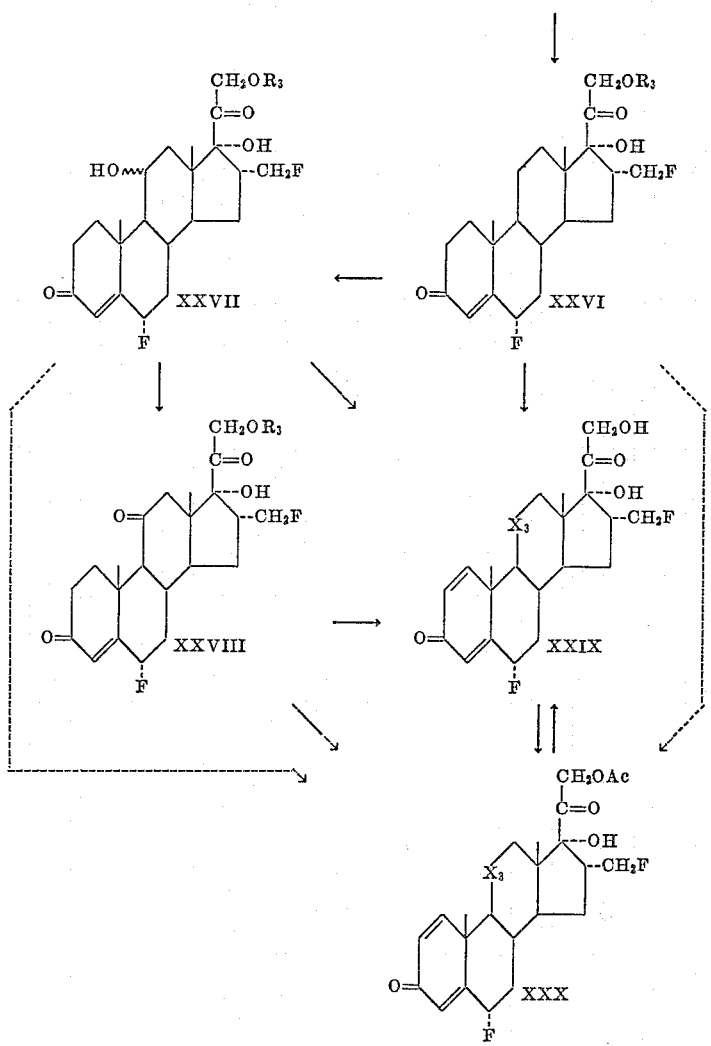

wherein $X_3$ is the methylene radical, the carbonyl radical or the hydroxymethylene radical and wherein Ac and $R_3$ have the same meanings as previously given. In this application the wavy line appearing at the 11-position denotes either the $\alpha$ or $\beta$ configuration or mixtures thereof.

The process of preparing the compounds of Group B of the present invention involves esterifying 3β-hydroxy-16α-fluoromethyl-5-pregnen-20-one (A′–IV), e.g., with acetic anhydride and a strong acid catalyst, to produce 3β,20-dihydroxy-16α-fluoromethyl-5,17(20)-pregnadiene 3,20-diacetate (XVII) which is then converted, preferably without isolation, with a peracid, e.g., peracetic or perbenzoic acid, to 3β,20-dihydroxy-5α,6α,17α,20-diepoxy-16α-fluoromethylpregnane 3,20 - diacetate (XVIII), in exactly the manner that pregnenolone has been converted to the diepoxide of its 3,20-diacetate. This compound is hydrolyzed, preferably without isolation, with aqueous base, e.g., sodium hydroxide or potassium hydroxide, to produce 3β-17α-dihydroxy-5α,6α-epoxy-16α-fluoromethylpregnan-20-one (XIX). A by-product in the above series of reactions is the corresponding 5β,6β-epoxide. This compound is desirably separated from the desired 5α,6α-epoxide, e.g., by fractional crystallization of XVIII or by converting the mixture of XIX and the corresponding 5β,6β-epoxide to a 3-acylate thereof (XX), e.g., formate, acetate, trifluoro acetate, benzoate, preferably a lower-hydrocarbon acylate, and separating these epoxides, e.g., by known methods of chromatography or fractional crystallization. The epoxide opening step is carried out according to the procedure of U.S. Patent 2,838,497, i.e., 3β, 17α-dihydroxy-5α,6α-epoxy-16α-fluoromethylpregnan - 20-one (XIX) or a 3-acylate thereof (XX) is converted with anhydrous hydrogen fluoride in chloroform or methylene chloride in the presence of tetrahydrofuran at −60° C. to +20° C., or aqueous hydrogen fluoride, e.g., at 0° to 30° C., to 3β,5α,17α-trihydroxy-6β-fluoro-16α-fluoromethylpregnan-20-one (XXII) and 3β,5α,17α-trihydroxy-6β-fluoro-16α-fluoromethylpregnan - 20 - one 3 -acylate (XXI), respectively. The latter compound (XXI) is hydrolyzed with aqueous acid, e.g., hydrochloric, sulfuric or boron trifluoride in methanol, to produce the former compound (XXII), which is then brominated, e.g., with a molar equivalent of bromine in chloroform or acetic acid to produce 3β,5α,17α-trihydroxy-6β-fluoro - 16α - fluoromethyl-21-bromopregnan-20-one (XXIII). Reaction of this compound with alkali-metal lower-hydrocarbon acylate, e.g., potassium acetate, sodium acetate, sodium formate, sodium propionate, potassium β-cyclopentylpropionate, sodium benzoate, etc., is productive of 3β,5α,17α,21-tetrahydroxy-6α-fluoro-16α-fluoromethylpregnan-20 - one 21-acylate (XXIV). Oxidation of this compound with sodium dichromate in glacial acetic acid, chromic anhydride and aqueous sulfuric acid in acetone or methylene chloride or an N-haloamide or N-haloimide in pyridine is productive of 5α,17α,21-trihydroxy-6β-fluoro-16α-fluoromethylpregnane-3,20-dione 21-acylate (XXV). Reaction of this compound with acid, e.g., hydrogen chloride in CHCl₃, preferably in the presence of less than 2% of a lower-alkanol, e.g., ethanol or t-butyl alcohol, is productive of 6α - fluoro-16α-fluoromethyl-17α,21-dihydroxy-4-pregnene-3,20-dione 21 - acylate (XXVI), which is hydrolyzed with base according to known procedures, e.g., the hydrolysis of hydrocortisone 21-acylates to hydrocortisone, to give 6α-fluoro-16α-fluoromethyl-17α,21-dihydroxy-4-pregnene-3,20-dione (XXVI).

The 6α-fluora-16α-fluoromethyl-17α,21 dihydroxy-4-pregnene-3,20-dione or a 21-acylate thereof (XXVI) is then converted to 6α-fluoro-16α-fluoromethylhydrocortisone and the 21-acylates thereof (XXVII), by reaction with an 11β-hydroxylating species of fungus, e.g., *Cunninghamella blakesleeana, Curvularia lnata*, Trichothecium roseum, etc., according to procedures well known in the art, e.g., U.S. Patent 2,602,769. The free alcohol (XXVI) is usually employed as the starting material in the fermentation reaction, however the 21-acylates (XXVI) can be used. In these cases the 21-ester is generally saponified during the fermentation to give the 21-free alcohol (XXVII), which can be reesterified by known 21-esterification methods.

Alternatively 6α-fluoro-16α-fluoromethyl-17α,21-dihydroxy-4-pregnene-3,20-dione or a 21-acylate thereof (XXVI) can be converted to 6α-fluoro-11α,17α,21-trihydroxy-16α-fluoromethyl-4-pregnene-3,20-dione or a 21-acylate thereof (XXVII) by reaction with an 11α-hydroxylating species of fungus, according to the procedure of U.S. Patent 2,735,800 for converting 17α,21-dihydroxy-4-pregnene-3,20-dione to 11α,17α,21-trihydroxy-4-pregnene-3,20-dione. The free alcohol (XXVI) is usually employed as the starting material, however the 21-acylates can be used. In these cases the 21-ester is generally saponified during the fermentation giving the free alcohol (XXVII), which can be reesterified at the 21-position by known selective 21-esterification methods, e.g., U.S. Patent 2,735,800.

The 6α-fluoro-16α-fluoromethylhydrocortisone, 6α-fluoro - 11α,17α,21 - trihydroxy - 16α - fluoromethyl - 4 - pregnene-3,20-dione or the 21-acylates thereof (XXVII) are then oxidized to 6α-fluoro-16α-fluoromethylcortisone or the corresponding 21-acylate, respectively, in accordance with known methods for oxidizing the 11β-hydroxy group to the 11-keto group hereinbefore described, e.g., N-bromacetamide or chromic acid.

The compounds of Formulae XXVI, XXVII and XXVIII are dehydrogenated at the 1,2-position by fermentative or chemical dehydrogenation. Fermentative dehydrogenation comprises the use of microorganisms such as Septomyxa, Corynebacterium, Fusarium, and the like, under fermentation conditions well known in the art (e.g., U.S. 2,602,769, 2,902,410 and 2,902,411). Where Septomyxa is used to effect the dehydrogenation it is found to be advantageous to use with the substrate and medium a steroid promoter. The free alcohols are usually employed as starting material for the fermentative dehydrogenation process. However, the corresponding 21-acylates can be used. In these cases the 21-ester group is generally saponified during the fermentation process giving the corresponding free alcohol. Chemical dehydrogenation can be carried out with selenium dioxide according to procedures well known in the art [e.g., Meystre et al., Helv. Chim. Acta, 39, 734 (1956)]. The 21-acylates are generally preferred as starting material in the chemical dehydrogenation reaction giving the corresponding compounds of Formula XXX. The 21-acylates thus obtained can be saponified, if desired, by methods known in the art to give the corresponding 21-free alcohols.

Group C.—The novel 9α-halocortisones and 21-acylates thereof of Group C of this invention are represented by the following formulae:

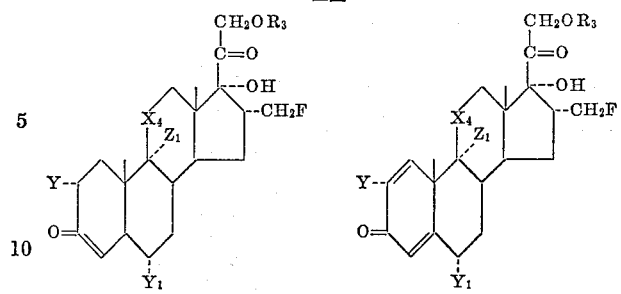

wherein Y, Y₁, and R₃ have the same meanings as previously given, X₄ is the β-hydroxymethylene radical or the carbonyl radical, Z₁ is halogen having an atomic weight from 19 to 127, inclusive, i.e., fluorine, bromine, chlorine or iodine.

The processes for the production of the compounds of Group C of this invention are illustratively represented by the following reaction scheme:

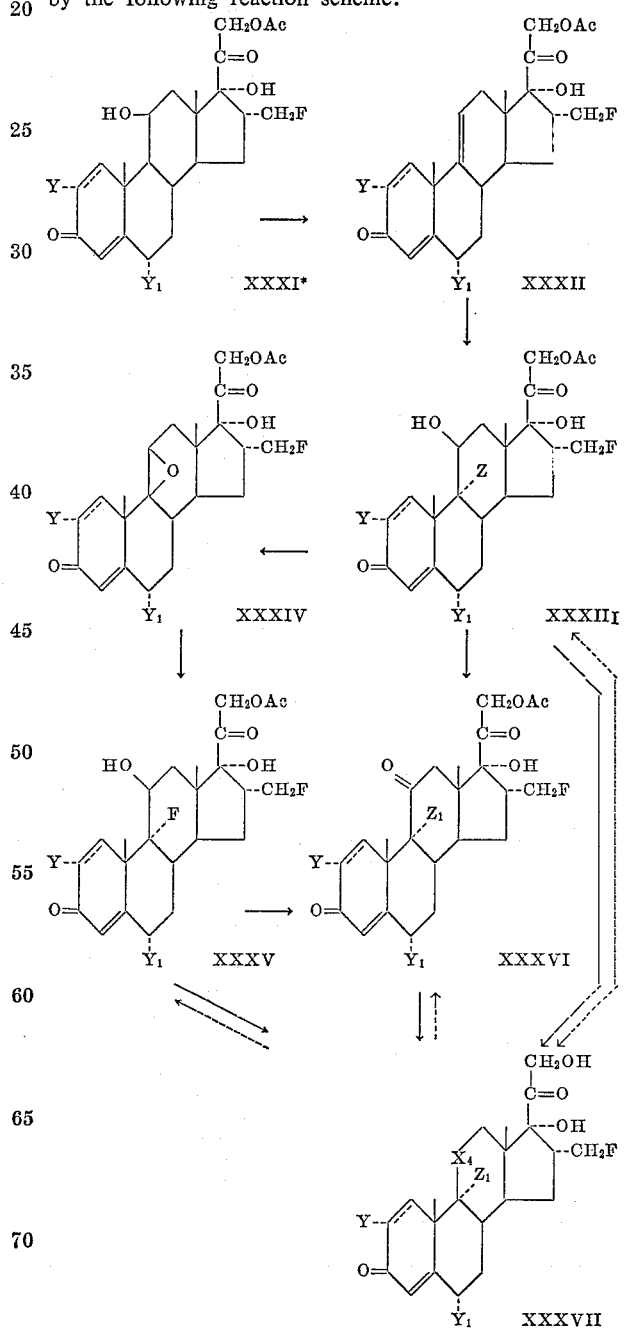

*XXXI is combined from Formulae XII, XVI, XVII and XXX.

wherein X, Y, $Y_1$, $Z_1$ and Ac have the same meanings as previously given and Z is a halogen having an atomic weight from 35 to 127, inclusive, i.e., bromine, chlorine or iodine. The dotted line appearing in Formulae XXXI to XXXVII represents a $\Delta^1$ double bond which may or may not be present.

The 9α-halo compounds of Group C of this invention are prepared according to the procedure of U.S. Patent 2,852,511 as follows: dehydrating 16α-fluoromethylhydrocortisone 21-acylate (XXXI) or the corresponding 2α-methyl, 6α-methyl or 6α-fluoro analogues thereof, or 1-dehydro - 16α - fluoromethylhydrocortisone 21 - acylate (XXXI) or the corresponding 2-methyl, 6α-methyl or 6α-fluoro analogues thereof, represented by Formula XXXI, with an N-haloamide, e.g., N-bromoacetamide in pyridine followed by anhydrous sulfur dioxide produces the corresponding $\Delta^{9(11)}$ compounds (XXXII), i.e., 16α-fluoromethyl-17α,21-dihydroxy - 4,9(11) - pregnadiene - 3,20-dione 21-acylate, the 2α-methyl, 6α-methyl and 6α-fluoro analogues thereof and the corresponding 1,4-pregnadienes, respectively. Addition of a hypohalous acid, i.e., hypobromous, hypochlorous or hypoiodous, to these latter compounds produces the corresponding 9α-halo compounds (XXXIII), i.e., 9α-halo-16α-fluoromethylhydrocortisone 21-acylate, the 2α-methyl, 6α-methyl and 6α-fluoro analogues thereof and the corresponding 1-dehydro-compounds, respectively, which by treatment with base, e.g., anhydrous potassium acetate, yield the corresponding epoxy compounds (XXXIV), i.e., 16α-fluoromethyl-9β,11β - epoxy - 17α,21-dihydroxy-4-pregnene-3,20-dione 21-acylate, the 2α-methyl, 6α-methyl and 6α-fluoro analogues thereof and the corresponding 1,4-pregnadienes, respectively. Treatment of these epoxy compounds with hydrogen fluoride or other hydrogen fluoride releasing agents produces the corresponding 9α-fluoro compounds (XXXV), i.e., 9α-fluoro-16α-fluoromethylhydrocortisone 21-acylate, the 2α-methyl, 6α-methyl and 6α-fluoro analogues thereof and the corresponding 1-dehydro compounds, respectively. Oxidation of the 11β-hydroxy compounds represented by Formulae XXXIII and XXXV, preferably the 21-acetates with, e.g., chromic acid in acetic acid provides the corresponding 11-keto compounds (XXXVI), e.g., 9α-fluoro-16α-fluoromethyl-cortisone 21-acylate, the 2α-methyl, 6α-methyl and 6α-fluoro analogues thereof, the corresponding 1-dehydro compounds and the other corresponding 9α-bromo, 9α-chloro and 9α-iodo 11-keto compounds represented by Formula XXXVI. Hydrolysis of the 21-esters of Formulae XXXIII, XXXV and XXXVI with a base, e.g., aqueous sodium hydroxide or sodium bicarbonate, provides the corresponding free 21-alcohols represented collectively by Formula XXXVII, e.g., 9α-fluoro-16α-fluoromethylhydrocortisone, 9α-fluoro-16α-fluoromethylcortisone, 1 - dehydro - 9α - fluoro-16α-fluoromethylhydrocortisone, 1-dehydro-9α-fluoro-16α-fluoromethylcortisone, the corresponding 2α-methyl, 6α-methyl and 6α-fluoro analogues thereof and the other corresponding 9α-bromo, 9α-chloro and 9α-iodo 21-free alcohols represented by Formula XXXVII.

The 21-free alcohols (XXXVII) thus produced can be reesterified by known 21-acylation methods to produce the corresponding 21-acylates wherein the acyl radical is that of an organic carboxylic acid, preferably that of a hydrocarbon carboxylic acid containing from 1 to 12 carbon atoms, inclusive, e.g., those acids named in Example 36A.

Alternatively the $\Delta^4$-compounds represented by Formula XXXVII and the 21-acylates thereof can be converted to the corresponding $\Delta^{1,4}$-compounds by known fermentative or chemical 1,2-dehydrogenation procedures hereinbefore described in Groups A and B, above, e.g., using Septomyxa (U.S. Patents 2,902,410 and 2,902,411) or selenium dioxide.

Group D.—The novel 21-desoxy and 21-fluoro compounds of Group D and the 17-acylates thereof are represented by the following formulae:

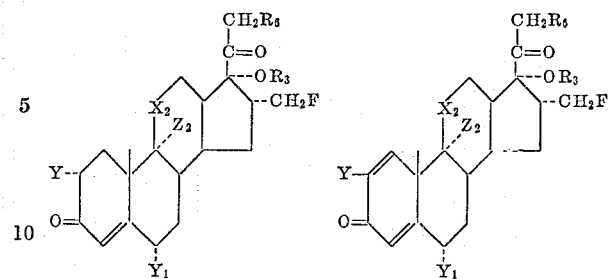

wherein $R_3$, Y, $Y_1$, $X_2$ and $Z_2$ have the same meanings as previously given, $R_6$ is hydrogen or fluorine and wherein when $X_2$ is the methylene radical $Z_2$ is hydrogen.

The processes for the production of the compounds of Group D of this invention are illustratively represented by the following reaction scheme:

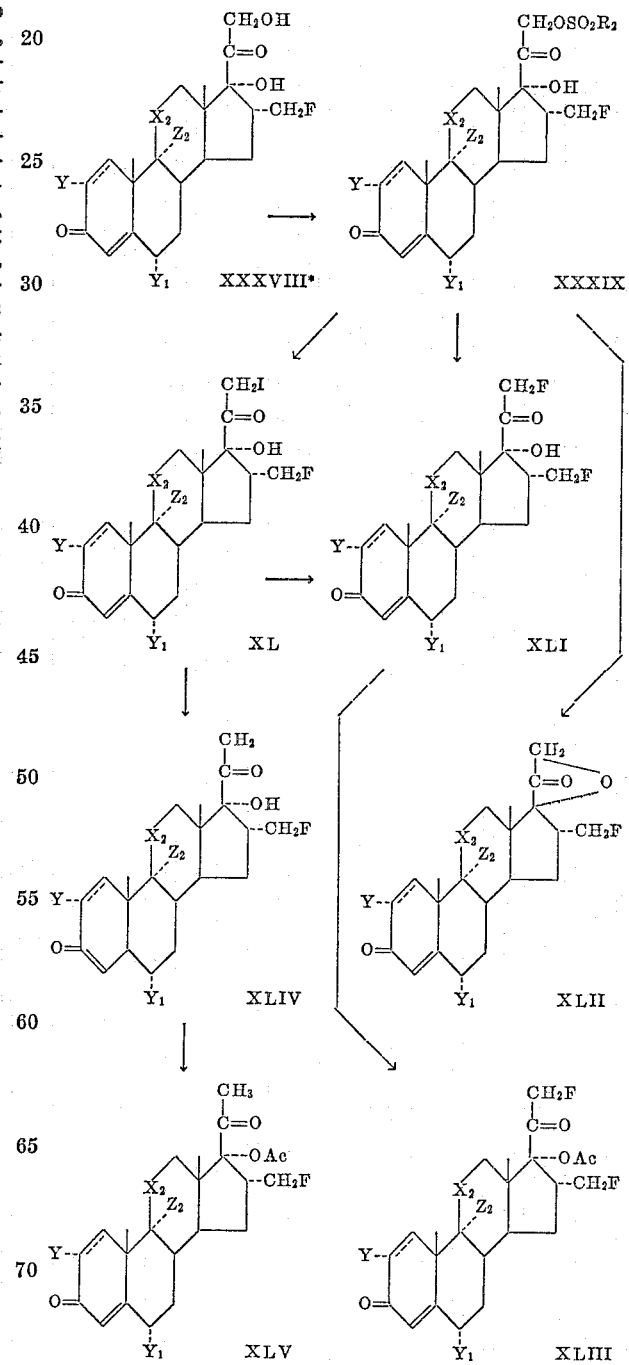

*Formula XXXVIII is combined from Formulae XIV, XV, XXVI, XXVII, XXVIII, XXIX and XXXVII.

wherein Ac, $R_2$, Y, $Y_1$, $X_2$ and $Z_2$ have the same meanings as previously given and wherein when $X_2$ is the methylene radical $Z_2$ is limited to hydrogen. The dotted line appearing in Formulae XXXVIII to XLV represents a $\Delta^1$ double bond which may or may not be present.

The 21-fluoro compounds of Group D of the invention are prepared according to the procedure of U.S. Patents 2,838,535 or 2,838,543, i.e., by treating the compounds of Formula XXXVIII with an organic sulfonyl halide such as methanesulfonyl chloride, toluenesulfonyl chloride, toluenesulfonyl bromide, benzenesulfonyl chloride, naphthylenesulfonyl chloride, or the like, to obtain the corresponding 21-sulfonate (XXXIX), treating the thus-produced 21-alkyl or aryl sulfonate (XXXIX) with sodium iodide in acetone solution to obtain the corresponding 21-iodo compounds (XL), treating the thus-obtained 21-iodo compounds with silver fluoride, preferably in acetonitrile solution to obtain the corresponding 21-fluoro compounds (XLI). Alternatively, the 21-sulfonate (XXXIX), preferably the 21-methylsulfonate, can be treated directly with potassium fluoride in dimethyl sulfoxide, to produce the 21-fluoro compounds directly. When this alternate process is employed, the corresponding 17,21-epoxy compounds (XLII) are concomitantly produced.

The 21-unsubstituted compounds of the present invention are prepared according to the procedure of U.S. Patents 2,838,541 or 2,838,542, i.e., by treating a 21-iodo compound (XL), with a reducing agent such as sodium thiosulfate, sodium bisulfite, potassium bisulfite, or the like, in an aqueous organic solvent mixture, to obtain the corresponding 21-unsubstituted compound (XLIV).

Alternatively 16α-fluoromethyl-17α-hydroxy-4-pregnene-3,20-dione (XLIV), is prepared by treating the selected 3β,17α-dihydroxy-5α,6α-epoxy-16α-fluoromethylpregnan-20-one 3-acylate (XX) with zinc and sodium iodide in acetic acid to produce the corresponding 3β,17α-dihydroxy-16α-fluoromethyl-5-pregnen-20-one 3-acylate which is then hydrolyzed by known methods, e.g., aqueous sodium hydroxide to give the free alcohol, 3β,17α-dihydroxy-16α-fluoromethyl-5-pregnen-20-one, which is then oxidized (Oppenauer oxidation) with an aluminum alkoxide, e.g., aluminum isopropoxide to give 16α-fluoromethyl-17α-hydroxy-4-pregnene-3,20-dione (XLIV). Preferably the 3β,17α-dihydroxy-16α-fluoromethyl-5-pregnen-20-one is dissolved in acetone and oxidized with aqueous chromic acid in the presence of sulfuric acid and then isomerized with, e.g., oxalic acid or dilute alkali to give 16α - fluoromethyl - 17α - hydroxy - 4 - pregnene - 3,20-dione (XLIV).

The compounds of Formulae XLI and XLIV as esterified at the 17-position according to known 17-esterification methods, e.g., an acid anhydride in the presence of an esterification catalyst, e.g., acetic anhydride and p-toluenesulfonic acid, to produce the corresponding 17-acylates (XLIII and XLV), respectively, wherein the acyl radical is that of an organic carboxylic acid, preferably that of a hydrocarbon carboxylic acid containing from 1 to 12 carbon atoms, inclusive, e.g., those acids listed in Example 36A.

Alternatively the 9α-halo compounds represented by Formulae XLI and XLIV wherein $X_2$ is β-hydroxy and $Z_2$ is halogen can be prepared by converting the corresponding compounds of Formulae XLI and XLIV, respectively, wherein $Z_2$ is hydrogen to the corresponding 9α-halo compounds via the 9(11)-dehydro compound in the manner described hereinbefore in Group C above.

Alternatively the $\Delta^4$-compounds of Formulae XLI and XLIV, and the 17-acylates thereof (XLIII) and (XLV), can be converted to the corresponding $\Delta^{1,4}$-compounds by known fermentative or, preferably, chemical 1,2-dehydrogenation procedures hereinbefore described in Groups A and B, above, e.g., using Septomyxa (U.S. Patents 2,902,-410 and 2,902,411) or selenium dioxide.

Alternatively, the compounds of Formulae XLI and XLIV and the 21-acylates thereof (XLIII and XLV) wherein $X_2$ is the carbonyl radical can be prepared by oxidation of the corresponding 11β-hydroxy compounds by methods known in the art for the oxidation of hydrocortisone acetate to cortisone acetate, e.g., chromic acid, N-bromoacetamide and the like.

PREPARATION 1

*6α-methylpregnane-3,11,20-trione*

A mixture containing 0.5 g. of 6α-methyl-11-ketoprogesterone, t-butyl alcohol and 100 mg. of 5% palladium on charcoal as a catalyst is hydrogenated at a pressure of about 15 p.s.i. (gauge) in a Parr hydrogenation apparatus. When the uptake of hydrogen ceases, the reaction mixture is filtered to remove the catalyst and concentrated. The residue thus obtained is recrystallized from acetone: Skellysolve B hexanes to give 6α-methylpregnane-3,11,20-trione, a light colored crystalline solid. Alternatively, if desired, the residue may be purified by chromatography.

In the same manner substituting as the starting steroid in Preparation 1, 2α-methyl-11-ketoprogesterone, 6α-methylprogesterone or 2α-methylprogesterone, there is thus produced, 2α-methylpregnane-3,11,20-trione, 6α-methylpregnane-3,20-dione and 2α-methylpregnane-3,20-dione, respectively.

PREPARATION 2

*3,20-diacetoxy-6α-methyl-3,17(20)-pregnadien-11-one*

A mixture of 300 mg. of 6α-methylpregnane-3,11,20-trione, 15 ml. of acetic anhydride and 140 mg. of p-toluene sulfonic acid monohydrate is heated to boiling and allowed to distill slowly until most of the excess acetic anhydride is distilled. The last traces of excess acetic anhydride are removed under vacuum, and the resulting residue is cooled and dissolved in ether. The ether solution is washed with cold 10% aqueous sodium bicarbonate solution and dried over sodium sulfate. The ether is then evaporated to give a residue of 3,20-diacetoxy-6α-methyl-3, 17(20)-pregnadien-11-one.

PREPARATION 3

*4,17α-dibromo-6α-methylpregnane-3,11,20-trione*

150 mg. of 3,20-diacetoxy-6α-methyl-3,17(20)-pregnadien-11-one is dissolved in t-butyl alcohol and treated with a solution of 125 mg. of N-bromosuccinimide in 15 ml. of t-butyl alcohol and with 5 ml. 1 N sulfuric acid. The mixture is allowed to stand at room temperature until the reaction is complete. The reaction mixture is then concentrated in vacuo, diluted with water and the resulting product collected on a filter. Recrystallization from alcohol gives 4,17α-dibromo-6α-methylpregnane-3,11,20-trione, a light colored crystalline solid.

PREPARATION 4

*6α-methyl-17α-bromo-4-pregnene-3,11,20-trione*

A solution of 1 millimole of 4,17α-dibromo-6α-methylpregane-3,11,20-trione dissolved in dioxane is admixed with 2.5 ml. of an aqueous solution containing 2 millimoles of semicarbazide and 2 millimoles of anhydrous sodium acetate. The mixture is stirred overnight at room temperature and thereafter a solution of 0.52 g. of pyruvic acid in 5 ml. of water is added. The reaction mixture is then heated to about 70° C. for a period of about 3 hours, cooled and poured into water. The thus produced 6α-methyl-17α - bromo-4-pregnene-3,11,20-trione is extracted from the aqueous mixture with methylene chloride. The extracts are combined, washed with 1% aqueous sodium hydroxide solution, and water until the wash water is neutral, dried over anhydrous sodium sulfate and concentrated. The residue is purified by chromatography over Florisil (synthetic magnesium silicate) and recrystallized from acetone:Skellysolve B hexanes to give 6α-methyl-17α-bromo-4-pregnene - 3,11,20-trione, a light colored crystalline solid.

PREPARATION 5

6α-methyl-4,16-pregnadiene-3,11,20-trione 1.0 g. of 6α-methyl-17α-bromo-4-pregnene-3,11,20-trione is dissolved in dry pyridine and heated under reflux for a period of about 24 hours. The pyridine is then removed by distillation at reduced pressure and the residue thus obtained is dissolved in benzene. Water is then added to the benzene solution and the layers are separated. The benzene layer is washed with dilute hydrochloric acid and water until neutral, dried over anhydrous magnesium sulfate, and concentrated to dryness at reduced pressure. The residue thus obtained is recrystallized from ethyl acetate in Skellysolve B hexanes to give 6α-methyl-4,16-pregnadiene-3,11,20-trione, a light colored crystalline solid.

In the same manner substituting as the starting steroid in Preparation 2 the other pregnanes prepared and named in the second paragraph of Preparation 1 and following the procedures of Preparations 2 through 5, consecutively, there are thus produced as products of Preparation 5 the corresponding 4,16-pegnadienes as light colored crystalline solids, i.e., 2α-methyl-4,16-pregnadiene-3,11,20-trione, 6α-methyl-4,16-pregrandiene-3,20-dione and 2α-methyl-4,16-pregnadiene-3,20-dione, respectively.

The following examples are illustrative of the processes and products of the present invention.

EXAMPLE 1A

4,16-pregnadiene-3,11,20-trione 3-ethylene ketal (II)

A mixture of 31.68 g. of 4,16-pregnadiene-3,11,20-trione (I), 500 ml. of 2-methyl-2-ethyldioxolane, and 300 mg. of p-toluenesulfonic acid monohydrate was heated to reflux for a period of about 4 hours. Water was removed during the reflux period by use of a water separator. The reaction mixture was cooled and methylene chloride was added. The methylene chloride solution was washed consecutively with sodium bicarbonate solution and water and then dried over sodium sulfate. The methylene chloride was then removed by evaporation and the resulting residue was dissolved in benzene and chromatographed on 1000 g. of acid-washed alumina. The column was eluted with increasing proportions of ether in benzene; crystalline material was obtained from the eluates containing up to 50% ether:benzene. The crystalline material thus obtained was combined and recrystallized from acetone:Skellysolve B hexanes to give 8.5 g. of 4,16-pregnadiene-3,11,20-trione 3-ethylene ketal melting at 228–233° C. A second crop of crystals was obtained from the mother liquors giving 1.0 g. of 4,16-pregnadiene-3,11,20-trione 3-ethylene ketal melting at 205–211° C. The crystalline material was combined and recrystallized from acetone:Skellysolve B hexanes to give 4,16-pregnadiene-3,11,20-trione 3-ethylene ketal (II) melting at 233–235° C.;

$\lambda_{max}^{EtOH}$ 234.5 m$\mu$, $a_M$ 9,500

The infrared absorption sepctrum agreed with the assigned structure.

*Analysis.*—Calcd. for $C_{23}H_{30}O_4$: C, 74.56; H, 8.16. Found: C, 74.43; H, 8.37.

EXAMPLE 1A'

4,16-pregnadiene-3,11,20-trione 3-ethylene ketal (II)

A mixture of 195.0 g. of 4,16-pregnadiene-3,11,20-trione (I), 2 liters of benzene, 500 ml. of ethylene glycol, and 5 g. of p-toluenesulfonic acid monohydrate was heated to reflux for a period of about 3 hours. Water was removed during the reflux period using a conventional water separator. The reaction mixture was cooled and washed with 500 ml. of saturated sodium bicarbonate solution and the benzene layer separated. The aqueous layer was extracted 3 times with benzene. The benzene extracts were combined, washed with water and dried over anhydrous sodium sulfate. The dry benzene solution was evaporated until crystallization occurred to give 44.0 g. of 4,16-pregnadiene-3,11,20-trione 3-ethylene ketal (II) melting at 215–230° C. The mother liquors from the crystallization were chromatographed on 2 kg. of Florisil synthetic magnesium silicate. The column was eluted with inceasing proportions of acetone in Skellysolve B hexanes. The eluates containing from 7% acetone:Skellysolve B hexanes to 10% acetone: Skellysolve B hexanes gave an additional 34.3 g. of 4,16-pregnadiene-3,11,20-trione 3-ethylene ketal (II).

In the same manner, following the procedure of Examples 1A or 1A' but substituting as starting material other compounds of Formula I, i.e., 4,16-pregnadiene-3, 20-dione, 2α-methyl-4,16-pregnadiene - 3,11,20 - trione, 2α-methyl-4,16-pregnadiene-3,20-dione, 6α-methyl-4,16-pregnadiene-3,11,20-trione or 6α-methyl-4,16-pregnadiene-3,20-dione, is productive of the 3-ethylene ketals represented by Formula II, i.e., 4,16-pregnadiene-3,20-dione 3-ethylene ketal, 2α-methyl-4,16 - pregnadiene-3,11,20-trione 3-ethylene ketal, 2α-methyl-4,16-pregnadiene-3,20-dione 3-ethylene ketal, 6α-methyl-4,16-pregnadiene-3,11,20-trione 3-ethylene ketal and 6α-methyl-4,16-pregnadiene-3,20-dione 3-ethylene ketal, respectively.

EXAMPLE 2A

16α-cyano-4-pregnene-3,11,20-trione 3-ethylene ketal (III)

A mixture of 9.5 g. of 4,16-pregnadiene-3,11,20-trione 3-ethylene ketal (II), 15.0 g. of potassium cyanide, 100 ml. of dioxane and 500 ml. of methanol was heated in a nitrogen atmosphere under reflux for 3 hours. The reaction mixture was cooled, poured into about 2 liters of water, and extracted with methylene chloride. The methylene chloride extracts were combined, washed with water, dried over sodium sulfate and evaporated to remove the solvent. The residue thus obtained was dissolved in benzene and filtered through a column containing 20 g. of acid-washed alumina which had been previously wetted with benzene. The eluate was evaporated to remove the benzene and the residue was recrystallized from acetone: Skellysolve B hexanes to give 6.15 g. of 16α-cyano-4-pregnene-3,11,20-trione 3-ethylene ketal (III) melting at 236–242° C. The product thus obtained was recrystallized twice from acetone:methanol to give 16α - cyano - 4 - pregnene-3,11,20-trione 3-ethylene ketal (III) melting point at 224–244° C. The infrared spectrum agreed with the assigned structure. Optical rotatory dispersion analysis indicated that the compound had the 17β-configuration.

*Analysis.*—Calcd. for $C_{24}H_{31}O_4N$: C, 72.51; H, 7.86. Found: C, 72.49; H, 7.94.

EXAMPLE 2A'

16α-cyano-4-pregnene-3,11,20-trione 3-ethylene ketal (III)

A mixture of 63.3 g. of 4,16-pregnadiene-3,11,20-trione 3-ethylene ketal (II), 75.0 g. of potassium cyanide, 2.5 liters of methanol and 450 ml. of dioxane was heated under reflux in a nitrogen atmosphere for a period of about 3 hours. At the end of the reflux period the reaction mixture was cooled to room temperature and the solvent was removed in vacuo until crystallization occurred. Two liters of water was then added and the mixture was stirred for a few minutes; the crystalline material thus obtained was collected on a filter, washed with water and dried in vacuo at room temperature giving 47.0 g. of 16α-cyano-4-pregnene-3,11,20-trione 3-ethylene ketal melting at 237–242° C.

In the same manner, following the procedure of Example 2A or 2A' but substituting as starting material other 4,16-pregnadiene 3-ethylene ketals, represented by Formula II, i.e., those listed in the second paragraph of Example 1A' for 4,16-pregnadiene-3,11,20-trione 3-ethylene ketal is productive of the corresponding 16α-cyano compound represented by Formula III, i.e., 16α-cyano-4-pregnene - 3,20 - dione 3 - ethylene ketal, 2α-methyl-16α- cyano - 4 - pregnene - 3,11,20-trione 3-ethylene ketal, 2α-methyl - 16α - cyano - 4 - pregnene-3,20-dione 3-ethylene ketal, 6α - methyl - 16α - cyano-4-pregnene-3,11,20-trione 3 - ethylene ketal and 6α - methyl-16α-cyano-4-pregnene-3,20-dione 3-ethylene ketal, respectively.

EXAMPLE 3A

*16α-cyano-4-pregnene-3,11,20-trione 3,20-bis (ethylene ketal) (IV)*

A mixture of 1.1 g. of 16α-cyano-4-pregnene-3,11,20-trione 3-ethylene ketal (III), 150 ml. of benzene, 3.0 ml. of ethylene glycol and 25 mg. of p-toluenesulfonic acid monohydrate was heated to boiling under reflux for a period of about 6 hours. Water was removed during the reflux period by incorporating a conventional water separator to the reflux condenser. The reaction mixture was then cooled and sodium bicarbonate solution was added. The organic layer was separated, washed with water, dried over sodium sulfate and the solvent was removed in vacuo. The residue thus obtained was recrystallized from acetone: Skellysolve B hexanes giving 640 mg. of 16α-cyano-4-pregnene-3,11,20-trione 3,20-bis(ethylene ketal) (IV) melting at 251–253° C.

In the same manner, following the procedure of Example 3A but substituting as starting material other 16α-cyano-4-pregnene 3-ethylene ketals, represented by Formula III, i.e., those listed in the second paragraph of Example 2A′, for 16α-cyano-4-pregnene-3,11,20-trione 3-ethylene ketal is productive of the corresponding bis(ethylene ketal) represented by Formula IV, i.e., 16α-cyano-4-pregnene-3,20-dione bis (ethylene ketal), 2α-methyl-16α-cyano-4-pregnene-3,11,20-trione 3,20-bis(ethylene ketal), 2α - methyl-16α-cyano-4-pregnene-3,20-dione bis(ethylene ketal), 6α-methyl-16α-cyano-4-pregnene-3,11,20-trione 3,20-bis(ethylene ketal) and 6α-methyl-16α-cyano-4-pregnene-3,20-dione bis(ethylene ketal), respectively.

EXAMPLE 4A

*16α-cyano-4-pregnene-3,11,20-trione (16α-cyano-11-ketoprogesterone) (IIIa)*

A solution of 1.01 g. of 16α-cyano-4-pregnene-3,11,20-trione 3-ethylene ketal (III) in acetone containing 5 ml. of water and 3 drops of 25% sulfuric acid was allowed to stand for a period of about 18 to 24 hours at room temperature. Sodium bicarbonate solution was then added and the acetone was removed in vacuo at room temperature until crystallization commenced. An additional 100 ml. of water was then added, the temperature of the mixture was lowered to 0° C. and crystallization was allowed to proceed. The solid material was collected by filtration, dried, and crystallized twice from acetone:Skellysolve B hexanes to give 500 mg. of 16α-cyano-4-pregnene-3,11,20-trione melting at 230–235° C. A final crystallization from methanol raised the melting point to 238–240° C., $$\lambda_{max}^{EtOH}\ 238\ m\mu,\ a_M\ 14{,}500$$

The infrared spectrum supported the assigned structure. Optical rotatory dispersion analysis showed the 17β-side chain.

*Analysis.*—Calcd. for $C_{22}H_{27}O_3N$: C, 74.75; H, 7.70. Found: C, 14.63; H, 7.60.

In the same manner, following the procedure of Example 4A but substituting as starting material other 16α-cyano-4-pregnene 3-ethylene ketals represented by Formula III, i.e., those compounds listed in the second paragraph of Example 3A, for 16α-cyano-4-pregnene-3,11,20-trione 3-ethylene ketal is productive of the corresponding free 3-keto compound represented by Formula IIIa, i.e., 16α - cyano - 4 - pregnene - 3,20-dione, 2α-methyl-16α-cyano - 4-pregnene-3,11,20-trione, 2α-methyl-16α-cyano-4-pregnene - 3,20 - dione, 6α-methyl-16α-cyano-4-pregnene-3,11,20 - trione and 6α - methyl - 16α-cyano-4-pregnene-3,20-dione, respectively.

EXAMPLE 5A

*16α - carboxy - 4-pregnene-3,11,20-trione 3,20-bis(ethylene ketal) (V) and 16α-carbomethoxy-4-pregnene-3,11, 20-trione 3,20-bis(ethylene ketal) (V)*

A mixture of 13.7 g. of 16α-cyano-4-pregnene-3,11,20-trione 3,20-bis(ethylene ketal) (IV), 400 ml. of ethylene glycol and 25 g. of potassium hydroxide dissolved in 100 ml. of water was heated to reflux in a slow stream of nitrogen for a period of about 20 to 24 hours. After cooling, water was added and the alkaline solution was extracted with methylene chloride. The aqueous layer was then cooled to 0° C., carefully acidified to about pH 4 and rapidly extracted with ethyl acetate:methylene chloride. The combined ethyl acetate:methylene chloride extracts were washed with water until netural, dried over sodium sulfate and the solvent removed by evaporation to give a residue comprising 16α-carboxy-4-pregnene-3,11,20-trione 3,20-bis(ethylene ketal) melting at 225–245° C. which can be purified by either chromatography or crystallization on both to give 16α-carboxy-4-pregnene-3,11,20-trione, a crystalline solid.

The residue thus obtained was dissolved in 200 ml. of methylene chloride and 500 ml. of methanol and esterified with excess ethereal diazomethane solution for 3 hours at room temperature. The solvent was removed by evaporation and the residue thus obtained crystallized from acetone:Skellysolve B hexanes to give 9.8 g. of 16α-carbomethoxy - 4 - pregnene-3,11,20-trione 3,20-bis (ethylene ketal) melting at about 200° C. Two recrystallizations from the same solvent gave 16α-carbomethoxy-4-pregnene-3,11,20-trione 3,20-bis(ethylene ketal) (V) melting at 224–225° C. The infrared spectrum agreed with the assigned structure.

*Analysis.*—Calcd. for $C_{27}H_{38}O_7$: C, 68.33; H, 8.07. Found: C, 68.29; H, 7.94.

In the same manner, following the procedure of Example 5A but substituting as starting material other 16a-cyano-4-pregnene 3,20-bis(ethylene ketals) represented by Formula IV, i.e., those listed in the second paragraph of Example 3A for 16α-cyano-4-pregnene-3,11,20-trione 3,20-bis(ethylene ketal), hydrolysis with potassium hydroxide is productive of the corresponding 16α-carboxy compound represented by Formula V, i.e., 16α-carboxy-4-pregnene-3,20-dione bis(ethylene ketal), 2α-methyl-16α-carboxy-4-pregnene-3,11,20 - trione 3,20 - bis(ethylene ketal), 2a-methyl-16α-carboxy-4-pregnene-3,20-dione bis (ethylene ketal), 6α - methyl - 16α-carboxy-4-pregnene-3,11,20-trione 3,20-bis(ethylene ketal), and 6α-methyl-16α-carboxy-4-pregnene3,20-dione bis(ethylene ketal), respectively, all crystalline solids.

The 16α-carboxy compounds thus produced can be esterified with ethereal diazomethane solution in the same manner to give the corresponding 16α-carbomethoxy compounds represented by Formula V, i.e., 16α-carbomethoxy-4-pregnene-3,20-dione bis(ethylene ketal), 2α-methyl-16α-carbomethoxy-4-pregnene,3,11,20-trione 3,20-bis(ethylene ketal), 2α-methyl-16α-carbomethoxy-4-pregnene-3,20-dione bis(ethylene ketal), 6α-methyl-16α-carbomethoxy-4-pregnene-3,11,20-trione 3,20-bis(ethylene ketal), and 6α-methyl-16α-cahbomethoxy-4-pregnene - 3,20-dione bis(ethylene ketal), respectively.

EXAMPLE 6A

*11β-hydroxy-16α-hydroxymethyl-4-pregnene-3,20-dione bis(ethylene ketal) (VI)*

A solution of 9.7 g. of 16α-carbomethoxy-4-pregnene-3,11,20-trione 3,20-bis(ethylene ketal) (V) in benzene was added at 0° C. to a stirred suspension of 12.0 g. of lithium aluminum hydride in 150 ml. of ether and 150 ml. benzene. The mixture was heated under reflux for a period of about 4 hours and then cooled in an ice-water bath. The excess lithium aluminum hydride was decomposed by the addition of ethyl acetate and then water. The reaction mixture was then filtered and the organic layer was separated, washed with water and the solvent was removed by evaporation. The crude residue thus obtained was crystallized from ethyl acetate:Skellysolve B hexanes to give 2.4 g. of 11β-hydroxy-16α-hydroxymethyl-4-pregnene-3,20-dione bis(ethylene ketal) (VI) melting at 195–205° C. A second crop of crystals from the mother liquors gave an additional 0.3 g. Recrystallization from acetone:Skellysolve B hexanes gave 11β-hydroxy-16α-hydroxymethyl-4-3,20-dione bis(ethylene ketal melting at 209–211° C. Chromatography of the mother liquors on Florisil synthetic magnesium silicate and elution with 20% acetone:Skellysolve B hexanes gave an additional 0.79 g. of 11β-hydroxy-16α-hydroxymethyl-4-pregnene-3,20 - dione bis(ethylene ketal) melting at 195–205° C. The infrared spectrum supported the assigned structure.

Analysis.—Calcd. for $C_{26}H_{40}O_6$: C, 69.61; H, 8.99. Found: C, 69.61; H, 9.61.

In the same manner, following the procedure of Example 6A but substituting other 16α-carbomethoxy-4-pregnene 3,20-bis(ethylene ketals), represented by Formula V, i.e., those listed in the fourth paragraph of Example 5A, for 16-carbomethoxy-4-pregene-3,11,20-trione 3,20-bis(ethylene ketal) is productive of the corresponding 16α-hydroxymethyl-4-pregnene-3,20-dione bis(ethylene ketal) represented by Formula VI, i.e., 6α-hydroxymethyl-4-pregnene-3,20-dione bis(ethylene ketal), 2α-methyl - 11β-hydroxy-16α-hydroxymethyl - 4 - pregnene-3,20-dione bis(ethylene ketal), 2α-methyl-16α-hydroxymethyl-4-pregnene-3,20-dione bis(ethylene ketal), 6α-methyl - 11β - hydroxy - 16α-hydroxymethyl-4-pregnene-3,20-dione bis(ethylene ketal), and 6α-methyl-16α-hydroxymethyl-4-pregnene-3,20-dione bis(ethylene ketal), respectively.

EXAMPLE 6A'

*11β-hydroxy-16α-hydroxymethyl-4-pregnene-3,20-dione bis(ethylene ketal) (VI)*

A mixture of 5.08 g. of 16α-carboxy-4-pregnene-3,11,20-trione 3,20-bis(ethylene ketal) and 3.5 g. of lithium aluminum hydride in 350 ml. of tetrahydrofuran was refluxed for a period of about 3 hours. The bisketal was introduced into the reatcion mixture employing the Soxhlet technique. The reaction mixture was cooled and then excess lithium aluminum hydride was decomposed by the addition of ethyl acetate and then water followed by filtration to remove the inorganic salts. The organic layer was separated, washed with water and evaporated in vacuo to remove the solvent. The residue thus obtained was crystallized from acetone:methanol to give 3.9 g. of 11β - hydroxy - 16α-hydroxymethyl-4-pregnene-3,20-dione bis(ethylene ketal) (VI).

In the same manner, following the procedure of Example 6A' but substituting other 16α-carboxy-4-pregnene 3,20-bis(ethylene ketals), represented by Formula V, i.e., those listed in the third paragraph of Example 5A for 16-carbomethoxy-4-pregnene - 3,11,20-trione 3,20-bis(ethylene ketal) is productive of the corresponding 16α-hydroxymethyl-4-pregnene-3,20-dione bis(ethylene ketal) represented by Formula VI, i.e., 16α-hydroxymethyl-4-pregnene-3,20-dione bis(ethylene ketal), 2α-methyl-11β-hydroxy-16α-hydroxymethyl-4-pregnene - 3,20-dione bis (ethylene ketal), 2α-methyl-16α-hydroxymethyl-4-pregnene-3,20-dione bis(ethylene ketal), 6α-methyl-11β-hydroxy - 16α - hydroxymethyl - 4-pregnene-3,20-dione bis (ethylene ketal), and 6α-methyl-16α-hydroxymethyl-4-pregnene-3,20-dione bis(ethylene ketal), respectively.

EXAMPLE 7A

*11β-hydroxy-16α-acetoxymethyl-4-pregnene-3,20-dione bis(ethylene ketal)*

A solution of 1.0 g. of 11β-hydroxy-16α-hydroxymethyl-4-pregnene-4,20-dione bis(ethylene ketal) (VI) in 5 ml. of acetic anhydride and 5 ml. of pyridine is allowed to stand at room temperature until the acylation is complete. The reaction mixture is then poured into 100 ml. of ice-water and the resutling aqueous mixture is extracted with three 25 ml. portions of methylene chloride. The extracts are combined, washed with water, dried over sodium sulfide and evaporated in vacuo to remove the solvent. The residue thus obtained is recrystallized from acetone:Skellysolve B hexanes to give 11β-hydroxy-16α-acetoxymethyl-4-pregnene 3,20-dione bis(ethylene ketal).

In the same manner following the procedure of Example 7A but substituting as starting material other 11β-hydroxy compounds represented by Formula VI, and prepared in Example 6A, above, i.e., 2α-methyl-11β-hydroxy-16α - hydroxymethyl-4-pregnene-3,20-dione bis(ethylene ketal) or 6α-methyl-11β-hydroxy-16α-hydroxymethyl-4-pregnene-3,20-dione bis(ethylene ketal) for 11β-hydroxy-16α - hydroxymethyl-4-pregnene-3,20-dione bis(ethylene ketal) is productive of 2α-methyl-11β-hydroxy-16α-acetoxymethyl-4-pregnene-3,20-dione bis(ethylene ketal) and 6α - methyl - 11β-hydroxy-16α-acetoxymethyl-4-pregnene-3,20-dione bis(ethylene ketal), respectively.

EXAMPLE 8A

*16α-acetoxymethyl-4-pregnene-3,11,20-trione 3,20-bis (ethylene ketal)*

A mixture of 300 mg. of 11β-hydroxy-16α-acetoxymethyl-4-pregnene-3,20-dione bis(ethylene ketal) in 5 ml. of pyridine is added to a suspension of chromium trioxide:pyridine complex (prepared from 300 mg. of chromium trioxide and 5 ml. of pyridine). The reaction mixture is allowed to stand at room temperature for a period of about 18 to 24 hours. Water and benzene:ether (1:1) is then added and the mixture is stirred thoroughly and then filtered through Supercel diatomaceous earth. The organic layer is separated, washed with water, dried over sodium sulfate and evaporated to remove the solvent, giving crude 16α - acetoxymethyl-4-pregnene-3,11,20-trione-3,20-bis(ethylene ketal). The crude product is recrystallized from acetone:Skellysolve B hexanes to give 16α-acetoxymethyl-4-pregnene - 3,11,20 - trione - 3,20 - bis(ethylene ketal), a crystalline solid. Alternatively, if desired, the residue may be purified by chromatography.

In the same manner following the procedure of Example 8A, but substituting as starting material 2α-methyl-11β-hydroxy-16α-acetoxymethyl-4-pregnene-3,20-dione bis (ethylene ketal) or 6α-methyl-11β-hydroxy-16α-acetoxymethyl-4-pregnene-3,20 - dione bis(ethylene ketal) prepared in Example 7A above, for 11β-hydroxy-16α-acetoxymethyl-4-pregnene-3,20-dione bis(ethylene ketal) is productive of 2α-methyl-16α-acetoxymethyl-4-pregnene-3,11,20-trione 3,20-bis(ethylene ketal) and 6α-methyl - 16α-acetoxymethy-4-pregnene-3,11,20-trione 3,20-bis(ethylene ketal), respectively.

EXAMPLE 9A

*16α-hydroxymethyl-4-pregnene-3,11,20-trione 3,20-bis (ethylene ketal) (VIa)*

To 1.0 g. of 16α-acetoxymethyl-4-pregnene - 3,11,20-trione 3,20-bis(ethylene ketal) in 15 ml. of methanol is added 5 ml. of a 25 percent solution of sodium hydroxide in aqueous methanol. The reaction mixture is stirred in a nitrogen atmosphere and then allowed to stand overnight at room temperature. The reaction mixture is then diluted with 100 ml. of water, neutralized with dilute acetic acid and extracted three times with methylene chloride. The methylene chloride extracts are combined, washed with sodium bicarbonate solution and water, dried over sodium sulfate and evaporated at reduced pressure to remove the solvent. The residue thus obtained is recrystallized from acetone:Skellysolve B hexanes to give 16α-hydroxymethyl-4-pregnene-3,11,20-trione 3,20 - bis(ethylene ketal) (VIa) a crystalline solid. Alternatively, if desired, the residue may be purified by chromatography.

In the same manner following the procedure of Example 9A, but substituting as starting material 2α-methyl-16α-acetoxy-methyl-4-pregnene-3,11,20 - trione 3,20 - bis (ethylene ketal) or 6α-methyl-16α-acetoxymethyl-4-pregnene-3,11,20-trione 3,20-bis(ethylene ketal) prepared in Example 8A, above, is productive of 2α-methyl-16α-hydroxymethyl-4-pregnene-3,11,20-trione 3,20 - bis(ethylene ketal) (VIa) and 6α-methyl-16α-hydroxymethyl-4-pregnene-3,11,20-trione 3,20-bis(ethylene ketal) (VIa), respectively.

EXAMPLE 10A

*11β-hydroxy-16α-hydroxymethyl-4-pregnene-3,20-dione (VIb)*

To a solution of 300 mg. 11β-hydroxy-16α-hydroxymethyl-4-pregnene-3,20-dione bis(ethylene ketal) (VI) in acetone containing 10% by volume of water was added 1 ml. of 25 percent sulfuric acid. The mixture was boiled for a period of about 10 minutes and then allowed to stand at room temperature to complete the hydrolysis. At the end of the reaction period excess sodium bicarbonate solution was added and the acetone was removed in vacuo at room temperature until crystallization commenced. An additional 50 ml. of water was added, and crystallization was allowed to proceed at 0° C. The crystalline material was then collected by filtration and dried in vacuo to give 150 mg. of 11β-hydroxy-16α-hydroxymethyl-4-pregnene-3,20-dione melting at 234–238° C. Recrystallization from acetone:Skellysolve B hexanes gave 11β-hydroxy-16α-hydroxymethyl-4-pregnene - 3,20 - dione melting at 244–246° C., $\lambda_{max.}^{EtOH}$ 242 mμ, $a_M$ 15,800

The infrared spectrum supported the assigned structure. Optical rotatory dispersion analysis showed the 17β-configuration.

*Analysis.*—Calcd. for $C_{22}H_{32}O_4$: C, 73.30; H, 8.95. Found: C, 73.24; H, 9.35.

In the same manner following the procedure of Example 10A but substituting as starting material other 3,20-bis(ethylene ketals) represented by Formulae VI and VIa and prepared in Examples 6A and 9A, i.e., 16α-hydroxymethyl-4-pregnene-3,20-dione bis(ethylene ketal), 16α-hydroxymethyl-4-pregnene-3,11,20-trione 3,20 - bis(ethylene ketal), 2α-methyl-11β-hydroxy-16α - hydroxymethyl - 4-pregnene-3,20-dione bis(ethylene ketal), 2α-methyl-16α-hydroxymethyl-4-pregnene-3,20-dione bis (ethylene ketal), 2α-methyl-16α-hydroxymethyl-4-pregnene-3,11,20 - trione 3,20-bis(ethylene ketal), 6α-methyl-11β-hydroxy-16α-hydroxymethyl-4-pregnene-3,20 - dione bis(ethylene ketal), 6α-methyl-16α-hydroxymethyl-4-pregnene-3,20 - dione bis (ethylene ketal) and 6α-methyl-16α-hydroxymethyl - 4-pregnene-3,11,20-trione 3,20-bis(ethylene ketal) for 11β-hydroxy-16α-hydroxymethyl-4-pregnene-3,20 - dione bis (ethylene ketal) is productive of other compounds represented by Formula VIb, i.e., 16α-hydroxymethyl-4-pregnene-3,20-dione, 16α-hydroxymethyl-4-pregnene - 3,11,20-trione, 2α-methyl-11β-hydroxy-16α-hydroxymethyl-4-pregnene-3,20-dione, 2α-methyl-16α-hydroxymethyl-4 - pregnene-3,20-dione, 2α-methyl-16α-hydroxymethyl-4 - pregnene-3,11,20-trione, 6α-methyl-11β-hydroxy-16α-hydroxymethyl-4-pregnene-3,20-dione, 6α-methyl-16α - hydroxymethyl-4-pregnene-3,20-dione and 6α-methyl-16α-hydroxymethyl-4-pregnene-3,11,20-trione, respectively.

EXAMPLE 11A

*16α-fluoromethyl-11β-hydroxy-4-pregnene-3,20-dione bis(ethylene ketal) (VIII)*

A solution of 1.0 g. of 11β-hydroxy-16α-hydroxymethyl-4-pregnene-3,20-dione bis(ethylene ketal) (VI) and 1.0 g. of p-toluenesulfonyl chloride in pyridine is allowed to stand for a period of about 18 to 24 hours at room temperature. The reaction mixture is then poured into ice water and extracted with methylene chloride. The combined methylene chloride extracts are washed consecutively with sodium bicarbonate solution and water and dried over sodium sulfate. The methylene cholride is then removed by evaporation giving crude 11β-hydroxy-16α-(p-toluenesulfonyloxymethyl)-4-pregnene - 3,20 - dione bis(ethylene ketal) (VII). The crude 11β-hydroxy-16α-(p-toluenesulfonyloxymethyl)-4-pregnene - 3,20 - dione bis(ethylene ketal) is dissolved in about 25 ml. of redistilled diethylene glycol and heated with 2.4 g. of anhydrous potassium fluoride at 200–210° C. for about 1 hour under an atmosphere of nitrogen. The reaction mixture is then cooled, poured into water and extracted with ethyl acetate. The extracts are combined, washed with water, and dried over sodium sulfate. The solvent is then removed by evaporation giving a crude residue containing 11β-hydroxy-16α-fluoromethyl-4-pregnene-3,20-dione bis(ethylene ketal). The crude residue is dissolved in methylene chloride, chromatographed on 100 g. of Florisil synthetic magnesium silicate and eluted with increasing proportions of acetone in Skellysolve B hexanes. The solvent is evaporated from each of the fractions and those containing crystalline material are combined and recrystallized from acetone:Skellysolve B hexanes to give 11β-hydroxy-16α-fluoromethyl-4-pregnene-3,20 - dione bis(ethylene ketal) (VIII) melting at 183–185° C. The infrared spectrum is in agreement with the structure.

*Analysis.*—Calcd. for $C_{26}H_{39}FO_5$: C, 69.34; H, 8.67; F, 4.22. Found: C, 69.61; H, 9.03; F, 3.74.

In the same manner, following the procedure of Example 11A but substituting other 16α-hydroxymethyl-4-pregnene-3,20-dione bis(ethylene ketals), represented by Formula VI, i.e., those listed in the second paragraph of Exampl 6A for 11β-hydroxy-16α-hydroxymethyl-4-pregnene-3,20-dione bis(ethylene ketal) is productive of the corresponding 16α-(p-toluenesulfonyloxymethyl)-4-pregnene-3,20-dione bis(ethylene ketal) represented by Formula VII, i.e., 16α-(p-toluenesulfonyloxymethyl)-4-pregnene-3,20-dione bis(ethylene ketal), 2α-methyl-11β-hydroxy - 16α - (p-toluenesulfonyloxymethyl)-4-pregnene-3,20-dione bis(ethylene ketal), 2α-methyl-16α-(p-toluenesulfonyloxymethyl)-4-pregnene - 3,20 - dione bis(ethylene ketal), 6α-methyl-11β-hydroxy-16α-(p-toluenesulfonyloxymethyl)-4-pregnene-3,20-dione bis(ethylene ketal) and 6α-methyl-16α-(p-toluenesulfonyloxymethyl) - 4 - pregnene-3,20-dione bis(ethylene ketal), respectively. The 16α-(p-toluenesulfonyloxymethyl) compounds thus produced are converted to the corresponding 16α-fluoromethyl compounds (VIII) with anhydrous potassium fluoride in the same manner as in Example 11A to give 16α-fluoromethyl-4-pregnene - 3,20 - dione bis(ethylene ketal), 2α-methyl-11β-hydroxy-16α-fluoromethyl - 4 - pregnene-3,20-dione bis(ethylene ketal), 2α-methyl-16α-fluoromethyl-4-pregnene-3,20-dione bis(ethylene ketal), 6α-methyl-11β-hydroxy - 16α - fluoromethyl - 4 - pregnene-3,20-dione bis(ethylene ketal) and 6α-methyl-16α-fluoromethyl-4-pregnene-3,20-dione bis(ethylene ketal), respectively.

In the same manner, following the procedure of Example 11A but substituting as the starting steroid the 11-keto compounds represented by Formula VIa prepared in Example 9A and the paragraph following Example 9A is productive of the corresponding 16α-p-toluenesulfonyloxymethyl derivatives (VII) which are then converted with potassium fluoride to the corresponding 11-keto-16α-fluoromethyl compounds (VIII), i.e., 16α-fluoromethyl-4-pregnene-3,11,20-trione 3,20-bis(ethylene ketal), 2α-methyl - 16α - fluoromethyl-4-pregnene-3,11,20-trione 3,20-bis(ethylene ketal) and 6α-methyl-16α-fluoromethyl-4-pregnene-3,11,20-trione 3,20 - bis(ethylene ketal), respectively.

EXAMPLE 12A

*11β-hydroxy-16α-fluoromethyl-4-pregnene-3,20-dione (IX)*

To a solution of 300 mg. 11β-hydroxy-16α-fluoromethyl-4-pregnene-3,20-dione bis(ethylene ketal) (VIII)

in acetone containing 10% by volume of water is added 1.0 ml. of 25 percent sulfuric acid; the solution is boiled for about 10 minutes and then allowed to stand at room temperature until hydrolysis is complete. At the end of the reaction excess sodium bicarbonate solution is added and the acetone is removed in vacuo at room temperature until crystallization commences. An additional 50 ml. of water is then added and the crystallization is allowed to proceed at 0° C. The solid material thus obtained is collected by filtration, washed with water and dried in vacuo to give 11β-hydroxy-16α-fluoromethyl-4-pregnene-3,20-dione, a crystalline solid. The product can be further purified by recrystallization from acetone:Skellysolve B hexanes.

In the same manner following the procedure of Example 12A, but substituting as starting material other 16α-fluoromethyl-4-pregnene-3,20-dione bis(ethylene ketals) represented by Formula VIII, i.e., the 16α-fluoromethyl compounds prepared and listed in the second and third paragraphs of Example 11A for 11β-hydroxy-16α-fluoromethyl-4-pregnene-3,20-dione bis(ethylene ketal) is productive of the corresponding hydrolyzed compound (IX), i.e., 16α-fluoromethyl-4-pregnene-3,20-dione, 2α-methyl-11β-hydroxy-16α-fluoromethyl-4-pregnene-3,20-dione, 2α-methyl - 16α - fluoromethyl-4-pregnene-3,20-dione, 6α-methyl - 11β - hydroxy-16α-fluoromethyl-4-pregnene-3,20-dione, 6α-methyl-16α-fluoromethyl-4-pregnene-3,20-dione, 16α-fluoromethyl-4-pregnene - 3,11,20 - trione, 2α-methyl-16α - fluoromethyl - 4 - pregnene - 3,11,20 - trione and 6α-methyl-16α-fluoromethyl - 4 - pregnene-3,11,20-trione, respectively.

EXAMPLE 13A

*16α-fluoromethyl-4-pregnene-3,11,20-trione (IX)*

A mixture of 280 mg. of 11β-hydroxy-16α-fluoromethyl-4-pregnene-3,20-dione bis(ethylene ketal) (VIII) and 5 ml. of pyridine is added to a suspension of chromium trioxide: pyridine complex (prepared from 300 mg. of chromium trioxide and 5 ml. of pyridine). The reaction mixture is allowed to stand at room temperature until the oxidation is completed. Water and benzene:ether (1:1) are then added. The mixture is stirred thoroughly and filtered through Supercel diatomaceous earth. The organic layer is separated, washed with water, dried over sodium sulfate and evaporated to remove the solvent. The residue thus obtained, containing 16α-fluoromethyl-4-pregnene-3,11,20-trione bis(ethylene ketal) is dissovled in 50 ml. of acetone and 5 ml. of water and hydrolyzed by standing at room temperature for a period of about 30 hours with 0.5 ml. of 25% sulfuric acid. At the end of the reaction excess sodium bicarbonate solution is added and the acetone is removed in vacuo at room temperature until crystallization commences. An additional 100 ml. of water is then added and the crystallization is allowed to proceed at 0° C. The crystalline solid is collected by filtration, washed with water and dried to give crude 16α-fluoromethyl-4-pregnene-3,11,20-trione. The crude product thus obtained is recrystallized twice from acetone:Skellysolve B hexanes to give 16α-fluoromethyl-4-pregnene-3,11,20-trione (IX) melting at 223–226° C.

In the same manner following the oxidation procedure of Example 13A, but substituting as starting material 2α-methyl-11β-hydroxy-16α-fluoromethyl - 4 - pregnene-3,20-dione bis(ethylene ketal) (VIII) or 6α-methyl-11β-hydroxy - 16α - fluoromethyl - 4 - pregnene-3,20-dione bis-(ethylene ketal) (VIII) (prepared in Example 11A) for 11β-hydroxy-16α-fluoromethyl-4-pregnene - 3,20 - dione bis(ethylene ketal) is productive of 2α-methyl-16α-fluoromethyl - 4 - pregnene - 3,11,20 - trione 3,20-bis(ethylene ketal) and 6α - methyl - 16α - fluoromethyl - 4 - pregnene-3,11,20 - trione 3,20 - bis(ethylene ketal), respectively, which when subjected to hydrolysis according to the procedure of Example 13A is productive of 2α-methyl-16α-fluoromethyl - 4 - pregnene-3,11,20-trione (IX) and 6α-methyl-16α-fluoromethyl-4-pregnene-3,11,20-trione (IX), respectively.

EXAMPLE 14A

*3α-hydroxy-16α-cyano-5β-pregnane-11,20-dione (A–II)*

A mixture of 20.0 g. of 3α-acetoxy-16-pregnene-11,20-dione (A–I), 30.0 g. of potassium cyanide, 1 liter of methanol and 200 ml. of dioxane was heated to boiling under reflux for a period of 3 hours. At the end of the reflux period the reaction mixture was cooled, water was added and the organic material was extracted with methylene chloride. The combined extracts were washed with water, dried over sodium sulfate and evaporated to remove the solvent. The crystalline residue thus obtained was recrystallized from acetone:Skellysolve B hexanes to give 9.5 g. of 3α-hydroxy-16α-cyano-5β-pregnane-11,20-dione melting at 222–226° C. Further recrystallization from acetone:Skellysolve B hexanes gave 3α-hydroxy-16α-cyano - 5β - pregnane-11,20-dione (A–II) melting at 238–240° C.; the infrared spectrum agreed with the assigned structure and optical rotatory dispersion analysis indicated the 17β-configuration.

*Analysis.*—Calcd. for $C_{22}H_{31}O_3N$: C, 73.91; H, 8.74; N, 3.92. Found: C, 74.34; H, 9.04; N, 4.11.

EXAMPLE 15A

*3α-hydroxy-16α-cyano-5β-pregnane-11,20-dione 20-ethylene ketal (A–III)*

A mixture of 5.5 g. of 3α-hydroxy-16α-cyano-5β-pregnane-11,20-dione (A–II), 25 ml. of ethylene glycol, 250 mg. of p-toluenesulfonic acid monohydrate and 500 ml. of benzene was heated to reflux for a period of 6 hours. Water was removed during the reflux period by use of a conventional water separator. The reaction mixture was then cooled in an ice-water bath and saturated aqueous sodium bicarbonate solution was added. The benzene layer was separated and the aqueous layer was extracted with additional benzene. The combined benzene extracts were washed with water until neutral, dried over sodium sulfate and evaporated to remove the solvent. The oil thus obtained was dissolved in methylene chloride and chromatographed on 300 g. of Florisil synthetic magnesium silicate which had been pre-treated with Skellysolve B hexanes. The column was eluted with increasing proportions of acetone in Skellysolve B hexanes. The solvent was removed from the eluates by evaporation. Crystalline material was obtained from the fractions eluted with 20% acetone:Skellysolve B hexanes. These fractions were combined and recrystallized from ether to give 3.25 g. of 3α-hydroxy - 16α - cyano - 5β - pregnane - 11,20-dione 20-ethylene ketal melting at 164–170° C. A second crop of crystals was obtained from the mother liquors giving an additional 0.54 g. of 3α-hydroxy-16α-cyano-5β-pregnane-11,20-dione 20-ethylene ketal. Further recrystallization from ether gave 3α-hydroxy-16α-cyano-5β-pregnane-11,20-dione 20-ethylene ketal (A–III) melting at 168–170° C. The infrared spectrum confirmed the structure.

*Analysis.*—Calcd. for $C_{24}H_{35}O_4N$: C, 71.79; H, 8.79; N, 3.49. Found: C, 71.12; H, 8.67; N, 3.68.

EXAMPLE 16A

*3α-hydroxy-16α-carbomethoxy-5β-pregnane-11,20-dione 20-ethylene ketal (A–IV)*

A solution of 2.85 g. of 3α-hydroxy-16α-cyano-5β-pregnane-11,20-dione 20-ethylene ketal (A–III) and 5.0 g. of potassium hydroxide in 80 ml. of ethylene glycol and 20 ml. of water was heated to boiling under reflux in a nitrogen atmosphere for a period of 24 hours. The solution was then cooled, diluted with about 250 ml. of water and extracted twice with methylene chloride. The aqueous layer was then carefully acidified to about pH 4, first with sodium dihydrogen phosphate and then with ice cold dilute hydrochloric acid, and rapidly extracted with ethyl acetate. The combined ethyl acetate extracts were washed with water until neutral, dried over sodium sulfate and evaporated in vacuo to remove the solvent. The residue thus obtained was dissolved in 250 ml. of methanol and 250 ml. of methylene chloride and esterified with excess ethereal diazomethane at room temperature for a period of 3 hours. The solvent was then removed by evaporation in vacuo. The residual oil thus obtained was dissolved in acetone:Skellysolve B hexanes and crystallized to give 2.21 g. of 3α-hydroxy-16α-carbomethoxy - 5β - pregnane - 11,20 - dione 20 - ethylene ketal melting at 221–223° C. Further recrystallization gave 3α - hydroxy - 16α - carbomethoxy - 5β - pregnane-11,20-dione 20-ethylene ketal (A–IV) melting at 222–223° C. The infrared spectrum supported the structure.

Analysis.—Calcd. for $C_{26}H_{38}O_6$: C, 69.09; H, 8.81. Found: C, 69.29; H, 8.89.

EXAMPLE 17A

*16α-carbomethoxy-5β-pregnane-3,11,20-trione 3,20-bis(ethylene ketal) (A–V)*

A solution of 2.05 g. of 3α-hydroxy-16α-carbomethoxy - 5β - pregnane - 11,20 - dione 20 - ethylene ketal (A–IV) in 200 ml. of acetone was oxidized for 5–10 minutes at 0° C. with 1.85 ml. of standard chromium trioxide:sulfuric acid reagent (prepared by dissolving 26.72 g. of chromium trioxide in 25 ml. of concentrated sulfuric acid and diluting with water to 100 ml.). Saturated aqueous sodium bicarbonate solution was then added to the reaction mixture followed by filtration through Supercel diatomaceous earth. The filtrate was extracted with methylene chloride and the combined extracts were washed with water, dried over sodium sulfate and evaporated to remove the solvent. The residual oil thus obtained was dissolved in acetone:Skellysolve B hexanes and crystallized to give 1.73 g. of 16α-carbomethoxy-5β-pregnane-3,11,20-trione 20-ethylene ketal melting at 154 to 156° C.

A mixture of 1.68 g. of 16α-carbomethoxy-5β-pregnane-3,11,20-trione 20-ethylene ketal, 10 ml. of ethylene glycol, 150 mg. of p-toluenesulfonic acid monohydrate and 200 ml. of benzene was heated to reflux incorporating a water separator for a period of 16 hours. The reaction mixture was then cooled and sodium bicarbonate solution was added. The organic layer was separated from the aqueous layer, washed with water, dried over sodium sulfate and evaporated to remove the solvent. The residue, thus obtained, was crystallized from acetone:Skellysolve B hexanes to give 1.74 g. of 16α-carbomethoxy - 5β - pregnane - 3,11,20 - trione 3,20-bis (ethylene ketal) (A–V) melting at 200–225° C. The infrared spectrum supported the assigned structure.

Analysis.—Calcd. for $C_{27}H_{40}O_7$: C, 68.04; H, 8.46. Found: C, 67.74; H, 8.48.

EXAMPLE 18A

*11β-hydroxy-16α-hydroxymethyl-5β-pregnane-3,20-dione bis(ethylene ketal) (A–VI)*

A solution of 1.6 g. of 16α-carbomethoxy-5β-pregnane-3,11,20-trione 3,20-bis(ethylene ketal) in 50 ml. of benzene was added dropwise to a stirred suspension of 2.0 g. of lithium aluminum hydride in 30 ml. of diethyl ether and 20 ml. of benzene keeping the temperature at 0° C. or below. The mixture was then heated under reflux for a period of about 4 hours. The reaction mixture was cooled and the excess hydride was decomposed with ethyl acetate followed by about 5 ml. of water. The organic layer was then filtered with the aid of Supercel diatomaceous earth. The filtrate was washed with water, dried over sodium sulfate and evaporated to remove the solvent giving 1.605 g. of crude product which when crystallized from acetone:Skellysolve B hexanes gave 1.18 g. of 11β-hydroxy - 16α - hydroxymethyl - 5β - pregnane - 3,20-dione bis(ethylene ketal) melting at 196–203° C. Two recrystallizations from acetone:Skellysolve B hexanes gave 11β - hydroxy-16α-hydroxymethyl-5β-pregnane-3,20-dione bis(ethylene ketal) (A–VI) melting at 204–205° C. The infrared spectrum supported the assigned structure.

Analysis.—Calcd. for $C_{26}H_{42}O_6$: C, 69.30; H, 9.40. Found: C, 69.53; H, 9.41.

EXAMPLE 19A

*11β-hydroxy-16α-fluoromethyl-4-pregnene-3,20-dione bis(ethylene ketal) (A–VIII)*

A solution of 0.82 g. of 11β-hydroxy-16α-hydroxymethyl-5β-pregnane-3,20-dione bis(ethylene ketal) (A–VI) and 0.82 g. of p-toluenesulfonyl chloride in 16 ml. of pyridine was allowed to stand for a period of 18 hours at room temperature. The reaction mixture was then poured into ice water and extracted with methylene chloride. The combined methylene chloride extracts were washed consecutively with sodium bicarbonate solution and water, and dried over sodium sulfate. The methylene chloride was then removed by evaporation giving 1.418 g. of crude 11β-hydroxy-16α-(p-toluenesulfonyloxymethyl)-5β-pregnane-3,20-dione bis(ethylene ketal) (A–VII).

The crude 11β-hydroxy - 16α - (p-toluenesulfonyloxymethyl)-5β-pregnane-3,20-dione bis(ethylene ketal) was dissolved in 25 ml. of redistilled diethylene glycol and heated with 2.0 g. of anhydrous potassium fluoride at 110° C. for a period of 18 hours under an atmosphere of nitrogen. The reaction mixture was then cooled, poured into water and extracted with ethyl acetate. The extracts were combined, washed with water, and dried over sodium sulfate. The solvent was then removed by evaporation giving 814 mg. of residual oil containing crude 11β-hydroxy-16α-fluoromethyl-5β-pregnane-3,20-dione bis(ethylene ketal). The residual oil was dissolved in Skellysolve B hexane, chromatographed on 100 g. of Florisil synthetic magnesium silicate and eluted with increasing proportions of acetone in Skellysolve B hexanes. The solvent was removed from the fractions and those fractions which were eluted with 5% acetone:Skellysolve B hexanes contained 404 mg. of crystalline material which was combined and recrystallized from acetone:Skellysolve B hexanes to give 310 mg. of 11β-hydroxy-16α-fluoromethyl-5β-pregnane-3,20-dione bis(ethylene ketal) melting at 115–120° C. Two additional recrystallizations from acetone:Skellysolve B hexanes gave 11β-hydroxy-16α-fluoromethyl-5β-pregnane-3,20-dione bis(ethylene ketal) (A–VIII) melting at 125–127° C. The infrared spectrum supported the assigned structure.

Analysis.—Calcd. for $C_{26}H_{41}FO_5$: C, 69.04; H, 9.07; F, 4.20. Found: C, 68.90; H, 9.46; F, 3.99.

EXAMPLE 20A

*16α-fluoromethyl-5β-pregnane-3,11,20-trione (A–IX)*

A solution of 283 mg. of 11β-hydroxy-16α-fluoromethyl-5β-pregnane-3,20-dione bis(ethylene ketal) (A–VIII) in 5 ml. of pyridine was added to a suspension of chromium trioxide:pyridine complex (prepared from 300 mg. of chromium trioxide and 5 ml. of pyridine). The reaction mixture was allowed to stand at room temperature for a period of 18 hours. Water and benzene:ether (1:1) was then added and the mixture was stirred thoroughly, and filtered through Supercel diatomaceous earth. The organic layer was separated, washed with water, dried over sodium sulfate and evaporated to remove the solvent. The residue thus obtained, containing 16α-fluoromethyl-5β-pregnane-3,11,20-trione bis(ethylene ketal) was dissolved in 50 ml. of acetone and 5 ml. of water and hydrolyzed by standing at room temperature for a period of 30 hours with 0.5 ml. of 25% sulfuric acid. At the end of the reaction period excess sodium bicarbonate solution was added and the acetone was removed in vacuo at room temperature until crystallization commenced. An additional 100 ml. of water was then added and the crystallization was allowed to proceed at 0° C. The crystalline solid was collected by filtration, washed with water and dried to give 200 mg. of crude product which was recrystallized from acetone:Skellysolve B hexanes to give 130 mg. of 16α - fluoromethyl - 5β - pregnane - 3,11,20 - trione melting at 162 to 165° C. A final crystallization from the same solvent gave 16α-fluoromethyl-5β-pregnane-3,11,20-trione (A–IX) melting at 164–166° C. The infrared spectrum supported the assigned structure.

*Analysis.*—Calcd. for $C_{22}H_{31}FO_3$: C, 72.90; H, 8.56; F, 5.25. Found: C, 72.80; H, 8.92; F, 5.26.

EXAMPLE 21A

*16α-fluoromethyl-4-pregnene-3,11,20-trione (IXa)*

A solution of 1.05 g. of 16α-fluoromethyl-5β-pregnane-3,11,20-trione in 35 ml. of t-butanol and 2 ml. of dioxane was stirred in the dark at room temperature with 0.3 ml. of concentrated hydrochloric acid, 1.5 ml. of water and 0.35 ml. of t-butyl hypochlorite for a period of 24 hours. The reaction mixture was then diluted with water and extracted with methylene chloride. The extracts were combined, washed with sodium bicarbonate solution, water, and dried over sodium sulfate. The solvent was removed in vacuo giving 1,283 g. of crude 4-chloro-16α-fluoromethyl-5β-pregnane-3,11,20-trione. The crude 4-chloro compound was dissolved in 35 ml. dimethylformamide and heated at 50–60° C. in a nitrogen atmosphere with 1.38 g. of semicarbazide hydrochloride, 1.03 g. of sodium acetate and 7 ml. of water. After 2 hours, 3.45 ml. of pyruvic acid and 3.45 ml. of water were added and the solution was maintained at the same temperature for an additional 2.5 hours. The reaction mixture was then cooled and benzene and sodium bicarbonate solution were added. The organic layer was separated, washed with water and dried over sodium sulfate. The solvent was removed by evaporation in vacuo giving 1.28 g. of residual oil which was dissolved in methylene chloride and chromatographed on 100 g. Florisil synthetic magnesium silicate which had been pre-treated with Skellysolve B hexanes. The column was eluted with increasing proportions of acetone in Skellysolve B hexanes. Crystalline material was obtained from the fractions eluted with 10–15% acetone:Skellysolve B hexanes. The crystalline material was combined and crystallized from acetone:Skellysolve B hexanes to give 0.45 g. of 16α-fluoromethyl-4-pregnene-3,11,20-trione melting at 203–208° C. Two further recrystallizations from acetone:Skellysolve B hexanes gave 16α-fluoromethyl-4-pregnene-13,11,20-trione (IXa) melting at 223–226° C., $$\lambda_{max.}^{EtOH}\ 238\ m\mu,\ a_M\ 15,400$$

The infrared spectrum agreed with the assigned structure. Optical rotatory dispersion analysis showed the 17β-configuration.

*Analysis.*—Calcd. for $C_{22}H_{29}FO_3$: C, 73.33; H, 8.06; F, 5.28. Found: C, 73.31; H, 7.63; F, 5.52.

EXAMPLE 22A

*3β-hydroxy-16α-cyano-5-pregnen-20-one 20-ethylene ketal (A'–II)*

A mixture of 68.0 g. of 3β-hydroxy-16α-cyano-5-pregnen-20-one (A'–I), 250 ml. of ethylene glycol, 2 liters of benzene and 2.0 g. of p-toluenesulfonic acid monohydrate was heated under reflux for a period of 5 hours. Water was removed during the reflux period by incorporating a water separator into the reflux return. The reaction mixture was cooled and benzene and sodium bicarbonate solution were added. The organic layer was separated, washed with water, dried over sodium sulfate and evaporated to remove the solvent. The residue thus obtained was crystallized from acetone:Skellysolve B hexanes to give 42.3 g. of 3β-hydroxy-16α-cyano-5-pregnen-20-one 20-ethylene ketal (A'–II) melting at 189–192° C.

EXAMPLE 23A

*3β-hydroxy-16α-carboxy-5-pregnen-20-one 20-ethylene ketal (A'–III)*

A mixture of 42.0 g. of 3β-hydroxy-16α-cyano-5-pregnen-20-one 20-ethylene ketal, 1 liter of ethylene glycol, 250 ml. of water and 75.0 g. of potassium hydroxide were refluxed with stirring under an atmosphere of nitrogen for a period of 20 hours. The solution was cooled to room temperature and filtered. The aqueous alkaline filtrate was cooled to 0° C. and acidified with ice-cold dilute hydrochloric acid to give 3β-hydroxy-16α-carboxy-5-pregnen-20-one 20-ethylene ketal as a precipitate, which was collected by filtration, washed with water and dried to give 20.0 g. melting at 220–240° C. Crystallization from acetone:methanol gave 3β-hydroxy-16α-carboxy-5-pregnen-20-one 20-ethylene ketal (A'–III) melting at 245–248° C. The infrared spectrum supported the assigned structure.

*Analysis.*—Calcd for $C_{24}H_{36}O_5$: C, 71.35; H, 8.97. Found: C, 70.58; H, 9.60.

EXAMPLE 24A

*3β-hydroxy-16α-fluoromethyl-5-pregnen-20-one (A'–IV)*

A mixture of 10.0 g. 3β-hydroxy-16α-carboxy-5-pregnen-20-one 20-ethylene ketal (A'–III), 100 ml. of benzene, 20 ml. of dihydropyran and 100 mg. of p-toluenesulfonic acid monohydrate was stirred for a period of 18 hours at room temperature. At the end of the reaction period aqueous sodium bicarbonate solution was added and the organic layer was separated, washed with water, dried over sodium sulfate, and evaporated to remove the solvent. The residual oil thus obtained was dissolved in 200 ml. of benzene and 50 ml. of ether and this solution was added dropwise with stirring to a suspension of 10.0 g. of lithium aluminum hydride in 250 ml. of ether at 0–5° C. The mixture was then heated to boiling under reflux for a period of 4 hours. At the end of the reflux period the mixture was cooled and the excess lithium aluminum hydride was decomposed by the successive addition of ethyl acetate and water, followed by filtration to remove the inorganic salts. The filtrate was evaporated to dryness and the residue thus obtained was dissolved in 200 ml. of pyridine and allowed to stand for a period of 48 hours at room temperature with 10 g. of p-toluenesulfonyl chloride. Benzene and water were then added. The organic layer was separated, washed consecutively with ice-cold dilute sulfuric acid, water, aqueous sodium bicarbonate solution and water, dried over sodium sulfate and evaporated in vacuo to remove the solvent.

The residual oil thus obtained was mixed with 50 ml. of redistilled diethylene glycol and 10 g. of anhydrous potassium fluoride and heated for 1 hour at 205–225° C. with stirring under an atmosphere of nitrogen. After cooling, 50 ml. of dioxane and 500 ml. of 25% sulfuric acid were added and the solution was allowed to stand overnight at room temperature. The organic material was then extracted with methylene chloride and the combined extracts were washed with aqueous sodium bicarbonate solution and water, dried over sodium sulfate and evaporated to remove the solvent. The residual oil thus obtained, was dissolved in methylene chloride and chromatographed on 500 g. of Florisil synthetic magnesium silicate which had been pretreated wtih Skellysolve B hexanes. The column was eluted with increasing proportions of acetone in Skellysolve B hexanes. Crystalline material was obtained from the 20% acetone:Skellysolve B hexane eluates. These were combined and crystallized from acetone:Skellysolve B hexanes to give 0.535 g. of 3β-hydroxy-16α-fluoromethyl-5-pregnen-20-one melting at 174–177° C. Recrystallization from acetone:Skellysolve B hexanes gave 3β-hydroxy-16α-fluoromethyl-5-pregnen-20-one (A'–IV) melting at 182–184° C. The infrared spectrum agreed with the assigned structure. Optical rotatory dispersion showed the 17β-configuration.

*Analysis.*—Calcd. for $C_{22}H_{33}O_2F$: C, 75.86; H, 9.48; F, 5.46. Found: C, 75.95; H, 9.58; F, 5.15.

EXAMPLE 25A

*16α-fluoromethyl-4-pregnene-3,20-dione (A′–V)*

To a mixture of 1 g. of 3β-hydroxy-16α-fluoromethyl-5-pregnen-20-one in 40 ml. toluene is added 20 ml. of cyclohexanone and a suspension of 1.0 g. of aluminum isopropoxide in 20 ml. of toluene and the mixture is heated under reflux until the reaction is complete. Most of the volatile material is then removed by steam distillation. The residue thus obtained is extracted with ethyl acetate and the combined extracts are washed with aqueous sodium bicarbonate solution, and water and dried over sodium sulfate. The solvent is then removed by evaporation and the residue thus obtained is purified by chromatography and crystallization to give 16α-fluoromethyl-4-pregnene-3,20-dione (A′–V), a crystalline solid.

EXAMPLE 26A

*11α-hydroxy-16α-fluoromethyl-4-pregnen-3,20-dione (A′–VI)*

A medium is prepared of 20 g. of Edamine enzymatic digest of lactalbumin, 3 g. of corn steep liquor and 50 g. of technical dextrose diluted to 1 liter with tap water and adjusted to a pH of 4.3 to 4.5. Three liters of this sterilized medium is inoculated with *Rhizopus nigricans* minus strain, American Type Culture Collection Number 6227b, and incubated for 24 hours at a temperature of 28° C. using a rate of aeration and stirring such that the oxygen uptake is 6.3 to 7 millimoles per hour per liter of $Na_2SO_3$ according to the method of Cooper, Fernstrom and Miller, Ind. Eng. Chem. 36, 504 (1944). To this medium containing a 24-hour growth of *Rhizopus nigricans* minus strain is added 1.0 g. of 16α-fluoromethyl-4-pregnene-3,20-dione (A′–V) in acetone to provide a suspension of the steroid in the culture. After an additional 24-hour period of incubation under the same conditions of temperature and aeration, the beer and mycelium are extracted. The mycelium is filtered, washed twice, each time with a volume of acetone approximately equal to the volume of the mycelium and extracted twice, each time with a volume of methylene chloride approximately equal to the volume of the mycelium. The acetone and methylene chloride extracts including solvent are added to the beer filtrate. The mixed extracts and beer filtrate are extracted successively with two one-half by volume portions of methylene chloride and then with two one-fourth by volume portions of methylene chloride. The combined methylene chloride extracts are washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent is removed by distillation. The residue is dissolved in a minimum of methylene chloride, filtered and the solvent evaporated to give crude crystals which on recrystallization from methanol gives 11α-hydroxy-16α-fluoromethyl-4-pregnene-3,20-dione (A′–VI), a crystalline solid. Alternatively, the residue can be purified by chromatography over Florisil synthetic magnesium silicate and subsequent crystallization.

EXAMPLE 27A

*16α-fluoromethyl-4-pregnene-3,11,20-trione (IXa)*

A mixture of 2.0 g. 11α-hydroxy-16α-fluoromethyl-4-pregnene-3,20-dione (A′–VI) and 200 ml. of acetone was oxidized for a period of about 5–10 minutes at approximately 0° C. with 1.85 ml. of standard chromium trioxide:sulfuric acid reagent (prepared by dissolving 26.72 g. of chromium trioxide in 25 ml. of concentrated sulfuric acid and diluting with water to 100 ml.). Saturated aqueous sodium bicarbonate solution was then added to the reaction mixture followed by filtration through Supercel diatomaceous earth. The filtrate was extracted with methylene chloride and the combined extracts were washed with water, dried over sodium sulfate and evaporated to remove the solvent. The residue thus obtained was crystallized from acetone:Skellysolve B hexanes to give 16α-fluoromethyl-4-pregnene-3,11,20-trione (IXa) melting at 223 to 226° C.

EXAMPLE 28A

*3,11-diketo-16α-fluoromethyl-4,17(20)-pregnadiene-21-oic acid methyl ester (X)*

A solution of 1.41 g. of 16α-fluoromethyl-4-pregnene-3,11,20-trione (IX) in t-butanol was heated to 60° C. with stirring in an atmosphere of nitrogen and treated with 2.68 ml. of diethyl oxalate followed by 2.23 g. of methanolic sodium methoxide solution (28.01% by weight). A yellow precipitate formed almost at once. The mixture was stirred for about 15 minutes while cooling from 60° to 25° C. An ice-cooled solution of 0.656 g. of anhydrous sodium acetate and 0.67 ml. of acetic acid in 27 ml. of methanol was then added. After cooling to 0° C. the mixture was treated dropwise with a cooled solution of 1.875 g. of bromine in 19 ml. of methanol or until the bromine color persists. The cooling bath was then removed and 5.16 g. of 28.1% methanolic sodium methoxide solution was added and stirring was continued for a period of about 1 hour; 1.5 g. of zinc and 3 ml. of acetic acid were then added and stirring was continued for a period of about 40 minutes. The reaction mixture was then filtered through Supercel diatomaceous earth. Water and methylene chloride were then added to the filtrate followed by thorough mixing to extract the organic material. The organic layer was separated, dried over sodium sulfate and evaporated in vacuo to remove the solvent. The residue thus obtained was dissolved in about 20 ml. of methylene chloride and chromatographed on 100 g. of Florisil synthetic magnesium silicate. The column was eluted with increasing proportions of acetone in Skellysolve B hexanes. The fractions eluted with 7% to 10% acetone:Skellysolve B hexanes gave 307 mg. of 3,11 - diketo - 16α - fluoromethyl - 4,17(20) - (trans)-pregnadiene-21-oic acid methyl ester, and the fractions eluted with 10% to 15% acetone:Skellysolve B hexanes gave 235 mg. of 3,11-diketo-16α-fluoromethyl-4,17(20)-(cis)-pregnadiene-21-oic acid methyl ester.

A portion of the trans ester was recrystallized from acetone:Skellysolve B hexanes to give 3,11-diketo-16α-fluoromethyl - 4,17(20) - (trans) - pregnadiene - 21 - oic acid methyl ester melting at 157–159° C.;

$$\lambda_{max.}^{EtOH} \ 232 \ m\mu; \ E, \ 24,450$$

The infrared spectrum confirmed the assigned structure.

*Analysis.*—Calcd. for $C_{23}H_{29}FO_4$: C, 71.14; H, 7.47; F, 4.90. Found: C, 71.09; H, 7.71; F, 5.10.

A portion of the cis ester was recrystallized from acetone:Skellysolve B hexanes to give 3,11-diketo-16α-fluoromethyl - 4,17(20) - (cis) - pregnadiene - 21 - oic acid methyl ester melting at 169–172° C.;

$$\lambda_{max.}^{EtOH} \ 231 \ m\mu; \ E, \ 22,050$$

The infrared spectrum confirmed the assigned structure.

*Analysis.*—Calcd. for $C_{23}H_{29}FO_4$: C, 71.14; H, 7.47; F, 4.90. Found: C, 71.01; H, 7.58; F, 5.29.

The cis and trans isomers were combined together with intermediate fractions containing mixed isomers to give 672 mg. of cis and trans 3,11-diketo-16α-fluoromethyl-4,17(20)-pregnadiene-21-oic acid methyl ester (X).

In the same manner following the procedure of Example 28A but substituting as starting material other 16α-fluoromethyl-4-pregnene-3,20-diones represented by Formula IX, e.g., 16α-fluoromethyl-4-pregnene-3,20-dione, 2α - methyl - 16α - fluoromethyl - 4 - pregnene - 3,11,20- trione, 2α - methyl - 16α - fluoromethyl - 4 - pregnene-3,20 - dione, 6α - methyl - 16α - fluoromethyl - 4 - pregnene - 3,11,20 - trione or 6α - methyl - 16α - fluoromethyl-4-pregnene-3,20-dione for 16α-fluoromethyl-4-pregnene-3,11,20-trione is productive of 3-keto-16α-fluoromethyl-4,17(20)-pregnadien-21-oic acid methyl ester, 2α-methyl-3,11 - diketo - 16α - fluoromethyl - 4,17(20) - pregnadien-21-oic acid methyl ester, 2α-methyl-3-keto-16α-fluoromethyl-4,17(20)-pregnadien-21-oic acid methyl ester, 3,11 - diketo - 6α - methyl - 16α - fluoromethyl - 4,17(20)-pregnadien-21-oic acid methyl ester and 3-keto-6α-methyl-16α - fluoromethyl - 4,17(20) - pregnadien - 21 - oic acid methyl ester, respectively, represented by Formula X.

EXAMPLE 29A

*11β,21-dihydroxy-16α-fluoromethyl-4,17(20)-pregnadien-3-one 21-acetate (XI)*

To a solution of 670 mg. of mixed cis and trans 3,11-diketo - 16α - fluoromethyl - 4,17(20) - pregnadien - 21-oic acid methyl ester in benzene was added 20 mg. of p-toluenesulfonic acid and 0.8 ml. of freshly distilled pyrrolidine. The mixture was heated with stirring under reflux with concomitant removal of water for a period of 1.5 hours. The reaction mixture was then cooled and added dropwise to a stirred suspension of 1.0 g. of lithium aluminum hydride in 75 ml. of ether at 0° C. under a nitrogen atmosphere. The reaction mixture was stirred at room temperature for a period of about 1 hour and then heated to reflux until the reaction was essentially complete. The reaction mixture was cooled and the excess lithium aluminum hydride was decomposed by the addition of 10 ml. of ethyl acetate and then 15 ml. of water. Most of the solvent was then removed in vacuo and the residue thus obtained was stirred for a period of about 15 minutes with a mixture of 1.5 ml. of acetic acid and 34 ml. of methanol. A solution containing 1.0 g. of sodium hydroxide in 10 ml. of water was then added and stirring was continued for about 15 minutes followed by the addition of 1.25 ml. of acetic acid and evaporation of the solvent until the volume was diminished by about one-half. A mixture of 2 ml. of concentrated sulfuric acid and 35 ml. of water was then added; the mixture was stirred for about 15 minutes and extracted with methylene chloride. The combined extracts were washed with water, dried over sodium sulfate and evaporated to remove the solvent. The residue thus obtained was treated with 3 ml. of acetic anhydride and 10 ml. of pyridine and allowed to stand about 18 hours at room temperature. The reaction mixture was then poured into ice-cold sodium bicarbonate solution and extracted with ether:benzene. The combined extracts were washed with dilute hydrochloric acid and water, dried over sodium sulfate and evaporated to remove the solvent to give a residual oil. The residue thus obtained was dissolved in methylene chloride and chromatographed on 50 g. of Florisil synthetic magnesium silicate. The column was eluted with increasing proportions of acetone in Skellysolve B hexanes. The fractions eluted with 10% to 20% acetone: Skellysolve B hexanes gave 0.334 g. of mixed cis and trans 11β,21 - dihydroxy - 16α - fluoromethyl - 4,17(20)-pregnadien-3-one 21-acetate (XI). A portion of the cis isomer was recrystallized from acetone:Skellysolve B hexanes to give 11β,21-dihydroxy-16α-fluoromethyl-4,17(20)-(cis)-pregnadien-3-one 21-acetate melting at 183–186° C.;

$\lambda_{max.}^{EtOH}$ 241 mµ; E, 16,400

The infrared spectrum supported the assigned structure.
*Analysis.*—Calcd. for $C_{24}H_{33}FO_4$: C, 71.29; H, 8.17; F, 4.7. Found: C, 70.91; H, 8.13; F, 4.88.

In the same manner following the procedure of Example 29A but substituting as starting material other 3-keto-16α-fluoromethyl-4,11(20-pregnadien - 21 - oic acid methyl esters represented by Frmula X and prepared and listed in the second paragraph of Example 28A for 3,11 - diketo - 16α - fluoromethyl - 4,17(20) - pregnadien-21-oic acid methyl ester is productive of the corresponding compounds represented by Formula XI, i.e., 16α-fluoromethyl-21-hydroxy-4,17(20) - pregnadien-3-one 21-acetate, 2α-methyl-11β,21-dihydroxy - 16α - fluoromethyl-4,17(20)-pregnadien-3-one 21-acetate, 2α - methyl - 16α-fluoromethyl-21-hydroxy-4,17(20) - pregnadien-3-one 21-acetate, 6α-methyl-11β,21-dihydroxy - 16α - fluoromethyl-4,17(20)-pregnadien-3-one 21-acetate and 6α-methyl-16α-fluoromethyl-21-hydroxy-4,17(20) - pregnadien-3-one 21-acetate, respectively.

EXAMPLE 30A

*16α-fluoromethylhydrocortisone 21-acetate (XII)*

To a stirred solution of 0.334 g. of mixed cis and trans 11β,21-dihydroxy - 4,17(20)-pregnadien-3-one 21-acetate in 17 ml. of t-butanol and 0.23 ml. of pyridine was added 1.7 ml. of N-methyl morpholine oxide peroxide reagent (titration 1 ml.=41.2 ml. 0.1 N sodium thiosulfate) and about 5 mg. of osmium tetroxide. This mixture was stirred for a period of about 10 to 20 hours at room temperature. A solution of 0.4 g. of sodium hydrosulfite in 30 ml. of water was then added and the stirring was continued for an additional period of 30 minutes. The reaction mixture was then extracted with methylene chloride. The extracts were combined, washed with water, dried over sodium sulfate and evaporated in vacuo to remove the solvent. The residue thus obtained was dissolved in about 10 ml. of methylene chloride and chromatographed on 30 g. of Florisil synthetic magnesium silicate which had been pre-treated with Skellysolve B hexanes. The column was eluted with increasing proportions of acetone in Skellysolve B hexanes. Crystalline material was obtained from the fractions eluted from 20% acetone: Skellysolve B hexanes to 30% acetone: Skellysolve B, which gave a positive Tollens test. These fractions were combined (65 mg.) and crystallized from acetone:Skellysolve B hexanes to give 23 mg. of 16α-fluoromethylhydrocortisone 21-acetate (XII) melting at 202–205° C. and having infrared absorption maxima at 3350, 3410, 1740, 1727, 1655, 1624, 1237, 1123, 1069 and 1040 cm.$^{-1}$;

$\lambda_{max.}^{EtOH}$ 242 mµ; E, 15,750

*Analysis.*—Calcd. for $C_{24}H_{33}FO_6$: C, 66.06; H, 7.57; F, 4.36. Found: C, 65.72; H, 7.61; F, 4.77.

The mother liquors from the crystallization gave on trituration with ether more crystalline material which was recrystallized from acetone: Skellysolve B hexanes to give 8 mg. of 16α-fluoromethylhydrocortisone 21-acetate melting at 192–198° C.

EXAMPLE 31A

*6α-methyl-16α-fluoromethylhydrocortisone 21-acetate (XII)*

A stoichiometric equivalent amount of 6α-methyl-11β,21-dihydroxy-16α-fluoromethyl - 4,17(20) - pregnadien-3-one 21-acetate (XI) is substituted for 11β,21-dihydroxy-16α-fluoromethyl-4,17(20)-pregnadien-3-one 21-acetate in the procedure of Example 30A to obtain 6α-methyl-16α-fluoromethylhydrocortisone 21-acetate (XII), a crystalline solid.

In the same manner substituting other compounds represented by Formula XI and prepared in Example 29A, i.e., 16α-fluoromethyl-21-hydroxy-4,17(20)-pregnadien-3-one 21-acetate, 2α-methyl-11β,21-dihydroxy-16α-fluoromethyl-4,17(20)-pregnadien-3-one 21-acetate, 2α-methyl-16α - fluoromethyl-21-hydroxy - 4,17(20) - pregnadien-3-one 21-acetate or 6α - methyl - 16α - fluoromethyl-21-hydroxy-4,17(20)-pregnadien-3-one 21-acetate for 11β,21-dihydroxy - 16α - fluoromethyl - 4,17(20) - pregnadien-3-one 21-acetate in the procedure of Example 30A is productive of 16α - fluoromethyl - 17α,21-dihydroxy-4-pregnene-3,20-dione 21-acetate; 2α-methyl - 16α - fluoromethylhydrocortisone 21-acetate, 2α-methyl-16α-fluoromethyl-17α,21-dihydroxy-4-pregnene-3,20-dione 21-acetate and 6α-methyl-16α-fluoromethyl-17α,21-dihydroxy-4-pregnene-3,20-dione 21-acetate, respectively, represented by Formula XII.

EXAMPLE 32A

16-fluoromethylcortisone 21-acetate (XIII)

A mixture is prepared containing 0.3 g. of 16α-fluoromethylhydrocortisone 21-acetate (XII), 100 mg. of chromic anhydride, 10 ml. of glacial acetic acid and 0.5 ml. of water. This mixture is stirred and thereupon maintained at room temperature until the reaction is complete. The mixture is then poured into about 50 ml. of ice water, neutralized by the addition of dilute sodium hydroxide and the thus obtained preciptate is collected on a filter and dried to give 16α-fluoromethylcortisone 21-acetate (XIII).

In the same manner following the procedure of Example 32A, but substituting 2α-methyl-16α-fluoromethylhydrocortisone 21-acetate (XII) or 6α-methyl-16α-fluoromethylhydrocortisone 21-acetate (XII) for 16α-fluoromethylhydrocortisone 21-acetate is productive of 2α-methyl-16α-fluoromethylcortisone 21-acetate (XIII) and 6α-methyl-16α-fluoromethylcortisone 21-acetate (XIII), respectively.

EXAMPLE 33A

16α-fluoromethylhydrocortisone (XIV)

A mixture of 1.0 g. of 16α-fluoromethylhydrocortisone 21-acetate (XII), 1.0 g. of potassium bicarbonate, 100 ml. of methanol and 15 ml. of water is purged with nitrogen and stirred at room temperature until the reaction is complete. The reaction mixture is then neutralized with 5% aqueous hydrochloric acid solution, diluted with water and refrigerated. The solid material thus obtained is collected on a filter, washed with water and recrystallized from acetone:Skellysolve B hexanes to give 16α-fluoromethyl-hydrocortisone (XIV), a light colored crystalline solid.

EXAMPLE 34A

6α-methyl-16α-fluoromethylhydrocortisone (XIV)

A stoichiometric equivalent amount of 6α-methyl-16α-fluoromethylhydrocortisone 21-acetate (XII) is substituted for 16α-fluoromethylhydrocortisone 21-acetate in the procedure of Example 33A to obtain 6α-methyl-16α-fluoromethyl-hydrocortisone (XIV), a light colored crystalline solid.

EXAMPLE 35A

16α-fluoromethylcortisone (XIV)

A stoichiometric equivalent amount of 16α-fluoromethylcortisone 21-acetate (XIII) is substituted for 16α-fluoromethylhydrocortisone 21-acetate in the procedure of Example 33A to obtain 16α-fluoromethylcortisone (XIV), a light colored crystalline solid.

In the same manner substituting other 21-acetates represented by Formulae XII and XIII, i.e., 2α-methyl-16α-fluoromethylhydrocotisone 21-acetate, 2α-methyl-16α-fluoromethylcortisone 21-acetate, 6α-methyl-16α-fluoromethylcortisone 21-acetate, 16α-fluoromethyl-17α,21-dihydroxy-4-pregnene-3,20-dione 21-acetate, 2α-methyl-16α-fluoromethyl-17α,21-dihydroxy-4-pregnene-3,20-dione 21-acetate, or 6α-methyl-16α-fluoromethyl-17α,21-dihydroxy-4-pregnene-3,20-dione 21-acetate, for 16α-fluoromethylhydrocortisone 21-acetate in the procedure of Example 33A is productive of the corresponding 21-free alcohol represented by Formula XIV, i.e., 2α-methyl-16α-fluoromethylhydrocortisone, 2α-methyl-16α-fluoromethylcortisone, 6α-methyl-16α-fluoromethylcortisone, 16α-fluoromethyl-17α,21-dihydroxy-4-pregnene-3,30-dione, 2α-methyl-16α-fluoromethyl-17α,21-dihydroxy-4-pregnene-3,20-dione for 6α-methyl-16α-fluoromethyl-17α,21-dihydroxy-4-pregnene-3,20-dione, respectively.

EXAMPLE 36A

16α-fluoromethylhydrocortisone 21-acetate (XII)

A solution of 3.0 g. of 16α-fluoromethylhydrocortisone (XIV) in 20 ml. of dry pyridine is treated with 20 ml. of acetic anhydride and allowed to stand at room temperature for about 24 hours. The mixture is then poured into about 250 ml. of water and stirred at room temperature for about 2 hours. The crystalline product thus obtained is recovered by filtration, washed with water and dried to give 16α-fluoromethylhydrocortisone 21-acetate, a light colored crystalline solid.

In the same manner substituting as starting material other compounds represented by Formula XIV, i.e., 16α-fluoromethylcortisone, 16α-fluoromethyl-17α,21-dihydroxy-4-pregnene-3,20-dione, 2α-methyl-16α-fluoromethylhydrocortisone, 6α-methyl-16α-fluoromethylhydrocortisone, 2α-methyl-16α-fluoromethylcortisone, 6α-methyl-16α-fluoromethylcortisone, 2α-methyl-16α-fluoromethyl-17α,21-dihydroxy-4-pregnene-3,20-dione or 6α-methyl-16α-fluoromethyl-17α,21-dihydroxy-4-pregnene-3,20-dione for 16α-fluoromethylhydrocortisone in the procedure of Example 37A is productive of the corresponding 21-acetate.

16α-fluoromethylhydrocortisone (XIV) and the other 21-free alcohols represented by Formula XIV which are listed in the preceding paragraph are converted to other 21-esters by esterification of the 21-hydroxy group, e.g., by reaction with the appropriate acid anhydride, acid chloride or bromide, ester by ester exchange, acid in the presence of an esterification catalyst, etc., to produce the corresponding 21-acylates which include those wherein the acyl radical of the 21-acylate group is the acyl radical of, for example, an aliphatic acid, e.g., acetic, propionic, butyric, valeric, hexanoic, lauric, trimethylacetic, isobutyric, isovaleric, tertiary butylacetic, a cycloaliphatic acid, e.g., β-cyclopentylpropionic, cyclohexanecarboxylic, cyclohexylacetic, an alkaryl acid, e.g., benzoic, phenylacetic, β-phenylpropionic, o-, m- and p-toluic, a saturated dibasic acid (which can be converted into water soluble, e.g., sodium, salts), e.g., succinic, adipic, a monobasic unsaturated acid, e.g., acrylic, crotonic, undecylenic, propiolic, 2-butynoic, undecolic, cinnamic, dibasic unsaturated acids (which can be converted into water soluble, e.g., sodium, salts) e.g., maleic and citraconic, other organic substituted acids, e.g., lactic, mandelic, salicylic, trifluoroacetic, chloroacetic α- and β-bromopropionic, iodobenzoic, thioglycollic, α-aminopropionic, benzenesulfonic, toluenesulfonic, 2-furoic and the like.

EXAMPLE 37A

16-fluoromethylhydrocortisone 21-hemisuccinate (XII) and the sodium salt thereof A solution is prepared containing 0.5 gram of succinic anhydride and 0.1 gram of 16α-fluoromethylhydrocortisone (XIV) in pyridine. This solution is allowed to stand for a period of about twenty hours, is thereupon diluted with water and the mixture refrigerated and filtered. The precipitate thus collected on filter paper is recrystallized two times from methanol to give 16α-fluoromethylhydrocortisone 21-hemisuccinate (XII), a light colored crystalline solid.

Sodium hydroxide solution (0.1 Normal) is slowly added to a stirred solution of 100 milligrams of 16α-fluoromethylhydrocortisone 21-hemisuccinate, dissolved in two milliliters of acetone, until the pH rises to about 7.4. During the addition of sodium hydroxide solution, five milliliters of water is also added. The solution is then concentrated at about 25 degrees centigrade under vacuum to remove the acetone. The resulting aqueous solution is filtered and freeze-dried to give pure 16α-fluoromethylhydrocortisone 21-hemisuccinate sodium salt, a light colored solid.

Example 38A

1-dehydro-16α-fluoromethylhydrocortisone (XV)

Five 100 ml. portions of a medium, in 250 ml. Erlenmeyer flasks, containing 1% glucose, 2% corn steep liquor (60% solids) and tap water are adjusted to a pH of 4.9. This medium is sterilized for 45 minutes at fifteen p.s.i. and inoculated with a one to two day vegetative growth of Septomyxa affinis A.T.C.C. 6737. The Erlenmeyer flasks are shaken at room temperature (about 26 to 28° C.) for a period of about three days. At the end of this period this 500 ml. volume is used as an inoculum for 10 liters of the same glucose-corn steep liquor medium which in addition contains 5 ml. of an antifoam compound (a mixture of lard oil and octadecanol). The fermentor is placed into the water-bath, adjusted to 28° C. and the contents stirred thoroughly (300 r.p.m.) and aerated (0.1 liter of air per minute to 10 liters of beer). After 20 hours of incubation, when a good growth has been developed, 1.0 g. of 16α-fluoromethylhydrocortisone (XIV) plus 50 mg. of 3-ketobisnor-4-cholen-22-al dissolved in dimethylformamide is added and the incubation carried out at the same temperature (28° C.) and aeration until the reaction is complete (final pH 8.3). The mycelium is filtered off and extracted with three 200 ml. portions of acetone. The beer is extracted with three 1 liter portions of methylene chloride and thereupon the acetone extracts and the extracts of the beer are combined, dried over anhydrous sodium sulfate and evaporated and the resulting residue chromatographed over a Florisil anhydrous magnesium silicate column, which on elution with Skellysolve B hexanes containing increasing proportions of acetone from 1 to 50 percent and crystallization gives 1-dehydro-16α-fluoromethylhydrocortisone (X), a light colored crystalline solid.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, mycobacterium Tricothecium, Leptosphaeria, Curcurbitaria, Nocardia, and enzymes of fungi of the family Tuberculariaceae can be used to introduce a Δ¹-bond into 16α-fluoromethylhydrocortisone.

Example 39A

1-dehydro-16α-fluoromethylcortisone (XV)

A stoichiometric equivalent amount of 16α-fluoromethylcortisone (XIV) is substituted as starting material for 16α-fluoromethylhydrocortisone in the procedure of Example 38A to obtain 1-dehydro-16α-fluoromethylcortisone (XV), a light colored crystalline solid.

Example 40A

1-dehydro-6α-methyl-16α-fluoromethylhydrocortisone (XV)

A stoichiometric equivalent amount of 6α-methyl-16α-fluoromethylhydrocortisone (XIV) is substituted as starting material for 16α-fluoromethylhydrocortisone in the procedure of Example 38A to obtain 1-dehydro-6α-methyl-16α-fluromethylhydrocortisone, a light colored crystalline solid.

In the same manner substituting other compounds represented by Formula XIV, i.e., 2α-methyl-16α-fluoromethylhydrocortisone, 2α-methyl-16α-fluoromethylcortisone, 6α-methyl-16α-fluoromethylcortisone, 16α-fluoromethyl-17α,21-dihydroxy-4-pregnene-3,20-dione, 2α-methyl - 16α - fluoromethyl-17α,21-dihydroxy-4-pregnene-3,20-dione or 6α-methyl-16α-fluoromethyl-17α,21-dihydroxy-4-pregnene-3,20-dione for 16α-fluoromethylhydrocortisone in the procedure of Example 38A is productive of the corresponding 1-dehydro compounds represented by Formula XV, i.e., 1-dehydro-2-methyl-16α-fluoromethylhydrocortisone, 1-dehydro-2-methyl-16α-fluoromethylcortisone, 1 - dehydro - 6α-methyl-16α-fluoromethylcortisone, 16α - fluoromethyl - 17α,21-dihydroxy-1,4-pregnadiene-3,20-dione, 2α-methyl-16α-fluoromethyl-17α, 21-dihydroxy-1,4-pregnadiene-3,20-dione and 6α-methyl-16α-fluoromethyl-17α,21-dihydroxy-1,4-pregnadiene-3,20-dione, respectively.

Example 41A

1-dehydro-16α-fluoromethylhydrocortisone-21-acetate (XVI)

A solution of 3.0 g. of 1-dehydro-16α-fluoromethylhydrocortisone (XV) in 20 ml. of dry pyridine is treated with 20 ml. of acetic anhydride and allowed to stand at room temperature for about 24 hours. The mixture is then poured into about 250 ml. of water and stirred at room temperature for about 2 hours. The crystalline product thus obtained is recovered by filtration, washed with water and dried to give 1-dehydro-16α-fluoromethylhydrocortisone 21-acetate which on crystallization from acetone: Skellysolve B hexanes gives 1-dehydro-16α-fluoromethylhydrocortisone 21-acetate (XVI) melting at 197–199° C.

Example 42A

1-dehydro-16α-fluoromethylcortisone 21-acetate (XVI)

Following the procedure of Example 41A 1-dehydro-16α-fluoromethylcortisone (XV) is converted to 1-dehydro-16α-fluoromethylcortisone 21-acetate (XVI), a light colored crystalline solid.

Example 43A

1-dehydro-6α-methyl-16α-fluoromethylhydrocortisone 21-acetate (XVI)

Following the procedure of Example 41A 1-dehydro-6α-methyl-16α-fluoromethylhydrocortisone (XV) is converted to 1-dehydro-6α-methyl-16α-fluoromethylhydrocortisone 21-acetate (XVI), a light colored crystalline solid.

In the same manner following the procedure of Example 41A other 1-dehydro compounds represented by Formula XV and listed in the second paragraph of Example 40A are converted to 1-dehydro-2-methyl-16α-fluoromethylhydrocortisone 21-acetate, 1-dehydro-2-methyl-16α-fluoromethylcortisone 21-acetate, 1-dehydro-6α-methyl-16α-fluoromethylcortisone 21-acetate, 16α-fluoromethyl-17α,21-dihydroxy-1,4-pregnadiene-3,20-dione 21-acetate, 2 - methyl - 16α-fluoromethyl-17α,21-dihydroxy-1,4-pregnadiene-3,20-dione 21-acetate and 6α-methyl-16α-fluoromethyl-17α,21-dihydroxy-1,4-pregnadiene-3,20-dione, respectively.

The 1-dehydro compounds of Formula XV, i.e., 1-dehydro - 16α - fluoromethylhydrocortisone, 1-dehydro-16α-fluoromethylcortisone, 1-dehydro-6α-methyl-16α-fluoromethylhydrocortisone and the other 21-free alcohols listed in the second paragraph of Example 40A are converted to other 21-esters by esterification of the 21-hydroxy group, e.g., by reaction with the appropriate acid anhydride, acid chloride or bromide, ester by ester exchange, acid in the presence of an esterification catalyst, etc., to produce the corresponding 21-acylate of the selected starting material which include those wherein the acyl radical of the 21-acylate group is the acyl radical of an acid listed in the third paragraph of Example 36A.

Example 44A

1-dehydro-16α-fluoromethylhydrocortisone 21-hemisuccinate (XVI) and the sodium salt thereof A solution is prepared containing 0.5 g. of succinic anhydride and 0.1 g. of 1-dehydro-16α-fluoromethylhydrocortisone (XV) in pyridine. This solution is allowed to stand for a period of about twenty hours, is thereupon diluted with water and the mixture refrigerated and filtered. The precipitate thus collected on filter paper is recrystallized two times from methanol to give 1-dehydro-16α-fluoromethylhydrocortisone 21-hemisuccinae (XVI), a light colored crystalline solid.

Sodium hydroxide solution (0.1 Normal) is slowly added to a stirred solution of 100 milligrams of 1-dehydro-16α-fluoromethylhydrocortisone 21-hemisuccinate, dissolved in two milliliters of acetone, until the pH rises to about 7.4. During the addition of sodium hydroxide solution, five milliliters of water is also added. The solution is then concentrated at about 25° C. under vacuum to remove the acetone. The resulting aqueous solution is filtered and freeze-dried to give pure 1-dehydro-16α-fluoromethylhydrocortisone 21-hemisuccinate sodium salt, a light colored solid.

EXAMPLE 45A

*1-dehydro-6α-methyl-16α-fluoromethylhydrocortisone 21-hemisuccinate (XVI) and the sodium salt thereof*

Following the procedure of Example 44A 1-dehydro-6α-methyl-16α-fluoromethylhydrocortisone (XV) is converted to 1-dehydro-6α-methyl-16α-fluoromethylhydrocortisone 21-hemisuccinate (XVI), a light colored crystalline solid and 1-dehydro-6α-methyl-16α-fluoromethylhydrocortisone 21-hemisuccinate sodium salt, a light colored solid.

EXAMPLE 46A

*1-dehydro-16α-fluoromethylhydrocortisone-21-acetate (XVI)*

A mixture of 290 mg. of 16α-fluoromethylhydrocortisone 21-acetate (XII), 290 mg. of selenium dioxide, 0.5 ml. of acetic acid and 25 ml. of t-butyl alcohol was heated to reflux for a period of 15.5 hours. An additional 290 mg. of selenium dioxide was then added and the reflux was continued for an additional period of 24 hours. The reaction mixture was then filtered through Celite (diatomaceous earth) and the solids were washed with ethyl acetate. The filtrate and wash were combined and evaporated to dryness in a stream of nitrogen. The residue thus obtained was dissolved in ethyl acetate, and washed successively with aqueous potassium bicarbonate solution, freshly prepared ice-cold aqueous ammonium sulfide solution, ice-cold dilute aqueous ammonium hydroxide, dilute aqueous hydrochloric acid and aqueous potassium bicarbonate solution. The organic layer was then dried over sodium sulfate and evaporated to dryness in vacuo. The residue thus obtained was dissolved in about 15 ml. of methylene chloride and chromatographed on 30 g. of Florisil synthetic magnesium silicate. Elution with Skellysolve B hexanes containing increasing proportions of acetone gave 177 mg. of 1-dehydro-16α-fluoromethylhydrocortisone 21-acetate. Crystallization from acetone:Skellysolve B hexanes gave 131 mg. of 1-dehydro-16α-fluoromethylhydrocortisone 21-acetate melting at 194–197° C. An additional recrystallization from acetone:Skellysolve B hexanes gave 1-dehydro-16α-fluoromethylhydrocortisone 21-acetate melting at 197–199°;

$\lambda_{Max.}^{EtOH}$ 243 mµ; E, 14,800

The infrared spectrum supported the assigned structure.

*Analysis.*—Calcd. for $C_{24}H_{31}FO_6 \cdot C_3H_6O$: C, 65.85; H, 7.52; F, 3.86. Found: C, 65.67; H, 7.34; F, 4.06.

In the same manner substituting other 21-acetates or 21-acylates represented by Formulae XII and XIII prepared in the foregoing Examples 31A, 32A, 36A and 37A, e.g., the 21-acetates and other 21-acylates prepared and listed in Example 36A above, as the starting steroid in place of 16α-fluoromethylhydrocortisone 21-acetate in the procedure of Example 46A is productive of the corresponding 1-dehydro compound (XVI), e.g., 1-dehydro-16α-fluoromethylcortisone 21-acetate,
1-dehydro-16α-fluoromethyl-17α,21-dihydroxy-1,4-pregnadiene-3,20-dione 21-acetate,
1-dehydro-2-methyl-16α-fluoromethylhydrocortisone 21-acetate,
1-dehydro-6α-methyl-16α-fluoromethylhydrocortisone 21-acetate,
1-dehydro-2-methyl-16α-fluoromethylcortisone 21-acetate,
1-dehydro-6α-methyl-16α-fluoromethylcortisone 21-acetate,
2-methyl-16α-fluoromethyl-17α,21-dihydroxy-1,4-pregnadiene-3,20-dione 21-acetate,
6α-methyl-16α-fluoromethyl-17α,21-dihydroxy-1,4-pregnadiene-3,20-dione 21 acetate and other 21-acylates of the above compounds wherein the acyl radical is that of an acid listed in Example 36A.

EXAMPLE 47A

*1-dehydro-16α-fluoromethylhydrocortisone (XV)*

A stoichiometric equivalent amount of 1-dehydro-16α-fluoromethylhydrocortisone 21-acetate (XVI) is substituted in the procedure of Example 33A to obtain 1-dehydro-16α-fluoromethylhydrocortisone (XV), a light colored crystalline solid.

In the same manner, substituting other 21-acylates represented by Formula XVI, e.g., the compounds prepared in Example 46A, as the starting steroid in the procedure of Example 33A is productive of the corresponding 21-free alcohol, e.g., 1-dehydro-16α-fluoromethylcortisone, 16α-fluoromethyl-17α,21-dihydroxy-1,4-pregnadiene-3,20-dione,
1-dehydro-2-methyl-16α-fluoromethylhydrocortisone,
1-dehydro-6α-methyl-16α-fluoromethylhydrocortisone,
1-dehydro-2-methyl-16α-fluoromethylcortisone,
1-dehydro-6α-methyl-16α-fluoromethylcortisone,
2-methyl-16α-fluoromethyl-17α,21-dihydroxy-1,4-pregnadiene-3,20-dione and
6α-methyl-16α-fluoromethyl-17α,21-dihydroxy-1,4-pregnadiene-3,20-dione, respectively.

EXAMPLE 1B

*3β,17α-dihydroxy-5α,6α-epoxy-16α-fluoromethyl-pregnan-20-one 3-acetate (XX)*

A solution of 6.6 g. of 3β-hydroxy-16α-fluoromethyl-5-pregnen-20-one (A′–IV) and 3.8 g. of p-toluenesulfonic acid monohydrate in acetic anhydride is stirred and slowly distilled for a period of about 18 hours. The rate of distillation is controlled so that 100 to 200 ml. of distillate is removed. The reaction mixture is then concentrated to dryness at reduced pressure. The residue is taken up in chloroform, washed with aqueous sodium bicarbonate solution and water and then dried.

To the resulting solution containing 3β,20-dihydroxy-16α-fluoromethyl - 5,17(20) - pregnadiene 3,20-diacetate (XVII) is added a cold solution of 3.5 g. of anhydrous sodium acetate in 36 ml. of 40% peracetic acid. During the addition the reaction mixture is stirred and maintained at or below 15° C. The mixture is then allowed to warm to room temperature and is stirred for an additional period of about 2.5 hours. The chloroform layer is separated and washed with water and then cold 5% aqueous sodium hydroxide until the washings are basic.

To the resulting solution containing 3β,20-dihydroxy-5α,6α,17α,20α-diepoxy-16α - fluoromethylpregnane 3,20-diacetate (XVIII) is added 200 ml. of methanol followed by 86 ml. of 1.5 N aqueous sodium hydroxide. The mixture is stirred for 45 minutes and then diluted with about 86 ml. of water. The organic layer is separated and the aqueous layer is extracted 4 times, each time with about 70 ml. of methylene chloride. The combined organic layer and extracts are washed with water, dried and then distilled to dryness at reduced pressure.

The residual 3β,17α-dihydroxy-5α,6α-epoxy-16α-fluoromethylpregnan-20-one (XIX) thus obtained, is dissolved in a 1:1 mixture of pyridine and acetic anhydride and then maintained at room temperature for a period of about 16 hours. The mixture is then poured into about 1 liter of ice and water and extracted twice with 150 ml. portions of methylene chloride. The extracts are washed with dilute hydrochloric acid, dilute aqueous sodium bicarbonate and water and then dried and chromatographed over 250 g. of Florisil synthetic magnesium silicate. The column is developed with Skellysolve B hexanes containing increasing amounts of acetone to give 3β,17α-dihydroxy-5α,6α-epoxy-16α-fluoromethylpregnan-20-one 3-acetate which is recrystallized from a mixture of acetone and Skellysolve B hexanes to give 3β,17α-dihydroxy-5α,6α-epoxy-16α-fluoromethylpregnan-20-one 3-acetate (XX), a light colored crystalline solid.

Similarly, 3β,17α-dihydroxy-5α,6α-epoxy-16α-fluoromethylpregnan-20-one is converted to other 3β,17α-dihydroxy-5α,6α-epoxy-16α-fluoromethylpregnan-20-one 3-acylates by esterification of the hydroxy group, e.g., by reaction with the appropriate acid anhydride, acid chloride or bromide, ester by ester exchange, acid in the presence of an esterification catalyst, etc., to produce compounds wherein the acyl radical of the 3-acylate group is, e.g., that of an acid named in the third paragraph of Example 36A.

EXAMPLE 2B

*3β,5α,17α-trihydroxy-6β-fluoro-16α-fluoromethylpregnan-20-one 3-acetate (XXI)*

To 7.25 g. of liquid hydrogen fluoride at −60° C. is added 14 ml. of purified tetrahydrofuran followed by 5.0 g. of 3β,17α-dihydroxy-5α,6α-epoxy-16α-fluoromethylpregnan-20-one 3-acetate (XX) in methylene chloride, chilled in a Dry Ice bath before adding. The cooling bath is removed and the mixture is maintained at about 14° C. for a period of about 4 hours and then poured into 150 ml. of water. The mixture is diluted with an additional 500 ml. of water and then extracted 5 times, each time with 500 ml. of methylene chloride. The extracts are washed with 10% hydrochloric acid, 5% aqueous sodium bicarbonate, water and then dried. The dried solution is then evaporated to dryness at reduced pressure to give 3β,5α,17α-trihydroxy-6β-fluoro-16α-fluoromethylpregnan-20-one 3-acetate (XXI), a light colored crystallizing solid which can be further purified by recrystallization from actone. Alternatively, if desired the residue may be purified by chromatography.

Similarly, other 3β,17α-dihydroxy-5α,6α-epoxy-16α-fluoromethylpregnan-20-one 3-acylates wherein the acyl radical of the acylate group is that of an acid named in the third paragraph of Example 36A are converted to the corresponding 3β,5α,17α-trihydroxy-6β-fluoro-16α-fluoromethylpregnan-20-one 3-acylates.

EXAMPLE 3B

*3β,5α,17α-trihydroxy-6β-fluoro-16α-fluoromethylpregnan-20-one (XXII)*

A mixture consisting of 2.88 g. of 3β,5α,17α-trihydroxy-6β-fluoro-16α-fluoromethylpregnan-20-one 3-acetate, 10 ml. of boron trifluoride etherate and 800 ml. of methanol is stirred at room temperature for a period of about 21 hours. 200 ml. of water is then added and the solution concentrated at reduced pressure at 60° C. The crystalline precipitate is separated and dried to give 3β,5α,17α-trihydroxy-6β-fluoro-16α-fluoromethylpregnan-20-one (XXII), a light color crystalline solid, which can be further purified by recrystallization from acetone.

Similarly, other 3β,5α,17α-trihydroxy-6β-fluoro-16α-fluoromethylpregnan-20-one 3-acylates wherein the acyl radical of the 3-acylate group is, e.g., that of an acid named in the third paragraph of Example 36A, are converted with boron trifluoride in methanol or with aqueous hydrochloric acid in methanol or other lower-alkanol to 3β,5α,17α-trihydroxy-6β-fluoro-16α-fluoromethylpregnan-20-one.

EXAMPLE 4B

*3β,5α,17α-trihydroxy-6β-fluoro-16α-fluoromethyl-21-bromopregnan-20-one (XXIII)*

To a solution of 1.6 g. of 3β,5α,17α-trihydroxy-6β-fluoro-16α-fluoromethylpregnan-20-one (XXII) in chloroform is added a solution of 845 mg. of bromine in 32.5 ml. of chloroform. The mixture is maintained at room temperature in the dark for a period of about 18 to 24 hours. The solution is then washed with dilute aqueous sodium bicarbonate, water and then dried and evaporated to dryness to give 3β,5α,17α-trihydroxy-6β-fluoro-16α-fluoromethyl-21-bromopregnan-20-one which is recrystallized from methylene chloride to give 3β,5α,17α-trihydroxy-6β-fluoro-16α-fluoromethyl-21-bromopregnan-20-one (XXIII), a light colored crystalline solid.

EXAMPLE 5B

*3β,5α,17α,21-tetrahydroxy-6β-fluoro-16α-fluoromethylpregnan-20-one 21-acetate (XXIV)*

A mixture consisting of 562 mg. of 3β,5α,17α-trihydroxy-6α-fluoro-16α-fluoromethyl-21-bromopregnan-20-one (XXIII) 26 ml. of acetone, 0.38 ml. of acetic acid, 2.56 g. of potassium acetate and 6 mg. of potassium iodide is refluxed with stirring for a period of about 16 to 20 hours. The cooled mixture is then diluted with about 50 ml. of water. The precipitated 3β,5α,17α,21-tetrahydroxy-6β-fluoro-16α-fluoromethylpregnan-20-one 21-acetate is isolated and recrystallized from acetone to give 3β,5α,17α,21-tetrahydroxy-6β-fluoro-16α-fluoromethylpregnan-20-one 21-acetate (XXIV), a light color crystalline solid.

Substituting another potassium lower-acylate, e.g., potassium formate, potassium propionate, or other acylate wherein the acyl radical is that of a hydrocarbon carboxylic acid named in the third paragraph of Example 36A, in the above-described reactions is productive of the corresponding 3β,5α,17α,21-tetrahydroxy-6β-fluoro-16α-fluoromethylpregnan-20-one 21-acylate.

EXAMPLE 6B

*5α,17α,21-trihydroxy-6β-fluoro-16α-fluoromethylpregnane-3,20-dione 21-acetate (XXV)*

To a solution of 300 mg. of 3β,5α,17α,21-tetrahydroxy-6β-fluoro-16α-fluoromethylpregnan-20-one 21-acetate (XXIV) in acetone at 5° C. is added 0.3 ml. of a chromic anhydride solution consisting of 26.72 g. of chromic anhydride and 23 ml. of concentrated sulfuric acid made up to 100 ml. with water. The mixture is stirred for about 5 minutes, 150 ml. of cold water is added and stirring is continued for an additional period of about 30 minutes. The precipitated product is separated, washed with water, dilute aqueous sodium bicarbonate and water, dried and crystallized from acetone to give 5α,17α,21-trihydroxy-6β-fluoro-16α-fluoromethylpregnane-3,20-dione 21-acetate (XXV).

Similarly, other 3β,5α,17α,21-tetrahydroxy-6β-fluoro-16α-fluoromethylpregnane-3,20-dione 21-acylates, wherein the acyl radical of the acylate group is that of an acid named in the third paragraph of Example 36A, are converted to the corresponding 5α,17α,21-trihydroxy-6β-fluoro-16α-fluoromethylpregnane-3,20-dione 21-acylates.

EXAMPLE 7B

*6α-fluoro-16α-fluoromethyl-17α,21-dihydroxy-4-pregnene-3,20-dione 21-acetate (XXVI)*

A suspension of 200 mg. of 5α,17α,21-trihydroxy-6β-fluoro-16α-fluoromethylpregnane-3,20-dione 21-acetate in 40 ml. of chloroform and 0.4 ml. of absolute alcohol is cooled to −5° C. and hydrogen chloride gas is bubbled through the mixture for a period of about two hours while maintaining the temperature of the mixture between about −10° and 0° C. The resulting solution is then washed with dilute aqueous sodium bicarbonate, water, dried and evaporated to dryness to give 6α-fluoro-16α-fluoromethyl-17α,21-dihydroxy-4-pregnene-3,20-dione 21-acetate (XXVI), a light colored crystalline solid, which is further purified by recrystallization from a mixture of acetone and ethyl acetate.

Similarly, other 5α,17α,21-trihydroxy-6β-fluoro-16α-methylpregnane-3,20-dione 21-acylates wherein the acyl radical of the acylate group is that of an acid named in the third paragraph of Example 36A, are converted to the corresponding 6α-fluoro - 16α - fluoromethyl-17α,21-dihydroxy-4-pregnene-3,20-dione 21-acylates.

EXAMPLE 8B

*6α-fluoro-16α-fluoromethyl-17α,21-dihydroxy-4-pregnene-3,20-dione (XXVI)*

A solution of 1.1 g. of 6α-fluoro - 16α - fluoromethyl-17α,21-dihydroxy - 4 - pregnene-3,20-dione 21 - acetate (XXVI), and 1.0 g. of potassium bicarbonate in 100 ml. of methanol and 15 ml. of water is purged with nitrogen and stirred at about 25° C. for approximately 12 hours. The solution is then neutralized with acetic acid in water. The mixture is then concentrated to approximately one-third volume in vacuo on a 60° C. water bath. Water is added and the mixture is chilled to about 0° C. The crystalline product thereby obtained is collected on a filter, washed with water and dried to give 6α-fluoro-16α-fluoromethyl-17α,21 - dihydroxy - 4 - pregnene-3,20-dione.

EXAMPLE 9B

*6α-fluoro-16α-fluoromethylhydrocortisone (XXVII)*

A seed culture of *Cunninghamella blakesleeana* (ATTCC 8688b), obtained from spores grown on agar, 5% malt extract solids at pH of 6.0, is prepared by growth in a medium containing, per liter of tap water, 10 g. of dextrose (Cerelose) and 20 g. of liquid corn steep liquor (containing about 1.2 g. of solids), adjusting to a pH of about 5 with 25% aqueous sodium hydroxide.

5 one-liter portions of the above medium are inoculated with the seed culture and growth with aeration and shaking is continued for a period of 48 hours. Then 0.2 of 6α - fluoro-16α-fluoromethyl - 17α,21 - dihydroxy-4-pregnene-3,20-dione (XXVI) in alcohol is added to each flask and fermentation is conducted for another period of 48 hours, at which time the pH is about 5.9

The mycelium is filtered from the beer and the beer extracted four times with one-fourth by volume amount of methylene chloride plus 25% ethyl acetate. The extracts are evaporated to dryness. The residue thus obtained is dissolved in about 150 ml. of methylene chloride and chromatographed on a column of magnesium silicate, which on elution with Skellysolve B hexanes containing increasing proportions of acetone and recrystallization gives 6α - fluoro-16α-fluoromethylhydrocortisone (XXVII), a light colored crystalline solid.

EXAMPLE 10B

*6α-fluoro-11α,17α,21-trihydroxy-16α-fluoromethyl-4-pregnene-3,20-dione (XXVII)*

A medium is prepared of 20 g. of corn steep liquor and 50 g. of technical dextrose diluted to 1 liter with tap water and adjusted to a pH of 4.2 to 4.5. Three liters of this sterilized medium is inoculated with *Rhizopus nigricans* minus strain, American Type Culture Collection Number 6227b, and incubated for 24 hours at a temperature of 28° C. using a rate of aeration and stirring such that the oxygen uptake is 6.3 to 7 millimoles per hour per liter of $Na_2SO_3$ according to the method of Cooper, Fernstrom and Miller, Ind. Eng. Chem. 36, 504 (1944). To this medium containing a 24-hour growth of *Rhizopus nigricans* minus strain is added 1.0 g. of 6α fluoro - 16α - fluoromethyl-17α,21-dihydroxy - 4 - pregnene-3,20-dione (XXVI) in acetone to provide a suspension of the steroid in the culture. After an additional 24-hour period of incubation under the same conditions of temperature and aeration, the beer and mycelium are extracted. The mycelium is filtered, washer twice, each time with a volume of acetone approximately equal to the volume of the mycelium and extracted twice, each time with a volume of methylene chloride approximately equal to the volume of the mycelium. The acetone and methylene chloride extracts including solvent are added to the beer filtrate. The mixed extracts and beer filtrate are extracted successively with two one-half by volume portions of methylene chloride and then with two one-fourth by volume portions of methylene chloride. The combined methylene chloride extracts are washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering the solvent is removed by distillation. The residue is dissolved in a minimum of methylene chloride, filtered and the solvent evaporated to give crude crystals which on recrystallization from methanol gives 6α-fluoro-11α,17α, 21 - trihydroxy-16α-fluormethyl - 4 - pregnene-3,20-dione (XXVII), a crystalline solid.

Alternatively, the residue can be purified by chromatography over Florisil synthetic magnesium silicate and subsequent crystallization.

EXAMPLE 11B

*6α-fluoro-16α-fluoromethylhydrocortisone 21-acetate (XXVII)*

A solution is prepared containing 250 mg. of 6α-fluoro-16α-fluoromethylhydrocortisone (XXVII) in about 1 ml. of pyridine and about 1 ml. of acetic anhydride. The solution is allowed to stand at room temperature for a period of about 21 hours and is thereupon poured into ice water and filtered. The precipitate thus collected on the filter is recrystallized from acetone:Skellysolve B hexanes to give 6α-fluoro - 16α - fluoromethylhydrocortisone 21-acetate (XXVII), a light colored crystalline solid.

Similarly, 6α-fluoro - 16α - fluoromethylhydrocortisone is converted to other 6α-fluoro-16α-fluoromethylhydrocortisone 21-acylates by esterification of the 21-hydroxy group, e.g., by reaction with the appropriate acid anhydride, acid chloride or bromide, ester by ester exchange, acid in the presence of an esterification catalyst, etc., to produce compounds wherein the acyl radical of the 21-acylate group is, e.g., that of an acid named in the third paragraph of Example 36A.

EXAMPLE 12B

*6α-fluoro-16α-fluoromethylcortisone 21-acetate (XXVIII)*

To a solution of 2.5 millimoles of 6α-fluoro-16α-fluoromethylhydrocortisone 21-acetate (XXVII) and 2 ml. of pyridine in tertiary butanol is added 500 mg. of N-bromoacetamide. The reaction mixture is maintained at room temperture for about sixteen hours whereupon the solution is diluted with about 50 ml. of water containing 500 mg. of sodium sulfite, and the mixture is then concentrated at reduced pressure to about 40 ml. The distillation residue is refrigerated, filtered, and the filter cake is washed with water and then dried. The product thus obtained is crystallized from acetone:Skellysolve B hexanes to give 6α - fluoro - 16α - fluoromethylcortisone 21-acetate (XXVIII), a light colored crystalline solid.

In the same manner 6α-fluoro-16α-fluoromethylhydrocortisone and other 6α-fluoro-16α-fluoromethylhydrocortisone 21-acylates wherein the acyl radical is, e.g., that of an acid named in the third paragraph of Example 36A, are converted to 6α-fluoro-16α-fluoromethylcortisone and the corresponding 6α-fluoro - 16α - fluoromethylcortisone 21-acylates, respectively.

EXAMPLE 13B

*6α-fluoro-16α-fluoromethylcortisone (XXVIII)*

A mixture of 1.0 g. of 6α-16α-fluoromethylcortisone 21-acetate (XXVIII), 1.0 g. of potassium bicarbonate, 100 ml. of methanol and 15 ml. of water is purged with nitrogen and stirred at room temperature until the reaction is complete. The reaction mixture is then neutralized with 5% aqueous hydrochloric acid solution, diluted with water and refrigerated. The solid product is collected on a filter, washed with water and crystallized from acetone: Skellysolve B hexanes to give 6α-fluoro-16α-fluoromethylcortisone (XXVIII), a light colored crystalline solid.

EXAMPLE 14B

*6α-fluoro-16α-fluoromethylhydrocortisone 21-hemisuccinate (XXVII) and the sodium salt thereof*

A solution is prepared containing 0.5 g. of succinic anhydride and 0.1 g. of 6α-fluoro-16α-fluoromethylhydrocortisone (XXVII) in pyridine. This solution is allowed to stand for a period of about 20 hours, is thereupon diluted with water and the mixture refrigerated and filtered. The precipitate thus collected on filter paper is recrystallized two times from methanol to give 6α-fluoro-16α-fluoromethylhydrocortisone 21 - hemisuccinate (XXVII), a light colored crystalline solid.

Sodium hydroxide solution (0.1 Normal) is slowly added to a stirred solution of 100 mg. of 6α-fluoro-16α-fluoromethylhydrocortisone 21 - hemisuccinate, dissolved in 2 ml. of acetone, until the pH rises to about 7.4. During the addition of sodium hydroxide solution, 5 ml. of water is also added. The solution is then concentrated at about 25° C. under vacuum to remove the acetone. The resulting aqueous solution is filtered and freeze-dried to give pure 6α-fluoro-16α-fluoromethylhydrocortisone 21-hemisuccinate sodium salt, a light colored solid.

EXAMPLE 15B

*1-dehydro-6α-fluoro-16α-fluoromethylhydrocoritsone (XXIX)*

Five 100-ml. portions of a medium, in 250 ml. Erlenmeyer flasks, containing 1% glucose, 2% corn steep liquor (60% solids) and tap water are adjusted to a pH of 4.9. This medium is sterilized for 45 minutes at 15 p.s.i. pressure and inoculated with a 1 to 2 day vegetative growth of *Septomyxa affinis* A.T.C.C. 6737. The Erlenmeyer flasks are shaken at room temperature (about 26–28 C.) for a period of about 3 days. At the end of this period this 500-ml. volume is used as an inoculum for 10 liters of the same glucose-corn steep liquor medium which in addition contains 5 ml. of an antifoam compound (a mixture of lard oil and octadecanol). The fermentor is placed into the water-bath, adjusted to 28° C. and the contents stirred thoroughly (300 r.p.m.) and aerated (0.1 liter of air per minute to 10 liters of beer). After twenty hours of incubation, when a good growth has been developed, 1.0 g. pf 6α - fluoro - 16α - fluoromethylhydrocortisone (XXVII) plus 50 mg. of 3-ketobisnor-4-cholen-22-al dissolved in dimethylformamide is added and the incubation carried out at the same temperature (28° C.) and aeration until the reaction is complete (final pH 8.3). The mycelium is filtered off and extracted with three 200 ml. portions of acetone. The beer is extracted with three 1 liter portions of methylene chloride and thereupon the acetone extracts and the extracts of the beer are combined, dried over anhydrous sodium sulfate and evaporated and the resulting residue chromatographed over a Florisil anhydrous magnesium silicate column, which on elution with Skellysolve B hexanes containing increasing proportions of acetone from one to fifty percent and crystallization gives 1 - dehydro - 6α-fluoro-16α-fluoromethylhydrocortisone (XXIX), a light colored crystalline solid.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Curcurbitaria, Nocardia, and enzymes of fungi of the family Tuberculariaceae can be used to introduce a Δ¹-bond into 6α-fluoro-16α-fluoromethylhydrocortisone.

EXAMPLE 16B

*1-dehydro-6α-fluoro-16α-fluoromethylcortisone (XXIX)*

A stoichiometric equivalent amount of 6α-fluoro-16α-fluoromethylcortisone (XXVIII) is substituted as starting material for 6α-fluoro-16α-fluoromethylhydrocortisone in the procedure of Example 15B to obtain 1-dehydro-6α-fluoro-16α-fluoromethylcortisone (XXIX), a light colored crystalline solid.

EXAMPLE 17B

*6α-fluoro-16α-fluoromethyl-17α,21-dihydroxy-1,4-pregnadiene-3,20-dione (XXIX)*

A stoichiometric equivalent amount of 6α-fluoro-16α-fluoromethyl-17α,21-dihydroxy-4-pregnene-3,20-dione (XXVI) is substituted as starting material for 6α-fluoro-16α-fluoromethylhydrocortisone in the procedure of Example 15B to obtain 6α-fluoro-16α-fluoromethyl-17α,21-dihydroxyl-1,4-pregnadiene-3,20-dione (XXIX), a light colored crystalline solid.

EXAMPLE 18B

*1-dehydro-6α-fluoro-16α-fluoromethylhydro-cortisone 21-acetate (XXX)*

A solution of 3.0 g. of 1-dehydro-6α-fluoromethylhydrocortisone (XXIX) in dry pyridine is treated with 20 ml. of acetic anhydride and allowed to stand at room temperature for a period of about 24 hours. The mixture is then poured into about 250 ml. of water and stirred at room temperature for about 2 hours. The crystalline product thus obtained is recovered by filtration, washed with water and dried to give 1-dehydro-6α-fluoro - 16α - fluoromethylhydrocortisone 21 - acetate (XXX), a light colored crystalline solid.

EXAMPLE 19B

*1-dehydro-6α-fluoro-16α-fluoromethylcortisone 21-acetate (XXX)*

Following the procedure of Example 18B 1-dehydro-6α-fluoro-16α-fluoromethylcortisone (XXIX) is converted to 1-dehydro-6α-fluoro-16α-fluoromethylcortisone 21-acetate (XXX), a light colored crystalline solid.

EXAMPLE 20B

*6α-fluoro-16α-fluoromethyl-17α-21-dihydroxy-1,4-pregnadiene-3,20-dione 21-acetate (XXX)*

Following the procedure of Example 18B 6α-fluoro-16α - fluoromethyl - 17α,21 - dihydroxy - 1,4-pregnadiene-3,20-dione (XXIX) is converted to 6α-fluoro-16α-fluoromethyl-17α,21-dihydroxy-1,4 - pregnadiene - 3,20 - dione 21-acetate (XXX), a light colored crystalline solid.

Similarly, 1 - dehydro - 6α - fluoro - 16α - fluoromethylhydrocortisone, 1 - dehydro - 6α - fluoro - 16α - fluoromethylcortisone, and 6α - fluoro - 16α - fluoromethyl-17α,21 - dihydroxy - 1,4 - pregnadiene - 3,20 - dione are converted to other 21-esters by esterification of the 21-hydroxy group, e.g., by reaction with the appropriate acid anhydride, acid chloride or bromide, ester by ester exchange, acid in the presence of an esterification catalyst, etc, to produce the corresponding 21 - acylate of the selected starting material which include those wherein the acyl radical of the 21-acylate group is the acyl radical of an acid listed in the third paragraph of Example 36A.

EXAMPLE 21B

*1-dehydro-6α-fluoro-16α-fluoromethylhydrocortisone 21-hemisuccinate (XXX) and the sodium salt thereof*

Following the procedure of Example 14B 1-dehydro-6α - fluoro - 16α - fluoromethylhydrocortisone (XXIX) is converted to 1 - dehydro - 6α - fluoro - 16α - fluoromethylhydrocortisone 21 - hemisuccinate (XXX), a light colored crystalline solid and 1 - dehydro - 6α - fluoro - 16α - fluoromethylhydrocortisone 21 - hemisuccinate sodium salt, a light colored solid.

EXAMPLE 1C

*16α-fluoromethyl-17α,21-dihydroxy-4,9(11)-pregnadiene-3,20-dione 21-acetate (XXXII)*

To a solution of 4.25 g. of 16α-fluoromethylhydrocortisone 21-acetate (XXXI) in pyridine is added 2.8 g. N-bromoacetamide. After standing at room temperature for a period of about 15 minutes, the reaction solution is cooled to 5–10° C. and sulfur dioxide gas is passed over the surface of the solution while shaking the flask until the solution gives no color with acidified starch-iodide paper. During the addition of the sulfur dioxide, the reaction mixture becomes warm. The temperature is kept under 30° C. by external cooling and by varying the rate of sulfur dioxide addition. Thereafter ice water is added to the reaction mixture and the resulting precipitate is collected by filtration. This material is recrystallized from acetone:Skellysolve B hexanes to give 16α-fluoromethyl-17α,21-dihydroxy-4,9(11)-pregnadiene-3,20-dione 21-acetate (XXXII).

In the same manner, following the procedure of Example 1C but substituting as starting material other 16α-fluoromethylhydrocortisone 21-acetates represented by Formula XXXI, e.g., 2α-methyl-16α-fluoromethylhydrocortisone 21-acetate, 6α-methyl-16α-fluoromethylhydrocortisone 21-acetate, 6α-fluoro-16α-fluoromethylhydrocortisone 21-acetate, 1-dehydro-16α-fluoromethylhydrocortisone 21-acetate, 1-dehydro-2-methyl-16α-fluoromethylhydrocortisone 21-acetate, 1-dehydro-6α-methyl-16α-fluoromethylhydrocortisone 21-acetate, or 1-dehydro-6α-fluoro-16α-fluoromethylhydrocortisone 21-acetate for 16α-fluoromethylhydrocortisone 21-acetate is productive of the corresponding $\Delta^{9(11)}$ compounds represented by Formula XXXII, i.e., 2α-methyl-16α-fluoromethyl-17α,21-dihydroxy-4,9(11)-pregnadiene-3,20-dione 21-acetate, 6α-methyl-16α-fluoromethyl-17α,21-dihydroxy-4,9(11)-pregnadiene-3,20-dione 21-acetate, 6α-fluoro-16α-fluoromethyl-17α,21-dihydroxy-4,9(11)-pregnadiene-3,20-dione 21-acetate, 16α-fluoromethyl-17α,21-dihydroxy-1,4,9(11)-pregnatriene-3,20-dione 21-acetate, 2-methyl-16α-fluoromethyl-17α,21-dihydroxy-1,4,9(11)-pregnatriene-3,20-dione 21-acetate, 6α-methyl-16α-fluoromethyl-17α,21-dihydroxy-1,4,9(11)-pregnatriene-3,20-dione 21-acetate and 6α-fluoro-16α-fluoromethyl-17α,21-dihydroxy-1,4,9(11)-pregnatriene-3,20-dione 21-acetate, respectively, as light colored crystalline solids.

EXAMPLE 2C

*9α-bromo-16α-fluoromethylhydrocortisone 21-acetate (XXXIII)*

To a solution of 2.84 g. 16α-fluoromethyl-17α,21-dihydroxy-4,9(11)-pregnadiene-3,20-dione 21-acetate (XXXII) in methylene chloride and tertiary butyl alcohol is added a solution of 7 ml. of 72 percent perchloric acid in 50 ml. water followed by a solution of 1.27 g. of N-bromoacetamide in 30 ml. of tertiary butyl alcohol. After stirring the reaction mixture for a period of about 15 minutes, a solution of 1.4 g. of sodium sulfite in 70 ml. of water is added and the reaction mixture is concentrated to a small volume under reduced pressure at about 50° C. The concentrate is cooled in an ice bath and while stirring an equal volume of water is added. After stirring for a period of about 1 hour, the precipitated product is isolated by filtration, and the cake is washed with water and air-dried to give 9α-bromo-16α-fluoromethylhydrocortisone 21-acetate (XXXIII), a light colored crystalline solid.

In the same manner, following the procedure of Example 2C but substituting as starting material other $\Delta^{9(11)}$-compounds represented by Formula XXXII prepared and named in the second paragraph of Example 1C for 16α-fluoromethyl-17α,21-dihydroxy-4,9(11)-pregnadiene-3,20-dione is productive of other 9α-bromo-16α-fluoromethylhydrocortisone 12-acetate represented by Formula XXXIII, i.e., 2α-methyl-9α-bromo-16α-fluoromethylhydrocortisone 21-acetate, 6α-methyl-9α-bromo-16α-fluoromethylhydrocortisone 21-acetate, 6α-fluoro-9α-bromo-16α-fluoromethylhydrocortisone 21-acetate, 1-dehydro-9α-bromo-16α-fluoromethylhydrocortisone 21-acetate, 1-dehydro-2-methyl-9α-bromo-16α-fluoromethylhydrocortisone 21-acetate, 1-dehydro-6α-methyl-9α-bromo-16α-fluoromethylhydrocortisone 21-acetate and 1-dehydro-6α-fluoro-9α-bromo-16α-fluoromethylhydrocortisone 21-acetate, respectively, as light colored crystalline solids.

Substituting N-chlorosuccinimide for N-bromoacetamide in the procedure of Example 2C is productive of 9α-chloro-16α-fluoromethylhydrocortisone 21-acetate and the other 9α-chloro-16α-fluoromethylhydrocortisone 21-acetates represented by Formula XXXIII corresponding otherwise to the 9α-bromo-16α-fluoromethylhydrocortisone 21-acetates prepared in the preceeding paragraph.

Substituting for the 21-acetates of the starting steroids of Example 1C other corresponding 21-acylates wherein the acyl radical is that of an acid named in the third paragraph of Example 36A and following the procedure of Examples 1C and 2C, there are thus produced as products of each example the corresponding 21-acylates of the 21-acetates.

EXAMPLE 3C

*9β,11β-epoxy-17α,21-dihydroxy-16α-fluoromethyl-4-pregnene-3,20-dione 21-acetate (XXXIV)*

To a solution of 3.4 g. of 9α-bromo-16α-fluoromethylhydrocortisone 21-acetate (XXXIII) in acetone is added 3.4 g. of potassium acetate and the resulting suspension is heated under reflux for a period of about 16 to 24 hours. The mixture is then concentrated to approximately 60 ml. volume at reduced pressure on the steam bath, diluted with water and extracted with methylene chloride. The methylene chloride extracts are combined, washed with water, dried over anhydrous sodium sulfate and evaporated. The residue is redissolved in methylene chloride and chromatographed over 500 g. of Florisil anhydrous magnesium silicate. The column is eluted with hexanes (Skellysolve B) containing increasing proportions of acetone. There is thus eluted 9β,11β-epoxy-16α-fluoromethyl-17α,21-dihydroxy-4-pregnene-3,20-dione 21-acetate (XXXIV) which is freed of solvent by evaporation of the elutes.

EXAMPLE 4C

*9α-fluoro-16α-fluoromethylhydrocortisone 21-acetate (XXXV)*

To approximately 1.3 g. of hydrogen fluoride contained in a polyethylene bottle and maintained at minus 60° C. is added 2.3 ml. of tetrahydrofuran and then a solution of 500 mg. (0.0012 mole) of 9β,11β-epoxy-16α-fluoromethyl-17α,21-dihydroxy-4-pregnene-3,20-dione 21-acetate (XXXIV) in methylene chloride. The steroid solution is rinsed in with an additional 1 ml. of methylene chloride. The mixture is then kept at approximately minus 30° C. for a period of about 1 hour and at +5° C. for a period of about 18 hours. At the end of this period it is mixed cautiously with an excess of cold sodium bicarbonate solution and the organic material is extracted with the aid of additional methylene chloride. The combined extracts are washed with water, dried over anhydrous sodium sulfate and concentrated to approximately 35 ml. The solution is chromatographed over Florisil synthetic magnesium silicate. The column is developed with Skellysolve B hexanes containing increasing proportions of acetone. There is thus eluted 9α-fluoro-16α- fluoromethylhydrocortisone 21-acetate (XXXV) which is freed of solvent by evaporation of the eluate fractions. The product thus obtained is recrystallized from acetone:Skellysolve B hexanes.

In the same manner following the procedures of Examples 3C and 4C but substituting as starting material in Example 3C other 9α-bromo-16α-fluoromethylhydrocortisone 21-acetates represented by Formula (XXXIII) prepared and named in the second paragraph of Example 2C for 9α-bromo-16α-fluoromethylhydrocortisone 21-acetate is productive of other 9α-fluoro-16α-fluoromethylhydrocortisone 21-acetates represented by Formula XXXV, as light colored crystalline solids, i.e., 2α-methyl-9α-fluoro-16α-fluoromethylhydrocortisone 21-acetate, 6α-methyl-9α-fluoro-16α - fluoromethylhydrocortisone 2-acetate, 6α,9α-difluoro-16α-fluoromethylhydrocortisone 21-acetate, 1-dehydro-9α-fluoro-16α-fluoromethylhydrocortisone 21-acetate, 1-dehydro-2-methyl-9α-fluoro-16α-fluoromethylhydrocortisone 21-acetate, 1-dehydro-6α-methyl-9α-fluoro-16α-fluoromethylhydrocortisone 21-acetate and 1 - dehydro-6α,9α-difluoro - 16α - fluoromethylhydrocortisone 21-acetate, respectively.

Substituting for the 21-acetates of the starting steroids of Example 3C other corresponding 21-acylates wherein the acyl radical is that of an acid named in the third paragraph of Example 36A and following the procedures of Examples 3C and 4C, there are thus produced as products of Example 4C the corresponding 21-acylates instead of the 21-acetates.

EXAMPLE 5C

*9α-fluoro-16α-fluoromethylcortisone 21-acetate (XXXVI)*

A mixture is prepared containing 1 ml. of acetic acid, 50 mg. of 9α-fluoro-16α-fluoromethylhydrocortisone 21-acetate (XXXV), 20 mg. of chromic anhydride and a small amount of water. This mixture is agitated for a few minutes and allowed to stand at room temperature until the reaction is complete. Thereafter it is poured into water and refrigerated until the steroid separates. The solid material thus obtained is collected on filter paper and dried to give 9α-fluoro-16α-fluoromethylcortisone 21-acetate (XXXVI), a light colored crystalline solid which can be further purified by recrystallization from acetone:Skellysolve B hexanes.

In the same manner substituting as the starting steroid in Example 5C other 9α-fluoro-16α-fluoromethylhydrocortisone 21-acetates, represented by Formula XXXV prepared and named in the second paragraph of Example 4C, there are thus produced as light colored crystalline solids the respective 11-keto compounds represented by Formula XXXVI, corresponding otherwise to the selected starting steroid.

In the same manner substituting as the starting steroid in Example 5C, 9α-bromo-16α-fluoromethylhydrocortisone 21-acetate (XXXIII), 9α-chloro-16α-fluoromethylhydrocortisone 21-acetate or the other 9α-bromo-16α-fluoromethylhydrocortisone 21-acetates or the 9α-chloro analogues thereof represented by Formula XXXIII prepared and named in the second and third paragraphs of Example 2C, there are thus produced as light colored crystalline solids the respective 11-keto compounds represented by Formula XXXVI, corresponding otherwise to the selected starting steroid.

Substituting for the 21-acetates of the starting steroids of Example 5C other corresponding 21-acylates wherein the acyl radical is that of an acid named in the third paragraph of Example 36A there are thus produced the corresponding 21-acylates instead of the 21-acetates.

EXAMPLE 6C

*9α-fluoro-16α-fluoromethylhydrocortisone (XXXVII)*

To solution of 3.25 g. of 9α-fluoro-16α-fluoromethylhydrocortisone 21-acetate (XXXV) in methanol, previously purged of air-oxygen by passing nitrogen through it for ten minutes, is added a solution of 1.63 g. of potassium bicarbonate in 30 ml. of water, similarly purged of oxygen. The mixture is allowed to stand at room temperature until hydrolysis is complete. The reaction mixture is then neutralized with acetic acid in water and concentrated to approximately one-third volume at reduced pressure on a warm water-bath. Water is then added and the mixture is chilled. The crystalline product thus obtained is collected on a filter, washed with water and dried to give 9α-fluoro-16α-fluoromethylhydrocortisone, a light colored crystalline solid.

EXAMPLE 7C

*6α-methyl-9α-fluoro-16α-fluoromethylhydrocortisone (XXXVII)*

Following the procedure of Example 6C, but substituting an equivalent amount of 6α-methyl-9α-fluoro-16α-fluoromethylhydrocortisone 21-acetate (XXV) for 9α-fluoro-16α-fluoromethylhydrocortisone 21-acetate is productive of 6α-methyl-9α-fluoro-16α-fluoromethylhydrocortisone, a light colored crystalline solid.

EXAMPLE 8C

*6α,9α-difluoro-16α-fluoromethylhydrocortisone (XXXVII)*

Following the procedure of Example 6C, but substituting an equivalent amount of 6α,9α-difluoro-16α-fluoromethylhydrocortisone 21-acetate (XXXV) for 9α-fluoro-16α-fluoromethylhydrocortisone 21-acetate is productive of 6α,9α-difluoro-16α-fluoromethylhydrocortisone, a light colored crystalline solid.

EXAMPLE 9C

*1-dehydro-9α-fluoro-16α-fluoromethylhydrocortisone (XXXVII)*

Following the procedure of Example 6C but substituting an equivalent amount of 1-dehydro-9α-fluoro-16α-fluoromethylhydrocortisone 21-acetate (XXXV) for 9α-fluoro-16α-fluoromethylhydrocortisone 21-acetate is productive of 1-dehydro-9α-fluoro-16α-fluoromethylhydrocortisone, a light colored crystalline solid.

EXAMPLE 10C

*1-dehydro-6α-methyl-9α-fluoro-16α-fluoromethylhydrocortisone (XXXVII)*

Following the procedure of Example 6C, but substituting an equivalent amount of 1-dehydro-6α-methyl-9α-fluoro - 16α - fluoromethylhydrocortisone 21 - acetate (XXXV) for 9α-fluoro-16α-fluoromethylhydrocortisone 21-acetate is productive of 1-dehydro-6α-methyl-9α-fluoro-16α-fluoromethylhydrocortisone, a light colored crystalline solid.

EXAMPLE 11C

*1-dehydro-6α,9α-difluoro-16α-fluoromethylhydrocortisone (XXXVII)*

Following the procedure of Example 6C, but substituting an equivalent amount of 1-dehydro-6α,9α-difluoro-16α-fluoromethylhydrocortisone 21-acetate (XXXV) for 9α-fluoro-16α-fluoromethylhydrocortisone 21-acetate is productive of 1-dehydro-6α,9α-difluoro-16α-fluoromethylhydrocortisone, a light colored crystalline solid.

EXAMPLE 12C

*9α-fluoro-16α-fluoromethylcortisone (XXXVII)*

Following the procedure of Example 6C but substituting an equivalent amount of 9α-fluoro-16α-fluoromethylcortisone 21-acetate (XXXVI) for 9α-fluoro-16α-fluoromethylhydrocortisone 21-acetate is productive of 9α-fluoro-16α-fluoromethylcortisone, a light colored crystalline solid.

In the same manner substituting 2α-methyl-9α-fluoro-16α-fluoromethylhydrocortisone 21-acetate (XXXV) or 1-dehydro - 2 - methyl - 9α-fluoro-16α-fluoromethylhydrocortisone 21-acetate (XXXV) as the starting steroid in Example 6C is productive of 2α-methyl-9α-fluoro-16α-fluoromethylhydrocortisone (XXXVII) and 1-dehydro-2-methyl - 9α - fluoro - 16α - fluoromethylhydrocortisone (XXXVII), respectively.

In the same manner substituting 9α-bromo-16α-fluoromethylhydrocortisone 21-acetate, 9α-chloro-16α-fluoromethylhydrocortisone 21-acetate or the other 9α-bromo and 9α-chloro compound represented by Formula XXXIII, prepared and named in the second and third paragraphs of Example 2C, there are thus produced the respective 21-free alcohols represented by Formula XXXVII.

In the same manner substituting other 9α-halo-16α-fluoromethylcortisone 21-acetate represented by Formula XXXVI, prepared in the second and third paragraphs of Example 5C, as the starting steroid in Example 6C, there are thus produced the corresponding 21-free alcohols represented by Formula XXXVII.

In the same manner, substituting other 21-acylates wherein the acyl radical is that of an acid named in the third paragraph of Example 36A in place of the 21-acetates in Examples 6C, 7C, 8C, 9C, 10C, 11C, 12C and the above paragraphs following Example 12C, there are likewise produced the corresponding 21-free alcohols.

EXAMPLE 13C

*1-dehydro-6α,9α-difluoro-16α-fluoromethylhydrocortisone 21-hemisuccinate (XXXV) and the sodium salt thereof*

A solution is prepared containing 0.5 g. of succinic anhydride and 0.1 g. of 1 - dehydro - 6α,9α-difluoro-16α - fluoromethylhydrocortisone (XXXVII) in pyridine. This solution is allowed to stand for a period of about 20 hours, is thereupon diluted with water and the mixture refrigerated and filtered. The precipitate thus collected on filter paper is recrystallized two times from methanol to give 1 - dehydro - 6α,9α - difluoro - 16α-fluoromethylhydrocortisone 21 - hemisuccinate (XXXV), a light colored crystalline solid.

Sodium hydroxide solution (0.1 normal) is slowly added to a stirred solution of 100 mg. of 1-dehydro-6α,9α - difluoro - 16α - fluoromethylhydrocortisone 21-hemisuccinate, dissolved in 2 ml. of acetone, until the pH rises to about 7.4. During the addition of sodium hydroxide solution, 5 ml. of water is also added. The solution is then concentrated at about 25° C. under vacuum to remove the acetone. The resulting aqueous solution is filtered and freeze-dried to give pure 1-dehydro - 6α,9α - difluoro - 16α - fluoromethylhydrocortisone 21-hemisuccinate sodium salt, a light colored solid.

In the same manner the 21-free alcohols represented by Formula XXXVII prepared in Examples 6C, 7C, 8C, 9C, 10C, 12C and the paragraphs following Example 12C are converted to the corresponding 21-hemisuccinate esters and the sodium salts thereof.

Similarly, 1 - dehydro - 6α,9α - difluoro - 16α - fluoromethylhydrocortisone and the other 21-free alcohols prepared in the examples cited in the preceding paragraph are converted to other 21-esters by esterification of the 21-hydroxy group, e.g., by reaction with the appropriate acid anhydride, acid chloride or bromide, ester by ester exchange, acid in the presence of an esterification catalyst, etc., to produce the corresponding 21-acylates, wherein the acyl radical is that of an acid named in the third paragraph of Example 36A.

EXAMPLE 1D

*16α-fluoromethylhydrocortisone 21-methanesulfonate (XXXIX)*

A solution is prepared containing 1.0 g. of 16α-fluoromethylhydrocortisone (XIV) in pyridine. This solution is cooled to about 0° C. and treated with 0.3 ml. of methanesulfonyl chloride. Thereafter the solution is allowed to stand at 0–5° C. until the reaction is complete, after which it is diluted with water and extracted with three portions of methylene chloride. The extracts are combined, washed with cold dilute hydrochloric acid until the aqueous layer has a pH of two to three, then washed again with cold sodium bicarbonate solution, water and finally dried over anhydrous sodium sulfate. Evaporation of the methylene chloride extract at reduced pressure left a residue of 16α-fluoromethylhydrocortisone 21-methanesulfonate (XXXIX).

EXAMPLE 2D

*11β,17α-dihydroxy-16α-fluoromethyl-21-iodo-4-pregnene-3,20-dione (XL)*

The crude 16α-fluoromethylhydrocortisone 21-methanesulfonate (XXXIX) prepared in Example 1D is dissolved in acetone and treated with a solution of 1.0 g. of sodium iodide in 10 ml. of acetone. The mixture is heated under reflux with stirring for a period of about 15 minutes, the heat is then reduced and the mixture concentrated to one-third volume at reduced pressure. Ice and water are added and the precipitated product is collected on a filter, washed with water and dried to yield 11β,17α - dihydroxy - 16α - fluoromethyl - 21 - iodo-4-pregnane-3,20-dione (XL), a light colored solid product.

EXAMPLE 3D

*11β,17α-dihydroxy-16α-fluoromethyl-21-fluoro-4-pregnene-3,20-dione (XLI)*

One g. of 11β,17α - dihydroxy - 16α - fluoromethyl-21-iodo-4-pregnene-3,20-dione (XL) is dissolved in boiling acetonitrile. After cooling to about 40° C., the solution is protected from light and 0.8 ml. of a 50% aqueous solution of silver fluoride is added with stirring. Stirring is continued for a period of about 1 hour at about 40° C., then 0.7 ml. of the same aqueous silver fluoride solution is added. After another hour of stirring another 0.7 ml. portion of aqueous silver fluoride solution is added. Heating and stirring is then continued for a period of about 2 hours. The mixture is then filtered through a bed of diatomaceous earth (Celite) and the filtrate evaporated at reduced pressure at a bath temperature of about 50° C. The residue thus obtained is thoroughly extracted with two portions of warm methylene chloride, the combined extracts are washed with water and dried over anhydrous sodium sulfate. The dried solution is concentrated to approximately 100 ml. and then chromatographed over synthetic magnesium silicate (Florisil). The column is eluted with Skellysolve B hexanes containing increasing proportions of acetone to give 11β,17α-dihydroxy - 16α - fluoromethyl - 21 - fluoro - 4 - pregnene-3,20-dione (XLI), a light colored crystalline solid.

EXAMPLE 4D

*11β,17α-dihydroxy-16α-fluoromethyl-21-fluoro - 4 - pregnene-3,20-dione (XLI) and 11β-hydroxy-16α-fluoromethyl-17α,21-epoxy-4-pregnene-3,20-dione (XLII)*

A mixture of 200 mg. of 11β,21-dihydroxy-16α-fluoromethyl-21-iodo-4-pregnene - 3,20 - dione 21-methanesulfonate (XXXIX) and 100 mg. of potassium fluoride in 2 ml. of dimethylsulfoxide is heated on a steam bath for a period of about 17 hours. The reaction mixture is then diluted with about 50 ml. of methylene chloride and washed three times with about 10 ml. of water. After drying over sodium sulfate, the methylene chloride solution is passed over a column of synthetic magnesium silicate (Florisil). Elution with Skellysolve B hexanes containing increasing proportions of acetone first gives crude crystals of 11β-hydroxy-16α-fluoromethyl - 17α,21 - epoxy - 4-pregnene-3,20-dione (XLII), a light colored crystalline solid.

Further elution with Skellysolve B hexanes plus acetone yields 11β,17α-dihydroxy-16α-fluoromethyl - 21 - fluoro-4-pregnene-3,20-dione which on recrystallization from ethyl acetate-Skellysolve B hexanes gives essentially pure 11β,17α-dihydroxy-16α-fluoromethyl-21-fluoro - 4 - pregnene-3,20-dione (XLI), a light colored crystalline solid.

In the same manner substituting as the starting steroid in Example 1D other 21-hydroxy compounds represented by Formulae XIV and XV, prepared and named in Examples 34A, 35A, 38A, 39A and 40A, and following the procedures of Examples 1D, 2D and 3D, consecutively or alternatively the procedures of Examples 1D and 4D, consecutively, there are thus produced as products of Examples 3D and 4D, other 21- fluoro compounds represented by Formula XLI, e.g., 6α-methyl-11β,17α-dihydroxy-16α-fluoromethyl-21-fluoro-4-pregnene-3,20-dione,
16α-fluoromethyl-17α-hydroxy-21-fluoro-4-pregnene-3,11,20-trione,
16α-fluoromethyl-17α-hydroxy-21-fluoro-4-pregnene-3,20-dione,
6α-methyl-16α-fluoromethyl-17α-hydroxy-21-fluoro-4-pregnene-3,20-dione,
11β,17α-dihydroxy-16α-fluoromethyl-21-fluoro-1,4-pregnadiene-3,20-dione,
16α-fluoromethyl-17α-hydroxy-21-fluoro-1,4-pregnadiene-3,11,20-trione,
6α-methyl-11β,17α-dihydroxy-16α-fluoromethyl-21-fluoro-1,4-pregnadiene-3,20-dione,
16α-fluoromethyl-17α-hydroxy-21-fluoro-1,4-pregnadiene-3,20-dione,
6α-methyl-16α-fluoromethyl-17α-dihydroxy-1,4-pregnadiene-3,20-dione, etc.

When the alternative process which includes the procedure of Example 4D is employed to produce the 21-fluoro compounds, e.g., those named above, the corresponding 17,21-epoxy compounds represented by Formula XLII are concomitantly produced, e.g., 6α-methyl-11β-hydroxy-16α-fluoromethyl-17α,21-epoxy-4-pregnene-3,20-dione,
16α-fluoromethyl-17α,21-epoxy-4-pregnene-3,11,20-trione,
16α-fluoromethyl-17α,21-epoxy-4-pregnene-3,20-dione,
6α-methyl-16α-fluoromethyl-17α,21-epoxy-4-pregnene-3,20-dione,
11β-hydroxy-16α-fluoromethyl-17α,21-epoxy-1,4-pregnadiene-3,20-dione,
16α-fluoromethyl-17α,21-epoxy-1,4-pregnadiene-3,11,20-trione,
6α-methyl-11β-hydroxy-16α-fluoromethyl-17α,21-epoxy-1,4-pregnadiene-3,20-dione,
16α-fluoromethyl-17α,21-epoxy-1,4-pregnadiene-3,20-dione,
6α-methyl-16α-fluoromethyl-17α,21-epoxy-1,4-pregnadiene-3,20-dione, etc.

In the same manner, substituting as the starting steroid in Example 1D other 21-hydroxy compounds represented by Formulae XXVI, XXVII, XXVIII and XXIX, prepared and named in Examples 8B, 9B, 13B, 15B, 16B and 17B, and following the procedures of Examples 1D, 2D and 3D, consecutively or alternatively the procedures of Examples 1D and 4D, consecutively, there are thus produced 6α,21-difluoro-16α-fluoromethyl-17α-hydroxy-4-pregnene-3,20-dione,
6α,21-difluoro-11β,17α-dihydroxy-16α-fluoromethyl-4-pregnene-3,20-dione,
6α,21-difluoro-16α-fluoromethyl-17α-hydroxy-4-pregnene-3,11,20-trione,
6α,21-difluoro-11β,17α-dihydroxy-16α-fluoromethyl-1,4-pregnadiene-3,20-dione,
6α,21-difluoro-16α-fluoromethyl-17α-hydroxy-1,4-pregnadiene-3,11,20-trione, and
6α,21-difluoro-16α-fluoromethyl-17α-hydroxy-1,4-pregnadiene-3,20-dione, respectively. When the alternative process which includes the procedure of Example 4D is used to produce the above 21-fluoro compounds there are produced concomitantly the corresponding 6-fluoro-17,21-epoxy compounds represented by Formula XLII, i.e., 6α-fluoro-16α-fluoromethyl-17α,21-epoxy-4-pregnene-3,20-dione,
6α-fluoro-11β-hydroxy-16α-fluoromethyl-17α,21-epoxy-4-pregnene-3,20-dione,
6α-fluoro-16α-fluoromethyl-17α,21-epoxy-4-pregnene-3,11,20-trione,
6α-fluoro-11β-hydroxy-16α-fluoromethyl-17α,21-epoxy-1,4-pregnadiene-3,20-dione,
6α-fluoro-16α-fluoromethyl-17α,21-epoxy-1,4-pregnadiene-3,11,20-trione, and
6α-fluoro-16α-fluoromethyl-17α,21-epoxy-1,4-pregnadiene-3,20-dione, respectively.

In the same manner, substituting as the starting steroid in Example 1D other 21-hydroxy compounds represented by Formula XXXVII, prepared in Examples 6C, 7C, 8C, 10C, 11C, 12C, and following the procedures of Examples 1D, 2D and 3D, consecutively or alternatively the procedures of Examples 1D and 4D, consecutively, there are thus produced as products of Examples 3D and 4D the 9α-halo-21-fluoro compounds represented by Formula XLI, e.g., 9α,21-difluoro-11β,17α-dihydroxy-16α-fluoromethyl-4-pregnene-3,20-dione,
6α-methyl-9α,21-difluoro-11β,17α-dihydroxy-16α-fluoromethyl-4-pregnene-3,20-dione,
6α,9α,21-trifluoro-11β,17α-dihydroxy-16α-fluoromethyl-4-pregnene-3,20-dione,
9α,21-difluoro-11β,17α-dihydroxy-16α-fluoromethyl-1,4-pregnadiene-3,20-dione,
6α,9α,21-trifluoro-11β,17α-dihydroxy-16α-fluoromethyl-1,4-pregnadiene-3,20-dione,
9α,21-difluoro-16α-fluoromethyl-17α-hydroxy-4-pregnene-3,11,20-trione,
9α-bromo-11β,17α-dihydroxy-16α-fluoromethyl-21-fluoro-4-pregnene-3,20-dione,
9α-chloro-11β,17α-dihydroxy-16α-fluoromethyl-21-fluoro-4-pregnene-3,20-dione, etc.

When the alternative process which includes the procedure of Example 4D is employed to produce the 9α-halo-21-fluoro compounds, e.g., those named above, the corresponding 9α-halo-17,21-epoxy compounds represented by Formula XLII are concomitantly produced, e.g., 9α-fluoro-11β-hydroxy-16α-fluoromethyl-17α,21-epoxy-4-pregnene-3,20-dione,
6α-methyl-9α-fluoro-11β-hydroxy-16α-fluoromethyl-17α,21-epoxy-4-pregnene-3,20-dione,
6α,9α-difluoro-11β-hydroxy-16α-fluoromethyl-17α,21-epoxy-4-pregnene-3,20-dione,
9α-fluoro-11β-hydroxy-16α-fluoromethyl-17α,21-epoxy-1,4-pregnadiene-3,20-dione,
6α,9α-difluoro-11β-hydroxy-16α-fluoromethyl-17α,21-epoxy-1,4-pregnadiene-3,20-dione,
9α-fluoro-16α-fluoromethyl-17α,21-epoxy-4-pregnene-3,11,20-trione,
9α-bromo-11β-hydroxy-16α-fluoromethyl-17α,21-epoxy-4-pregnene-3,20-dione,
9α-chloro-11β-hydroxy-16α-fluoromethyl-17α,21-epoxy-4-pregnene-3,20-dione, etc.

EXAMPLE 5D

*11β,17α-dihydroxy-16α-fluoromethyl-4-pregnene-3,20-dione (XLIV)*

150 mg. of 11-β,17α-dihydroxy-16α-fluoromethyl-21-iodo-4-pregnene-3,20-dione (XL) is slurried with 5 ml. of acetic acid and stirred for a period of about 45 minutes.

Then an aqueous solution of sodium thiosulfate pentahydrate is added causing the iodine color to disappear. Additional water is added and the mixture is extracted with three 25 ml. portions of methylene chloride. The methylene chloride extracts are combined, washed with water and cold sodium bicarbonate solution until all the acetic acid is neutralized. After drying over anhydrous sodium sulfate, the solution is concentrated to approximately 15 ml. and chromatographed over magnesium silicate (Florisil). The column is developed with hexanes containing increasing proportions of acetone to give substantially pure 11β,17α-dihydroxy-16α-fluoromethyl-4-pregnene-3,20-dione, a light colored crystalline solid.

In the same manner substituting as the starting steroid in Example 1D other 21-hydroxy compounds represented by Formulae XIV and XV, prepared and named in Examples 34A, 35A, 38A, 39A and 40A, and following the procedures of Examples 1D, 2D and 5D, consecutively, there are thus produced as products of Example 5D the corresponding 21-desoxy compounds represented by Formula XLIV, e.g., 6α-methyl-11β,17α-dihydroxy-16α-fluoromethyl-4-pregnene-3,20-dione,
16α-fluoromethyl-17α-hydroxy-4-pregnene-3,11,20-trione,
16α-fluoromethyl-17α-hydroxy-4-pregnene-3,20-dione,
6α-methyl-16α-fluoromethyl-17α-hydroxy-4-pregnene-3,20-dione,
11β,17α-dihydroxy-16α-fluoromethyl-1,4-pregnadiene-3,20-dione,
16α-fluoromethyl-17α-hydroxy-1,4-pregnadiene-3,11,20-trione,
6α-methyl-11β,17α-dihydroxy-16α-fluoromethyl-1,4-pregnadiene-3,20-dione,
16α-fluoromethyl-17α-hydroxy-1,4-pregnadiene-3,20-dione,
6α-methyl-16α-fluoromethyl-17α-hydroxy-1,4-pregnadiene-3,20-dione, etc.

In the same manner, substituting as the starting steroid in Example 1D other 21-hydroxy compounds represented by Formulae XXVI, XXVII, XXVIII and XXIX, prepared and named in Examples 8B, 9B, 13B, 15B, 16B and 17B, and following the procedures of Examples 1D, 2D and 5D, consecutively, there are thus produced the corresponding 6α-fluoro-21-desoxy compounds represented by Formula XLIV, i.e., 6α-fluoro-16α-fluoromethyl-17α-hydroxy-4-pregnene-3,20-dione,
6α-fluoro-11β,17α-dihydroxy-16α-fluoromethyl-4-pregnene-3,20-dione,
6α-fluoro-16α-fluoromethyl-17α-hydroxy-4-pregnene-3,11,20-trione,
6α-fluoro-11β,17α-dihydroxy-16α-fluoromethyl-1,4-pregnadiene-3,20-dione,
6α-fluoro-16α-fluoromethyl-17α-hydroxy-1,4-pregnadiene-3,11,20-trione, and
6α-fluoro-16α-fluoromethyl-17α-hydroxy-1,4-pregnadiene-3,20-dione, respectively.

In the same manner substituting as the starting steroid in Example 1D other 21-hydroxy compounds represented by Formula XXXVII, prepared in Examples 6C, 7C, 8C, 10C, 11C, 12C, and following the procedures of Examples 1D, 2D and 5D, consecutively, there are thus produced as products of Example 5D the corresponding 9α-halo-21-desoxy compounds represented by Formula XLI, e.g., 9α-fluoro-11β,17α-dihydroxy-16α-fluoromethyl-4-pregnene-3,20-dione,
6α-methyl-9α-fluoro-11β,17α-dihydroxy-16α-fluoromethyl-4-pregnene-3,20-dione,
6α,9α-difluoro-11β,17α-dihydroxy-16α-fluoromethyl-4-pregnene-3,20-dione,
9α-fluoro-11β,17α-dihydroxy-16α-fluoromethyl-1,4-pregnadiene-3,20-dione,
6α-methyl-9α-fluoro-11β,17α-dihydroxy-16α-fluoromethyl-1,4-pregnadiene-3,20-dione,
6α,9α-difluoro-11β,17α-dihydroxy-16α-fluoromethyl-1,4-pregnadiene-3,20-dione,
9α-fluoro-16α-fluoromethyl-17α-hydroxy-4-pregnene-3,11,20-trione,
9α-bromo-11β,17α-dihydroxy-16α-fluoromethyl-4-pregnene-3,20-dione,
9α-chloro-11β,17α-dihydroxy-16α-fluoromethyl-4-pregnene-3,20-dione, etc.

EXAMPLE 6D

*11β,17α-dihydroxy-16α-fluoromethyl-21-fluoro-4-pregnene-3,20-dione 17-acetate (XLIII)*

A mixture of 2.0 g. of 11β,17α-dihydroxy-16α-fluoromethyl-21-fluoro-4-pregnene-3,20-dione (XLI), 5 ml. of acetic anhydride, 500 mg. of p-toluenesulfonic acid and 5 ml. of acetic acid is stirred for a period of about 30 minutes. The reaction mixture is then poured into water with vigorous stirring. The precipitated solid is collected on a filter, washed with water, dried, dissolved in methylene chloride and chromatographed over a column of Florisil synthetic magnesium silicate. The column is eluted with increasing proportions of acetone in Skellysolve B hexanes and the product is recrystallized from acetone: Skellysolve B hexanes to give 11β,17α-dihydroxy-16α-fluoromethyl-21-fluoro-4-pregnene-3,20-dione 17-acetate, a light colored crystalline solid.

EXAMPLE 7D

*11β,17α-dihydroxy-16α-fluoromethyl-4-pregnene-3,20-dione 17-acetate (XLV)*

Following the procedure of Example 6D, but substituting 11β,17α-dihydroxy-16α-fluoromethyl-4-pregnene-3,20-dione (XLIV) as the starting steroid, there is thus produced 11β,17α-dihydroxy - 16α - fluoromethyl-4-pregnene-3,20-dione 17-acetate, a light colored crystalline solid.

In the same manner, substituting as the starting steroid in Example 6D the other 21-fluoro compounds represented by Formula XLI, prepared in Example 3D and 4D, above, or the other 21-desoxy compounds represented by Formula XLIV, prepared in Example 5D, above, there are thus produced the corresponding 17α-acetates represented by Formulae XLIII and XLV, e.g., 6α-methyl-11β,17α-dihydroxy-16α-fluoromethyl-21-fluoro-4-pregnene-3,20-dione 17-acetate, 16α-fluoromethyl-17α-hydroxy-21-fluoro-4-pregnene-3,11,20-trione
17-acetate, 11β,17α-dihydroxy-16α-fluoromethyl-21-fluoro-1,4-pregnadiene-3,20-dione
17-acetate, 6α-methyl-11β,17α-dihydroxy-16α-fluoromethyl-21-fluoro-1,4-pregnadiene-3,20-dione
17-acetate, 6α,21-difluoro-11α,17α-dihydroxy-16α-fluoromethyl-4-pregnene-3,20-dione
17-acetate, 6α,21-difluoro-11β,17α-dihydroxy-16α-fluoromethyl-1,4-pregnadiene-3,20-dione
17-acetate, 9α,21-difluoro-11β,17α-dihydroxy-16α-fluoromethyl-4-pregnene-3,20-dione
17-acetate, 6α-methyl-9α,21-difluoro-11β,17α-dihydroxy-16α-fluoromethyl-1,4-pregnadiene-3,20-dione
17-acetate, 6α,9α,21-trifluoro-11β,17α-dihydroxy-16α-fluoromethyl-4-pregnene-3,20-dione
17-acetate, 6α,9α,21-trifluoro-11β,17α-dihydroxy-16α-fluoromethyl-1,4-pregnadiene-3,20-dione
17-acetate, 16α-fluoromethyl-17α-hydroxy-4-pregnene-3,20-dione
17-acetate, 6α-methyl-16α-fluoromethyl-17α-hydroxy-4-pregnene-3,20-dione
17-acetate, 11β,17α-hydroxy-16α-fluoromethyl-1,4-pregnadiene-3,20-dione
17-acetate, 6α-fluoro-16α-fluoromethyl-17α-hydroxy-4-pregnene-3,20-dione
17-acetate, 6α-fluoro-16α-fluoromethyl-17α-hydroxy-4-pregnene-3,11-20-trione
17-acetate, 6α-fluoro-16α-fluoromethyl-17α-hydroxy-1,4-pregnadiene-3,20-dione 17-acetate, 9α-fluoro-11β,17α-dihydroxy-16α-fluoromethyl-4-pregnene-3,20-dione 17-acetate, 6α,9α-difluoro-11β,17α-dihydroxy-16α-fluoromethyl-4-pregnene-3,20-dione 17-acetate, 6α-methyl-9α-fluoro-11β,17α-dihydroxy-16α-fluoromethyl-1,4-pregnadiene-3,20-dione 17-acetate, 6α,9α-difluoro-11β,17α-dihydroxy-16α-fluoromethyl-1,4-pregnadiene-3,20-dione 17-acetate, etc.

Substituting another hydrocarbon carboxylic acid anhydride for acetic anhydride is productive of other 17-acylates instead of the 17-acetates, wherein the acyl radical of the 17-acylate group is, e.g., that of an acid named in the third paragraph of Example 36A.

EXAMPLE 8D

*3β,17α-dihydroxy-16α-fluoromethyl-5-pregnen-20-one 3-acetate*

A mixture of 21.0 g. of sodium iodide, 6.9 g. of sodium acetate, 4.2 ml. of acetic acid and 3 ml. of water is cooled to 0° C. with stirring and 21 g. of zinc dust is then added. A solution of 9.0 g. 3β,17α-dihydroxy-5α,6α-epoxy-16α-fluoromethylpregnan-20-one 3-acetate (XX) in 150 ml. warm acetic acid is added slowly over a period of about 10 minutes keeping the temperature at about −5 to +5° C. The cooling bath is then removed and the reaction mixture is stirred for a period of about 3 hours at room temperature and then for an additional period of about an hour at 48–50° C. When the reaction is complete the mixture is poured into 1 liter of water with vigorous stirring; and the precipitate thus obtained is collected on a filter, washed with water and dried. The dried precipitate is dissolved in hot acetone and filtered to remove the zinc. The solvent is then evaporated to give 3β,17α-dihydroxy - 16α-fluoromethyl-5-pregnen-20-one 3-acetate, a light colored crystalline solid, which can be further purified by recrystallization from acetone:Skellysolve B hexanes.

EXAMPLE 9D

*3β,17α-dihydroxy-16α-fluoromethyl-5-pregnen-20-one*

A solution of 1.0 g. of 3β,17α-dihydroxy-16α-fluoromethyl-5-pregnen-20-one 3-acetate is dissolved in methanol and treated with a slight excess of 10% aqueous sodium hydroxide. The mixture is stirred and allowed to stand at room temperature until the hydrolysis is complete. The reaction mixture is then neutralized with dilute acetic acid, evaporated at reduced pressure to remove the methanol and extracted with methylene chloride. The methylene chloride is evaporated to give 3β,17α-dihydroxy-16α-fluoromethyl - 5-pregnen-20-one, which can be further purified by recrystallization from acetone:Skellysolve B hexanes.

EXAMPLE 10D

*16α-fluoromethyl-17α-hydroxy-4-pregnene-3,20-dione (XLIV)*

A solution of 1.0 g. 3β,17α-dihydroxy-16α-fluoromethyl-5-pregnen-20-one in toluene is distilled until the distillate shows no evidence of water. Cyclohexanone and a solution of 1.0 g. of aluminum isopropoxide in 20 ml. of toluene is added and the mixture is heated under reflux until the oxidation is complete. Most of the volatile material is then removed by steam distillation and the residue is extracted with ethyl acetate. The combined extracts are washed with aqueous sodium bicarbonate solution, water and dried over sodium sulface. The solvent is then evaporated in vacuo to give a residual oil which is chromatographed on Florisil synthetic magnesium silicate and eluted with Skellysolve B containing increasing proportions of acetone to give 16α-fluoromethyl-17α-hydroxy-4-pregnene-3,20-dione, a light colored crystalline solid.

EXAMPLE 11D

*16α-fluoromethyl-17α-hydroxy-4-pregnene-3,20-dione (XLIV)*

3.0 g. of 3β,17α-dihydroxy-16α-fluoromethyl-5-pregnen-20-one is dissolved in 250 ml. of acetone and 100 ml. of methylene chloride; the mixture is cooled to 0° C. and oxidized by the dropwise addition of 2.75 ml. of a solution prepared by dissolving 26.72 g. of chromic acid in 23 ml. of concentrated sulfuric acid and diluting with water to 100 ml. After 10 minutes at 0° C. the mixture is poured into ice-water and extracted with methylene chloride. The combined extracts are washed with sodium bicarbonate solution, water and dried over sodium sulfate. Removal of the solvent gives an oil which is dissolved in 100 ml. of methanol containing 1.0 g. of anhydrous oxalic acid and allowed to stand at room temperature until the reaction is complete. The solution is then diluted with methylene chloride, washed successively with aqueous sodium bicarbonate solution, water and dried over sodium sulfate. Evaporation of the solvent and chromatography of the residue (dissolved in methylene chloride) on Florisil synthetic magnesium silicate gives, on elution with increasing proportions of acetone in Skellysolve B hexanes, 16α - fluoromethyl - 17α-hydroxy-4-pregnene-3,20-dione, a light colored crystalline solid.

We claim:

1. A compound selected from the formula:

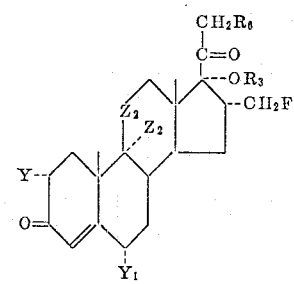

wherein $R_3$ is hydrogen or the acyl radical of an organic carboxylic acid, preferably a hydrocarbon carboxylic acid containing from 1 to 12 carbon atoms, inclusive, $R_6$ is hydrogen or fluorrine; $X_2$ is the methylene radical ($>CH_2$), the β-hydroxymethylene radical

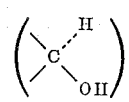

or the carbonyl radical ($>C=O$), Y is hydrogen or methyl; $Y_1$ is hydrogen, methyl or fluorine, in which when Y is methyl $Y_1$ is limited to hydrogen; $Z_2$ is hydrogen, fluorine, chlorine or bromine; and wherein when $X_2$ is the methylene radical $Z_2$ is limited to hydrogen.

2. A compound selected from the formula:

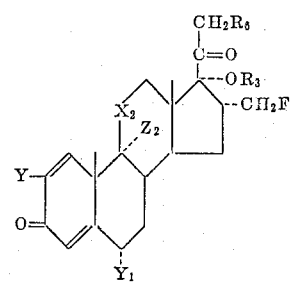

wherein $R_3$ is hydrogen or the acyl radical of an organic carboxylic acid, preferably a hydrocarbon carboxylic acid containing from 1 to 12 carbon atoms, inclusive, $R_6$ is hydrogen or fluorine; $X_2$ is the methylene radical ($>CH_2$), the β-hydroxymethylene radical

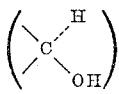

or the carbonyl radical ($>C=O$), Y is hydrogen or methyl; $Y_1$ is hydrogen, methyl or fluorine, in which when Y is methyl $Y_1$ is limited to hydrogen; $Z_2$ is hydrogen, fluorine, chlorine or bromine; and wherein when $X_2$ is the methylene radical $Z_2$ is limited to hydrogen.

3. 11β,17α-dihydroxy - 16α-fluoromethyl - 21-fluoro-4-pregnene-3,20-dione, a compound of claim 1 wherein $R_3$, Y, $Y_1$ and $Z_2$ are each hydrogen, $R_6$ is fluorine and $X_2$ is β-hydroxymethylene.

4. 11β,17α - dihydroxy - 16α-fluoromethyl-4-pregnene-3,20-dione, a compound of claim 1 wherein $R_3$, $R_6$, Y, $Y_1$ and $Z_2$ are each hydrogen and $X_2$ is β-hydroxymethylene.

5. 11β,17α-dihydroxy - 16α-fluoromethyl - 21-fluoro-4-pregnene-3,20-dione 17-acetate, a compound of claim 1 wherein $R_3$ is acetyl, $R_6$ is fluorine, Y, $Y_1$, and $Z_2$ are each hydrogen and $X_2$ is β-hydroxymethylene.

6. 11β,17α-dihydroxy - 16α-fluoromethyl - 4-pregnene-3,20-dione 17-acetate, a compound of claim 1 wherein $R_3$ is acetyl $R_6$, Y, $Y_1$ and $Z_2$ are each hydrogen and $X_2$ is β-hydroxymethylene.

7. 16α-fluoromethyl - 17α-hydroxy - 4-pregnene-3,20-dione, a compound of claim 1 wherein $R_3$, $R_6$, Y, $Y_1$ and $Z_2$ are each hydrogen and $X_2$ is methylene.

8. A compound of the following formula:

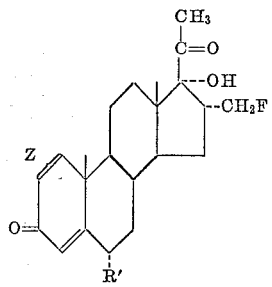

wherein R is selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

References Cited
UNITED STATES PATENTS

| | | | |
|---|---|---|---|
| 3,261,851 | 7/1966 | Beal et al. | 260—397.3 |
| 2,781,366 | 2/1957 | Schneider | 260—397.45 |

ELBERT L. ROBERTS, *Primary Examiner.*

UNITED STATES PATENT OFFICE
CERTIFICATE OF CORRECTION

Patent No. 3,388,138　　　　　　　　　　　　　June 11, 1968

Philip F. Beal III, et al.

It is certified that error appears in the above identified patent and that said Letters Patent are hereby corrected as shown below:

Columns 9 and 10, the fourth formula identified as "A′-I" should be identified as formula -- A′-IV --; same columns, formulas A′-VI and IXa should appear as shown below:

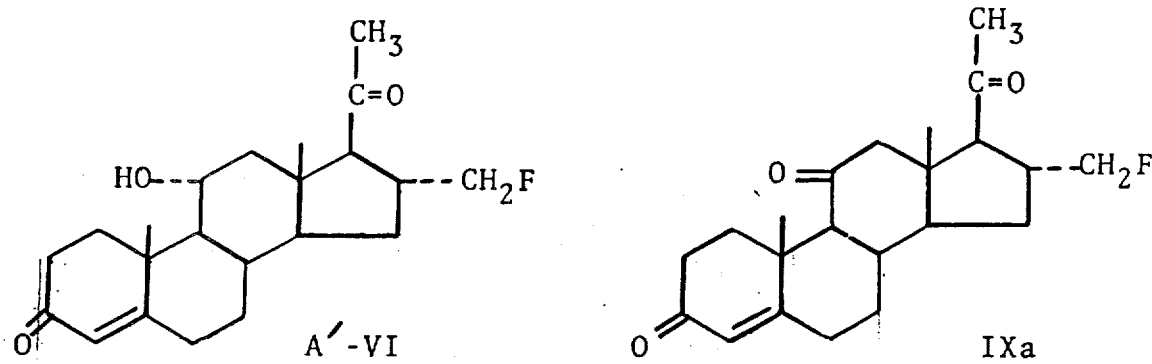

Column 18, formula XXI should appear as shown below:

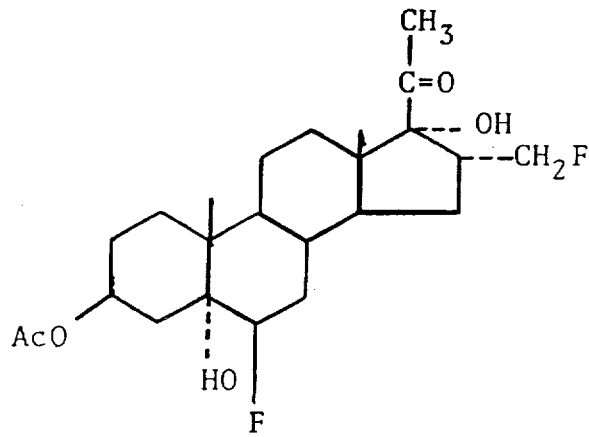

Column 22, line 74, "XVII" should read -- XXVII --. Column 28, line 45, "melting point at 224-244° C." should read -- melting at 242-244° C. --. Column 29, line 63, "14.63" should read -- 74.63 --. Column 31, line 18, "H. 9.61" should read -- H. 8.61 --; line 26, "6α-" should read -- 16α- --; line 75, "-4,20-dione" should read -- -3,20-dione --. Column 39, line 49, "-13,11,20-" should read -- -3,11,20- --. Column 44, line 41, "3350" should read -- 3550 --. Column 58, lines 29 and 30, "21-acylates of the 21-acetates" should read -- 21-acylates instead of the 21-acetates --. Column 68, lines 30 to 42, the formula should appear as shown below:

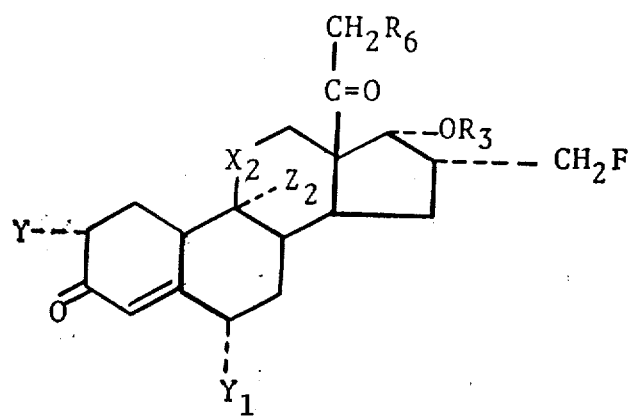

Signed and sealed this 14th day of April 1970.

(SEAL)
Attest:

EDWARD M. FLETCHER, JR.
Attesting Officer

WILLIAM E. SCHUYLER, JR.
Commissioner of Patents